(12) United States Patent
Chiffey et al.

(10) Patent No.: US 12,318,760 B2
(45) Date of Patent: Jun. 3, 2025

(54) COMPOSITE, ZONE-COATED, DUAL-USE AMMONIA (AMOX) AND NITRIC OXIDE OXIDATION CATALYST

(71) Applicant: Johnson Matthey Public Limited Company, London (GB)

(72) Inventors: Andrew Francis Chiffey, Royston (GB); Kieran Cole, Royston (GB); Oliver Cooper, Royston (GB); Christopher Daly, Royston (GB); Jonas Edvardsson, Vastra Frolunda (SE); Lee Gilbert, Royston (GB); Alexander Green, Royston (GB); Neil Greenham, Royston (GB); Robert Hanley, Royston (GB); Caitlin Lucy Jenkins, Royston (GB); Per Marsh, Vastra Frolunda (SE); David Micallef, Royston (GB); Francois Moreau, Royston (GB); George Platt, Royston (GB); Paul Richard Phillips, Royston (GB); James Wylie, Royston (GB)

(73) Assignee: Johnson Matthey Public Limited Company, London (GB)

( * ) Notice: Subject to any disclaimer, the term of this patent is extended or adjusted under 35 U.S.C. 154(b) by 526 days.

(21) Appl. No.: 17/754,778

(22) PCT Filed: Oct. 16, 2020

(86) PCT No.: PCT/GB2020/052625
§ 371 (c)(1),
(2) Date: Apr. 12, 2022

(87) PCT Pub. No.: WO2021/074652
PCT Pub. Date: Apr. 22, 2021

(65) Prior Publication Data
US 2023/0211323 A1    Jul. 6, 2023

(30) Foreign Application Priority Data

Oct. 16, 2019   (EP) ..................... 19203640
Oct. 16, 2019   (GB) ..................... 1914958
(Continued)

(51) Int. Cl.
*B01D 53/94*        (2006.01)
*B01J 21/12*        (2006.01)
(Continued)

(52) U.S. Cl.
CPC .......... *B01J 23/58* (2013.01); *B01D 53/9418* (2013.01); *B01D 53/9436* (2013.01);
(Continued)

(58) Field of Classification Search
CPC ........... B01D 53/9418; B01D 53/9436; B01D 53/9472; B01D 53/9477;
(Continued)

(56) References Cited

U.S. PATENT DOCUMENTS 7,749,472 B2   7/2010   Chen
7,998,424 B2   8/2011   Bergeal et al.
(Continued)

FOREIGN PATENT DOCUMENTS

CN    101421019 A    4/2009
CN    105283241 A    1/2016
(Continued)

OTHER PUBLICATIONS

Chris Ruehl et al., Environ. Sci. Technol., 2018, 52, 5868-5874 "Emissions During and Real-world Frequency of Heavy-duty Diesel Particulate Filter Regeneration".

*Primary Examiner* — Dapinder Singh
(74) *Attorney, Agent, or Firm* — BakerHostetler

(57) ABSTRACT

A composite, zone-coated, dual-use ammonia (AMOX) and nitric oxide oxidation catalyst (12) comprises: a substrate (5)
(Continued)

having a total length L and a longitudinal axis and having a substrate surface extending axially between a first substrate end (I) and a second substrate end (O); two or more catalyst washcoat zones (1; 2) comprised of a first catalyst washcoat layer (9) comprising a refractory metal oxide support material and one or more platinum group metal components supported thereon and a second catalyst washcoat layer (11) different from the first catalyst washcoat layer (9) and comprising a refractory metal oxide support material and one or more platinum group metal components supported thereon, which two or more catalyst washcoat zones (1; 2) being arranged axially in series on and along the substrate surface, wherein a first catalyst washcoat zone (1) having a length $L_1$, wherein $L_1<L$, is defined at one end by the first substrate end (I) and at a second end (13) by a first end (15) of a second catalyst washcoat zone (2) having a length $L_2$, wherein $L_2<L$, wherein the first catalyst washcoat zone (1) comprises a first refractory metal oxide support material and one or more platinum group metal components supported thereon; and the second catalyst washcoat zone comprises a second refractory metal oxide support material and one or more platinum group metal components supported thereon; and a washcoat overlayer (G) extending axially from the first substrate end for up to 200% of the axial length of the underlying first catalyst washcoat layer, which washcoat overlayer comprising a particulate metal oxide loading of >48.8 g/l (>0.8 g/in$^3$), wherein the particulate metal oxide is an aluminosilicate zeolite including at least one of copper, iron and manganese, wherein a total platinum group metal loading in the first catalyst washcoat zone (1) defined in grams of platinum group metal per litre of substrate volume (g/l) is different from the total platinum group metal loading in the second catalyst washcoat zone (2).

20 Claims, 5 Drawing Sheets

(30) Foreign Application Priority Data

| | | |
|---|---|---|
| Mar. 31, 2020 | (GB) | 2004768 |
| Mar. 31, 2020 | (GB) | 2004769 |
| Jun. 26, 2020 | (GB) | 2009825 |
| Jun. 26, 2020 | (WO) | PCT/EP2020/068165 |
| Oct. 13, 2020 | (WO) | PCT/GB2020/052547 |

(51) Int. Cl.
    *B01J 23/44*      (2006.01)
    *B01J 23/58*      (2006.01)
    *B01J 29/76*      (2006.01)
    *B01J 35/00*      (2006.01)
    *B01J 35/64*      (2024.01)
    *F01N 3/28*      (2006.01)

(52) U.S. Cl.
CPC .......... *B01D 53/9472* (2013.01); *B01J 21/12* (2013.01); *B01J 23/44* (2013.01); *B01J 29/763* (2013.01); *B01J 35/19* (2024.01); *B01J 35/647* (2024.01); *F01N 3/2828* (2013.01); *B01D 2251/2062* (2013.01); *B01D 2255/1021* (2013.01); *B01D 2255/1023* (2013.01); *B01D 2255/2065* (2013.01); *B01D 2255/2073* (2013.01); *B01D 2255/20738* (2013.01); *B01D 2255/20761* (2013.01); *B01D 2255/50* (2013.01); *B01D 2255/9035* (2013.01); *B01D 2255/9155* (2013.01); *B01D 2255/9202* (2013.01); *B01D 2258/012* (2013.01); *F01N 2330/30* (2013.01); *F01N 2370/04* (2013.01); *F01N 2510/0684* (2013.01)

(58) Field of Classification Search
CPC ...... B01D 2251/2062; B01D 2251/102; B01D 2251/1021; B01D 2251/1023; B01D 2251/2065; B01D 2251/2073; B01D 2251/20738; B01D 2251/20761; B01D 2251/50; B01D 2251/9022; B01D 2251/9032; B01D 2251/9035; B01D 2251/9155; B01D 2251/9202; B01D 2258/012; B01J 21/12; B01J 23/002; B01J 23/44; B01J 23/58; B01J 29/76; B01J 29/763; B01J 29/783; B01J 35/19; B01J 35/396; B01J 35/647; B01J 35/0244; B01J 35/0246; B01J 2229/183; B01J 2523/00; B01J 2523/25; B01J 2523/31; B01J 2523/41; B01J 2523/824; B01J 2523/828; F01N 3/022; F01N 3/0253; F01N 3/106; F01N 3/2066; F01N 3/2807; F01N 3/2828; F01N 13/16; F01N 2330/30; F01N 2370/02; F01N 2370/04; F01N 2510/00; F01N 2510/06; F01N 2510/063; F01N 2510/068; F01N 2510/0682; F01N 2510/0684; F01N 2570/18; Y02A 50/20; Y02T 10/12
See application file for complete search history.

(56) References Cited

U.S. PATENT DOCUMENTS

| | | |
|---|---|---|
| 8,540,952 B2 | 9/2013 | Swallow |
| 8,652,429 B2 | 2/2014 | Sumiya |
| 8,667,785 B2 | 3/2014 | Blakeman |
| 8,668,891 B2 | 3/2014 | Blakeman et al. |
| 9,005,559 B2 | 4/2015 | Sumiya |
| 9,034,286 B2 * | 5/2015 | Bergeal ............... B01J 35/56 |
| | | 502/328 |
| 9,046,022 B2 | 6/2015 | Blakeman et al. |
| 9,259,684 B2 | 2/2016 | Blakeman |
| 9,333,461 B2 | 5/2016 | Castagnola |
| 9,333,490 B2 | 5/2016 | Kazi |
| 9,341,098 B2 | 5/2016 | Cole et al. |
| 9,366,166 B2 | 6/2016 | Blakeman |
| 9,527,034 B2 | 12/2016 | Bergeal |
| 9,527,035 B2 | 12/2016 | Bergeal et al. |
| 9,597,661 B2 | 3/2017 | Blakeman |
| 9,611,773 B2 | 4/2017 | Brown |
| 9,636,634 B2 | 5/2017 | Chiffey et al. |
| 9,643,161 B2 | 5/2017 | Chiffey |
| 9,707,542 B2 | 7/2017 | Bergeal |
| 9,764,310 B2 | 9/2017 | Markatou |
| 9,849,423 B2 | 12/2017 | Chiffey |
| 9,868,115 B2 | 1/2018 | Sumiya et al. |
| 9,987,618 B2 | 6/2018 | Chiffey |
| 9,993,771 B2 | 6/2018 | Voss et al. |
| 10,105,692 B2 | 10/2018 | Andersen et al. |
| 10,155,197 B2 | 12/2018 | Cole |
| 10,201,807 B2 | 2/2019 | Larsson et al. |
| 10,207,254 B2 | 2/2019 | Blakeman et al. |
| 10,240,500 B2 | 3/2019 | Chiffey |
| 10,286,359 B2 | 5/2019 | Chiffey |
| 10,328,388 B2 | 6/2019 | Dumbuya |
| 10,376,867 B2 | 8/2019 | Blakeman et al. |
| 10,449,518 B2 | 10/2019 | Markatou |
| 10,569,257 B2 | 2/2020 | Chiffey |
| 10,625,208 B2 | 4/2020 | Bergeal |
| 10,688,475 B2 | 6/2020 | Blakeman |
| 10,767,528 B2 | 9/2020 | Hengst |
| 10,773,251 B2 | 9/2020 | Blakeman |
| 10,801,384 B2 | 10/2020 | Hengst |
| 10,807,081 B2 | 10/2020 | Larsson |

(56) References Cited

U.S. PATENT DOCUMENTS

| | | |
|---|---|---|
| 10,821,401 B2 | 11/2020 | Chiffey |
| 10,843,171 B2 | 11/2020 | Markatou |
| 10,864,502 B2 | 12/2020 | Sung et al. |
| 11,052,378 B2 | 7/2021 | Hengst |
| 11,103,855 B2 | 8/2021 | Chiffey |
| 11,161,098 B2 * | 11/2021 | Nunan .................. B01J 23/44 |
| 11,167,246 B2 | 11/2021 | Chiffey |
| 11,338,245 B2 | 5/2022 | Chiffey |
| 11,344,845 B2 | 5/2022 | Voss et al. |
| 11,439,987 B2 | 9/2022 | Ji |
| 11,845,064 B2 | 12/2023 | Chiffey et al. |
| 12,023,627 B2 | 7/2024 | Voss et al. |
| 2005/0069476 A1 | 3/2005 | Blakeman |
| 2005/0227867 A1 | 10/2005 | Chen |
| 2006/0251549 A1 | 11/2006 | Kumar et al. |
| 2008/0038172 A1 | 2/2008 | Chen et al. |
| 2008/0045405 A1 | 2/2008 | Beutel et al. |
| 2009/0217652 A1 | 9/2009 | Bergeal et al. |
| 2009/0288402 A1 | 11/2009 | Voss |
| 2009/0317686 A1 | 12/2009 | Huston |
| 2010/0172814 A1 | 7/2010 | Bull et al. |
| 2011/0286900 A1 | 11/2011 | Caudle et al. |
| 2014/0186244 A1 | 7/2014 | Blakeman et al. |
| 2014/0271429 A1 | 9/2014 | Kazi et al. |
| 2015/0033715 A1 | 2/2015 | Markatou et al. |
| 2015/0071839 A1 | 3/2015 | Massner et al. |
| 2015/0165423 A1 | 6/2015 | Sung et al. |
| 2015/0202572 A1 | 7/2015 | Chiffey et al. |
| 2015/0202611 A1 | 7/2015 | Chiffey |
| 2015/0224478 A1 * | 8/2015 | Bergeal .................. B01J 23/58 |
| | | 502/328 |
| 2015/0273452 A1 | 10/2015 | Chiffey et al. |
| 2017/0007987 A1 | 1/2017 | Han et al. |
| 2017/0043322 A1 | 2/2017 | Chandler et al. |
| 2017/0189854 A1 * | 7/2017 | Andersen ............ B01J 37/0244 |
| 2017/0216770 A1 | 8/2017 | Chiffey |
| 2018/0065083 A1 | 3/2018 | Bidal |
| 2018/0065084 A1 | 3/2018 | Chiffey |
| 2018/0065086 A1 | 3/2018 | Bidal |
| 2018/0104677 A1 | 4/2018 | Blakeman |
| 2018/0214824 A1 | 8/2018 | Dumbuya |
| 2018/0280877 A1 * | 10/2018 | Chen ...................... B01J 23/42 |
| 2019/0201844 A1 | 7/2019 | Hayama |
| 2019/0217278 A1 | 7/2019 | Chiffey |
| 2019/0262772 A1 | 8/2019 | Chiffey |
| 2019/0383184 A1 * | 12/2019 | Dumbuya ............... B01J 35/56 |
| 2020/0206721 A1 | 7/2020 | Chiffey |
| 2023/0104565 A1 | 4/2023 | Chiffey et al. |
| 2023/0211323 A1 | 7/2023 | Chiffey et al. |
| 2023/0278018 A1 | 9/2023 | Chiffey et al. |
| 2024/0307822 A1 | 9/2024 | Voss et al. |

FOREIGN PATENT DOCUMENTS

| | | |
|---|---|---|
| CN | 105934274 A | 9/2016 |
| CN | 106413887 A | 2/2017 |
| CN | 105188930 B | 4/2018 |
| CN | 108472588 A | 8/2018 |
| CN | 109894113 A | 6/2019 |
| CN | 108138624 B | 6/2021 |
| DE | 102016123120 A1 | 6/2017 |
| EP | 2105197 A1 | 9/2009 |
| EP | 2431094 A4 | 11/2012 |
| EP | 1775788 B1 | 5/2013 |
| EP | 2051799 B1 | 1/2016 |
| EP | 2922630 B1 | 6/2018 |
| EP | 3356659 A1 | 8/2018 |
| EP | 2651540 B1 | 5/2019 |
| EP | 3328541 B1 | 6/2021 |
| EP | 3865209 A1 | 8/2021 |
| EP | 3888774 A1 | 10/2021 |
| GB | 2604801 A | 9/2022 |
| JP | 2005-530614 A | 10/2005 |
| JP | 2009522094 B2 | 6/2009 |
| JP | 2010500922 A | 1/2010 |
| JP | 2011000502 A | 1/2011 |
| JP | 2013146706 A | 8/2013 |
| JP | 2015501719 B2 | 1/2015 |
| JP | 2016513584 A | 5/2016 |
| JP | 2016531737 A | 10/2016 |
| JP | 2017508606 A | 3/2017 |
| KR | 10-2008-0081031 A | 9/2008 |
| RU | 2 650 522 C2 | 4/2018 |
| RU | 2668272 C2 | 9/2018 |
| RU | 2 685 426 C1 | 4/2019 |
| WO | 2001080342 A1 | 10/2001 |
| WO | 2004002611 A1 | 1/2004 |
| WO | 2007077462 A1 | 7/2007 |
| WO | 2008022160 A1 | 2/2008 |
| WO | 2012079598 A1 | 6/2012 |
| WO | 2014151677 A1 | 9/2014 |
| WO | 2015095058 A1 | 6/2015 |
| WO | 2015110818 A1 | 7/2015 |
| WO | 2015118323 A1 | 8/2015 |
| WO | 2017055857 A1 | 4/2017 |
| WO | 2018216817 A1 | 11/2018 |

* cited by examiner

COMPOSITE, ZONE-COATED, DUAL-USE AMMONIA (AMOX) AND NITRIC OXIDE OXIDATION CATALYST

FIELD OF THE INVENTION

The invention relates to a composite, zone-coated, dual-use ammonia (AMOX) and nitric oxide oxidation catalyst for use in an exhaust system for treating an exhaust gas produced by a vehicular compression ignition internal combustion engine, preferably for a heavy-duty diesel vehicle, which exhaust gas also including ammonia. The invention further relates to an exhaust system, or a vehicle, comprising the composite oxidation catalyst of the invention disposed downstream from a first injector for a nitrogenous reductant or a precursor thereof connected to a source of nitrogenous reductant or nitrogenous reductant precursor/first substrate comprising a selective catalytic reduction catalyst. The invention also relates to the use of a composite oxidation catalyst of the invention for oxidising ammonia in an exhaust gas flowing in an exhaust system of a vehicular compression ignition internal combustion engine and for oxidising nitric oxide (NO) in the exhaust gas to nitrogen dioxide ($NO_2$) for promoting a downstream selective catalytic reduction reaction or particulate matter combustion on a filter.

BACKGROUND TO THE INVENTION

Combustion engines produce exhaust gases that contain pollutants, such as carbon monoxide (CO), unburned hydrocarbons (HCs), oxides of nitrogen ($NO_x$) and particulate matter (PM). Emissions standards for pollutants in an exhaust gas produced by a combustion engine, particularly for vehicular engines, are becoming increasingly stringent. There is a need to provide improved catalysts and exhaust systems for treating and removing the pollutants in such exhaust gases that can meet these standards and which are cost-effective.

The exhaust gas from vehicular gasoline and diesel engines is commonly treated with a catalyst that can oxidise (i) carbon monoxide (CO) to carbon dioxide ($CO_2$); and (ii) hydrocarbons (HCs) to water ($H_2O$) and carbon dioxide ($CO_2$). Three-way catalysts (TWCs) are typically employed to treat the exhaust gas from a gasoline engine by reducing oxides of nitrogen ($NO_x$) to nitrogen ($N_2$), water ($H_2O$) and carbon dioxide ($CO_2$) simultaneously with the oxidation reactions (i) and (ii). The exhaust gas from a compression ignition engine, such as a diesel engine, is typically treated with an oxidation catalyst (commonly called a diesel oxidation catalyst (DOC)) that performs oxidation reactions (i) and (ii). Some diesel oxidation catalysts are also able to oxidise nitrogen monoxide (NO) to nitrogen dioxide ($NO_2$), which can aid removal of $NO_x$ using an additional, downstream emissions control device.

From 1 Sep. 2019, new emission regulations were brought in in Europe. Specifically, all new passenger cars introduced onto the European market for the first time are to be tested according to a new regulation called the "REAL Driving Emissions" (RDE) test. The RDE test is a more realistic on-road emissions test in real driving conditions, for $NO_x$ and other particulate emissions, which are a major cause of air pollution. This test is carried out with a portable emission measuring system (PEMS) that is attached to the car while driving in real conditions on the road.

Additionally, a new laboratory-based test called the World Harmonised Light Vehicles Test Procedure (WLTP) was recently implemented to replace the outgoing "new European Driving Cycle" (NEDC) as the European vehicle homologation procedure. The WLTP is a global, harmonised standard for determining the levels of pollutants, $CO_2$ emissions and fuel consumption of traditional and hybrid cars and was developed by the United Nations Economic Commission for Europe (UNECE). One of the main goals of the WLTP is to better match the laboratory estimates of fuel consumption and emissions with those found in on-road driving.

All new vehicle registrations from 1 Sep. 2019 are required to meet a $NO_x$ conformity factor of 2.1, whereby the RDE $NO_x$ emissions results cannot exceed the laboratory WLTP $NO_x$ emission results by more than 2.1. In a second phase, this conformity factor will be reduced to 1.43 by January 2020 for all new models (January 2021 for all new vehicle registrations).

Furthermore, the WLTP ties in with European Regulation 2009/443 to set manufacturer-specific targets according to a limit-value line, proportional to the sales-weighted average mass of their fleet and a target of fleet-wide sales weighted average $CO_2$ emissions from passenger cars to 95 g $CO_2$/km for 2021.

Strategies for meeting current emissions standards for heavy-duty diesel engines typically adopt an exhaust system architecture comprising a series of catalysed substrates and injectors. In an exhaust system known from e.g. WO 03/054364 or US patent publication no. 6125629, in order from upstream to downstream (upstream being relative to an engine connected or connectable to the exhaust system), the exhaust system comprises a first injector for urea (i e ammonia precursor), a first selective catalytic reduction (SCR) catalyst, a diesel oxidation catalyst (DOC), a catalysed soot filter (CSF, i.e. a catalysed diesel particulate filter (DPF)), a second injector for urea, one or more second SCR catalyst and an ammonia slip (ASC) catalyst, also known as an ammonia oxidation (AMOX) catalyst. In practical systems, this exhaust system may also include a hydrocarbon fuel injector for injecting hydrocarbon fuel into exhaust gas between the first SCR catalyst and the DOC.

Oxidation catalysts for compression ignition internal combustion engines typically contain one or more platinum group metals. The specific platinum group metal(s) selected for inclusion in an oxidation catalyst will depend on a variety of factors, such as reactivity toward specific pollutants and under differing exhaust gas conditions, cost, durability at high temperatures, chemical compatibility with the support material and any other components of the catalyst, and susceptibility to poisoning by impurities. For example, platinum (Pt) and palladium (Pd) are each able to oxidise carbon monoxide (CO) and hydrocarbons (HCs) in an exhaust gas from a compression ignition engine. Palladium is more susceptible to poisoning by sulfur in fuel compared to platinum but has greater thermal durability.

The function of the DOC during normal operation is to control CO and HC emissions, to promote the conversion of NO to $NO_2$ for downstream passive filter regeneration (the combustion of particulate matter held on a filter in $NO_2$ at lower exhaust gas temperatures than in $O_2$ in the exhaust gas, i.e. the so-called CRT® effect), as well as acting as an exotherm generation catalyst during an active CSF regeneration step involving the injection of hydrocarbon fuel into exhaust gas upstream of the DOC and the combustion of the injected hydrocarbon fuel on the DOC thus generating an exotherm for heating the downstream CSF. For the avoidance of doubt, the fuel injection/exotherm generation event does not take place during normal operation: normal operation is considered to be the period between fuel injection/ exotherm generation events (see the C. Ruehl et al paper discussed hereinbelow). The CSF controls particulate matter (PM) emissions and promotes the NO→NO$_2$ conversion to enhance performance of the second SCR catalyst. Urea, a precursor of ammonia, is injected upstream of the first SCR catalyst and downstream of the CSF and mixed with the exhaust gas. NO$_x$ is converted over the SCR catalysts via reaction with ammonia (NH$_3$), and the unreacted NH$_3$ is oxidized over the ammonia slip catalyst (ASC)/AMOX catalyst.

SCR catalysts are designed to catalyse the reduction of NO$_x$ selectively using a nitrogenous reductant, typically NH$_3$ which may be derived from an ammonia precursor such as urea, which reductant is injected into a flowing exhaust gas upstream from the SCR catalyst in an amount to promote the principal NO$_x$ reduction reactions of:

$$4NH_3 + 4NO + O_2 \rightarrow 4N_2 + 6H_2O; \tag{1}$$

$$4NH_3 + 2NO_2 + O_2 \rightarrow 3N_2 + 6H_2O; \text{ and} \tag{2}$$

$$NO + NO_2 + 2NH_3 \rightarrow 2N_2 + 3H_2O \text{ (the preferred so-called "fast SCR reaction")}. \tag{3}$$

It will be understood that each of reactions (1)-(3) can occur in parallel, but the kinetically fastest reaction will be favoured. Therefore, in an exhaust gas containing a NO$_2$:NO$_x$ ratio of 0.5, the kinetically favoured fast SCR reaction dominates. For most, but not all, applications, some level of exhaust gas recirculation (EGR) is used to reduce engine-out NO$_x$ to a level that could then be reduced further by urea-SCR aftertreatment. A DPF is needed to reduce the increased engine-out PM emissions that occur due to the use of EGR, as well as to ensure compliance with the Euro VI particulate number emission limit. Using high efficiency SCR, some Euro VI engines can reduce the use of EGR—for instance through part-time and/or uncooled EGR—or to eliminate EGR entirely. This has led to three main Euro VI engine strategies:
1. Cooled EGR+SCR,
2. Hot (uncooled) EGR+SCR, and
3. SCR only.

Using these strategies, typical heavy-duty engine-out emissions are about 60 ppm CO and about 10 ppm unburned hydrocarbon fuel. However, all such systems include diesel particulate filters. Diesel particulate matter filter systems for vehicles involve the interaction of filter materials with regeneration techniques. "Regeneration" is the selected method of combusting diesel particulate matter held on a filter. Regeneration is conducted infrequently, but the period between regeneration events is dependent on several factors including engine design, filtration efficiency during normal operation, engine load during normal operation etc. According to a recent paper, empiric regeneration frequencies for heavy-duty diesel trucks varied from 3-100 hours and 23-4078 miles (see C. Ruehl et al, Environ. Sci. Technol, 2018, 52(10), pp 5868-5874).

Regeneration techniques can be broadly divided into the categories of passive, active and combinations of both passive and active. In passive systems, the oxidation temperature of the particulate matter is lowered to a level where the filter can be auto-regenerated during regular vehicle operation. Examples of such passive systems include catalysing the filter medium; addition of a catalyst fuel additive so that the particulate matter on the filter includes in its composition catalyst for promoting soot combustion; and generating nitrogen dioxide (NO$_2$) upstream of the filter for combusting the particulate matter held on the filter: particulate matter combusts in NO$_2$ at lower temperatures than in oxygen. This is the so-called CRT® effect (see e.g. EP0341832).

Active systems actively trigger filter regeneration by raising the temperature of particulate matter trapped in the filter. In practice, this can be done on a vehicle by combusting hydrocarbon fuel already carried on the vehicle and/or by electric heating. Two methods for combusting fuel include in-cylinder engine management methods, such as late-cycle injection of additional fuel; or injection and combustion of fuel in the exhaust gas, i.e. after the exhaust gas has exited the engine cylinder itself.

In passive-active systems, the "passive" filter catalyst or upstream (CRT® effect-promoting) NO oxidation catalyst etc. allows active regeneration to be performed at lower exhaust gas temperatures and/or for shorter durations compared to non-catalytic active systems. In either case, the fuel economy penalty associated with active regeneration can be minimized (at an added cost of the catalyst). Regeneration at a lower temperature can also lower thermal stress and increase the lifespan of the filter.

An exhaust system featuring a first nitrogenous reductant injector and a first selective catalytic reduction catalyst (SCR) disposed downstream from the first nitrogenous reductant injector and a separate, second nitrogenous reductant injector disposed downstream from the first SCR catalyst and, downstream from the second nitrogenous reductant injector, a second SCR catalyst, is known from Applicant's WO 03/054364 or US patent publication no. 6125629. EP 2230001A1 discloses an exhaust system comprising a first, close-coupled SCR catalyst, a second SCR catalyst, an AMOX catalyst and a fuel injector upstream of a DOC and DPF, wherein the fuel injector injects fuel for combustion on the DOC for generating an exotherm on the downstream DPF.

A substrate comprising an ASC/AMOX catalyst as such is known from US patent publication no. 2010/0058746 and Applicant's WO2015/017516A2. WO2010/062730A1 discloses a single substrate comprising integrated SCR and AMOX catalysts.

A problem with exhaust systems comprising two separate SCR catalysts is controlling the appropriate delivery of nitrogenous reductant to each SCR catalyst so that the system as a whole is able to meet the emission standard for NO$_x$ by promoting the catalytic reduction of NO$_x$ to N$_2$ using the nitrogenous reductant, but at the same time avoiding problems associated with over supply of nitrogenous reductant. If too little nitrogenous reductant is provided, the system as a whole could fail the emission standard for NO$_x$. However, if too much nitrogenous reductant is provided to SCR catalysts in the system, there can be problems with preventing ammonia from being emitted to atmosphere; ammonia has an unpleasant smell and is an irritant to animal mucosal surfaces, such as the eyes, nose and lungs. Whilst it is known to oxidatively remove excess ammonia using an ASC/AMOX catalyst, the oxidation of NH$_3$ over such ASC/AMOX catalysts is not 100% selective and undesired by-products can result, such as the over-oxidation to NO$_x$, which reduces the net reduction of NO$_x$, i.e. the amount of NO$_x$ converted between the system inlet ad the system outlet; or even N$_2$O, which is a powerful "Greenhouse" gas. Over-provision of nitrogenous reductant to SCR catalysts in the system also inefficiently uses the supply of nitrogenous reductant or its precursor, requiring more frequent replenishment thereof.

A particular problem for controlling nitrogenous reductant addition for $NO_x$ conversion in systems comprising two separate, i.e. upstream and downstream, injector/SCR catalysts is where nitrogenous reductant slips from the upstream SCR catalyst and travels downstream to the downstream SCR catalyst. This can occur when a driver unexpectedly "lifts off" from the accelerator pedal so that reductant delivery cannot react quickly enough by feedback mechanisms etc. to shut off the provision of nitrogenous reductant to the upstream SCR catalyst. In this case, the problem of calibrating nitrogenous reductant provision to the downstream SCR catalyst via the downstream injector is complicated because it is difficult to predict how much nitrogenous reductant is slipping in real-time from the upstream SCR catalyst to dynamically react and adjust the quantity of nitrogenous reductant addition to the downstream SCR catalyst. For example, some NOR sensors are unable to distinguish between $NH_3$ and $NO_x$. The result can be the over-provision of nitrogenous reductant to the downstream SCR catalyst, i.e. slipped nitrogenous reductant from the upstream SCR catalyst combining with the "normal" provision of nitrogenous reductant to the downstream SCR catalyst via the downstream injector controlled according to pre-programmed engine speed/load mapping and used to predict required reductant injection at a particular location in the "map".

Additionally, as explained hereinabove, there is a desire to generate $NO_2$ from NO in exhaust gas upstream from a CSF and downstream SCR catalyst thereby to promote the CRT® effect of soot combustion on the filter; and the fast SCR reaction on the downstream SCR catalyst (see reaction (3) hereinabove). In this regard, if the removal of $NO_x$ through a combination of the upstream SCR catalyst and ASC/AMOX catalyst is too successful and results in little or no $NO_x$ remaining in exhaust gas contacting a downstream NO oxidation catalyst, there may be practically no benefit to including the downstream NO oxidation catalyst in the system design. For this reason, injection of nitrogenous reductant or its precursor upstream from the upstream first SCR catalyst can be controlled so that an ammonia-to-NOR ratio ("ANR")—see reactions (1)-(3) hereinabove for the stoichiometry of the reactions—in exhaust gas contacting the upstream first SCR catalyst is relatively low, e.g. 0.4 to 0.6, to allow some $NO_x$ to "slip" the ASC/AMOX catalyst for oxidation to $NO_2$ downstream from the ASC/AMOX catalyst for promotion of the downstream reactions. In this regard, Applicant's WO 2018/183658 discloses a composite integrated ASC/AMOX catalyst and oxidation catalyst for promoting (i) the removal of e.g. $NH_3$ on the one hand; and (ii) the oxidation of NO to $NO_2$ to promote downstream processes on the other hand.

Applicant's U.S. provisional patent application No. 62/946,070 filed on 10 Dec. 2019 and having the internal reference no. P100422US01 is titled "Zoned ammonia slip catalyst for improved selectivity, activity and poison tolerance".

Platinum group metals as commodities are relatively rare, naturally occurring metallic chemical elements of high economic value relative to industrial base metals, such as copper. Shortly before the filing date of this specification, the spot price on the London Metal Exchange for copper was US $6,509 per tonne, whereas the London Bullion Market Association spot price for platinum was US $889 per ounce, equivalent to US $31,359 per tonne (there are 35,274 ounces in a metric tonne). However, the corresponding spot price for palladium was US $2,348 per ounce. That is, by weight, palladium is presently over two-and-one-half times the cost of platinum. There is therefore a general interest in reducing the quantity of palladium in diesel oxidation catalysts relative to platinum and, if possible, to reduce the quantity of platinum group metals in diesel oxidation catalysts by suitable promotion with less costly metallic elements.

SUMMARY OF THE INVENTION

The inventors have surprisingly found that by arranging, in certain configurations, a first washcoat layer comprising one or more platinum group metal components, a second washcoat layer comprising one or more platinum group metal components, wherein a total platinum group metal loading in the first catalyst washcoat layer defined in grams of platinum group metal per cubic foot of substrate volume ($g/ft^3$) is different from the total platinum group metal loading in the second catalyst washcoat layer, and a washcoat layer comprising an aluminosilicate zeolite including copper, iron and/or manganese, which is active for catalysing the reduction of oxides of nitrogen with a nitrogenous reductant, a composite catalyst can be provided with at least two functions including ammonia oxidation (AMOX) and nitric oxide oxidation. Such composite catalyst can be used in an exhaust system downstream from a first nitrogenous reductant injector and downstream first SCR catalyst and upstream from exhaust system components that are more active in increased inlet $NO_2/NO_x$ ratios, such as a filter—using the CRT® effect—or a second SCR catalyst—benefitting from the fast SCR reaction at (3) hereinabove.

The composite oxidation catalyst of the invention improves on previous designs by being potentially less complicated to manufacture and which reduces or avoids the abovementioned problems encountered in exhaust systems comprising two, separate substrates comprising a SCR catalyst, such as is described in each of WO 03/054364 or U.S. Pat. No. 6,125,629. That is, in its most basic configurations, the invention has two principal catalytic functions: the removal of slipped nitrogenous reductant, particularly ammonia, at relatively high selectivity, indicated by relatively low rates of $N_2O$ formation; and the oxidation of nitric oxide (NO) to nitrogen dioxide ($NO_2$). Composite oxidation catalysts of the invention can also allow more compact canning or packaging arrangements of exhaust aftertreatment systems for use on a vehicle, which is important where space to accommodate multiple catalytic converters is limited.

In preferred designs, by appropriate location of washcoats including higher PGM loadings, particularly those including alkaline earth metals such as barium, at the inlet end of the substrate monolith, the composite oxidation catalysts of the invention can additionally function to generate an exotherm from injected hydrocarbon fuel for use in active regeneration systems or active-passive regeneration systems. In these designs, the washcoat overlayer comprising an aluminosilicate zeolite including copper, iron and/or manganese can additionally improve the durability of the PGM-facilitated exotherm-generating function of the composite oxidation catalyst to withstand phosphorus and/or zinc poisoning derived from engine lubricants as well as promoting the ASC/AMOX function.

Certain designs can reduce costs by limiting the relative quantities of palladium in the composite oxidation catalyst according to the invention relative to platinum. The invention also relates to exhaust systems comprising such composite catalysts and to an apparatus comprising a compression ignition engine, especially a vehicular heavy-duty diesel engine, connected to such an exhaust system and vehicles comprising such apparatus.

According to a first aspect, the invention provides a composite, zone-coated, dual-use ammonia and nitric oxide oxidation catalyst for use in an exhaust system for treating an exhaust gas produced by a vehicular compression ignition internal combustion engine, preferably for a heavy-duty diesel vehicle, which exhaust gas also including ammonia, which composite oxidation catalyst comprising: a substrate having a total length L and a longitudinal axis and having a substrate surface extending axially between a first substrate end and a second substrate end; two or more catalyst washcoat zones comprised of a first catalyst washcoat layer comprising a refractory metal oxide support material and one or more platinum group metal components supported thereon and a second catalyst washcoat layer different from the first catalyst washcoat layer and comprising a refractory metal oxide support material and one or more platinum group metal components supported thereon, which two or more catalyst washcoat zones being arranged axially in series on and along the substrate surface, wherein a first catalyst washcoat zone having a length $L_1$, wherein $L_1<L$, is defined at one end by the first substrate end and at a second end by a first end of a second catalyst washcoat zone having a length $L_2$, wherein $L_2<L$, wherein the first catalyst washcoat zone comprises a first refractory metal oxide support material and one or more platinum group metal components supported thereon; and the second catalyst washcoat zone comprises a second refractory metal oxide support material and one or more platinum group metal components supported thereon; and a washcoat overlayer extending axially from the first substrate end for up to 200% of the axial length of the underlying first catalyst washcoat layer, which washcoat overlayer comprising a particulate metal oxide loading of >0.8 g/in$^3$, wherein the particulate metal oxide is an aluminosilicate zeolite including at least one of copper, iron and manganese, wherein a total platinum group metal loading in the first catalyst washcoat zone defined in grams of platinum group metal per cubic foot of substrate volume (g/ft$^3$) is different from the total platinum group metal loading in the second catalyst washcoat zone.

The product as claimed can also be labelled with an indication that the first substrate end should be oriented to the upstream side when used in any of the second to fifth invention aspects set out hereinbelow.

It will be understood that the feature that determines the axial length of a catalyst washcoat zone is the platinum group metal loading in grams of platinum group metal per cubic foot of substrate volume (g/ft$^3$). Typically, a platinum group metal loading at any point along the axial length of a catalyst washcoat zone varies by no more than +/−20% from a mean average along the axial length of the zone as a whole, optionally +/−15% such as +/−10%. Localised platinum group metal loading can be determined by X-Ray Fluorescence (XRF) or Electron Probe Micro Analysis (EPMA).

According to a second aspect, the invention provides an exhaust system for a vehicular compression ignition engine for treating an exhaust gas comprising inter alia oxides of nitrogen ($NO_x$), which exhaust system comprising a composite oxidation catalyst according to any one of the preceding claims, a first injector for a nitrogenous reductant or a precursor thereof connected to a source of nitrogenous reductant or nitrogenous reductant precursor, which first injector being arranged to inject the nitrogenous reductant or nitrogenous reductant precursor into a flowing exhaust gas upstream from the composite oxidation catalyst and a first substrate comprising a selective catalytic reduction catalyst disposed between the first injector for a nitrogenous reductant or a precursor thereof and the composite oxidation catalyst, wherein the first substrate end of the composite oxidation catalyst is oriented to an upstream side.

When in use in an exhaust system according to the second aspect of the invention, design of the composite oxidation catalyst according to the invention is influenced by a number of—sometimes competing—functions. In principle, when in use, the composite oxidation catalyst functions to catalyse the following reactions: (i) selective catalytic reduction of $NO_x$ with nitrogenous reductant, e.g. $NH_3$; (ii) oxidation of $NH_3$; and (iii) oxidation of NO to $NO_2$, indicated by higher $NO_2/NO_x$ detected at the outlet of the composite oxidation catalyst. Reactions (i) and (ii) should be done as selectively as possible to reduce or avoid formation of $N_2O$.

In embodiments where the first catalyst washcoat zone includes a relatively high loading of platinum group metal and optionally alkaline earth metal, the composite oxidation catalyst can also function (iv) as an exotherm generating catalyst for heating a downstream exhaust system filter component. In order to catalyse reaction (iii), injection of nitrogenous reductant needs to be controlled to an ammonia-to-$NO_x$ ratio (ANR) so that some $NO_x$ is slipped from an upstream SCR catalyst and/or the SCR catalyst of the washcoat overlayer for oxidation on the platinum group metal-containing washcoat layers at the outlet end of the substrate not covered by the washcoat overlayer.

From Examples 1 to 4 hereinbelow it can be seen that reaction (iii) is influenced by the length of the SCR catalyst washcoat overlayer and the loading of the SCR catalyst washcoat overlayer: the longer the SCR catalyst washcoat overlayer (i.e. the shorter the exposed PGM-containing catalyst washcoat layer uncoated by the overlayer at the outlet end) generally the lower the $NO_2/NO_x$ at the composite oxidation catalyst outlet and vice versa; and the higher the washcoat loading in the SCR catalyst washcoat overlayer, the lower the $NO_2/NO_x$ at the composite oxidation catalyst outlet and vice versa. Also, the exotherm generating activity of function (iv) is negatively affected by higher washcoat loadings of the SCR catalyst washcoat overlayer and vice versa. However, initial indications are that higher washcoat loadings in the SCR catalyst washcoat overlayer positively influence to lower $N_2O$ is obtained in reactions (i) and (ii), whereas shorter washcoat overlayer axial lengths can undesirably promote formation of $N_2O$.

That is, there appears to be design balance between ANR, SCR activity, NO oxidation requirement and $N_2O$ formation. The claimed invention seeks to cover the plausible area of interaction between the design variables to achieve this balance.

According to a third aspect, the invention provides an apparatus comprising a compression ignition internal combustion engine for a heavy-duty diesel vehicle and an exhaust system according to the second invention aspect, wherein the first substrate end of the composite oxidation catalyst is oriented to an upstream side.

According to a fourth aspect, the invention provides a heavy-duty diesel vehicle comprising an apparatus according to the third invention aspect, i.e. any relevant local definition of heavy-duty vehicle as set out hereinbelow. So, for example, where the present application is being prosecuted in the United States, the definition of heavy-duty vehicle appropriate to the United States from the background section hereinabove shall apply. Similarly, where the application is being prosecuted before the European Patent Office, the definition of heavy-duty vehicle for the EU from the background section hereinabove shall apply etc.

According to a fifth aspect, the invention provides the use of a composite oxidation catalyst according to the first invention aspect for oxidising ammonia in an exhaust gas flowing in an exhaust system of a vehicular compression ignition internal combustion engine and for oxidising nitric oxide (NO) in the exhaust gas to nitrogen dioxide ($NO_2$), which exhaust system comprising a first injector for a nitrogenous reductant or a precursor thereof connected to a source of nitrogenous reductant or nitrogenous reductant precursor, which first injector being arranged to inject the nitrogenous reductant or nitrogenous reductant precursor into a flowing exhaust gas upstream from the composite oxidation catalyst, a first substrate comprising a selective catalytic reduction catalyst disposed between the first injector and the composite oxidation catalyst and a second substrate comprising a selective catalytic reduction catalyst disposed downstream from the composite oxidation catalyst, wherein the first substrate end of the composite oxidation catalyst is oriented to an upstream side, which NO oxidation promotes selective catalytic reduction on the second substrate downstream so that the exhaust system overall meets the prevailing emission standard for $NO_x$.

According to a sixth invention aspect, the invention provides the use a composite oxidation catalyst according to the first invention aspect for oxidising ammonia in an exhaust gas flowing in an exhaust system of a vehicular compression ignition internal combustion engine and for oxidising nitric oxide (NO) in the exhaust gas to nitrogen dioxide ($NO_2$), which exhaust system comprising a first injector for a nitrogenous reductant or a precursor thereof connected to a source of nitrogenous reductant or nitrogenous reductant precursor, which first injector being arranged to inject the nitrogenous reductant or nitrogenous reductant precursor into a flowing exhaust gas upstream from the composite oxidation catalyst, a first substrate comprising a selective catalytic reduction catalyst disposed between the first injector and the composite oxidation catalyst and a third substrate comprising a filter disposed downstream from the composite oxidation catalyst, wherein the first substrate end of the composite oxidation catalyst is oriented to an upstream side, which NO oxidation promotes combustion of particulate matter held on the downstream third substrate filter so that the exhaust system overall meets the prevailing emission standard for particulate matter.

Methods of making a composite oxidation catalyst, optionally the composite oxidation catalyst according to the first invention aspect, for use in an exhaust system for treating an exhaust gas produced by a vehicular compression ignition internal combustion engine are also described herein.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

In particular, Applicant believes that the combination of the washcoat overlayer SCR catalyst and the PGM-containing underlayer promotes some or all of the following reactions:

In the washcoat overlayer SCR catalyst:

$$4NH_3 + 4NO^* + O_2 \rightarrow 4N_2 + 6H_2O; \tag{1}$$

$$4NH_3 + 2NO_2^* + O_2 \rightarrow 3N_2 + 6H_2O; \text{ and} \tag{2}$$

$$NO^* + NO_2^* + 2NH_3 \rightarrow 2N_2 + 3H_2O \tag{3}$$

In the underlying first catalyst washcoat layer/zone:
(1) $4NH_3 + 4NO^* + O_2 \rightarrow 4N_2 + 6H_2O$;
(2) $4NH_3 + 2NO_2^* + O_2 \rightarrow 3N_2 + 6H_2O$;

$$NO^* + NO_2^* + 2NH_3 \rightarrow 2N_2 + 3H_2O; \tag{3}$$

$$NO + \tfrac{1}{2}O_2 \rightarrow NO_2; \text{ and} \tag{4}$$

$$4NH_3 + O_2 \rightarrow 4NO + H_2O. \tag{5}$$

NO and $NO_2$ in reactions (1)-(3) indicated with an asterisk (*) can be present in inlet exhaust gas or generated from reactions (4) and (5).

Figure 1:
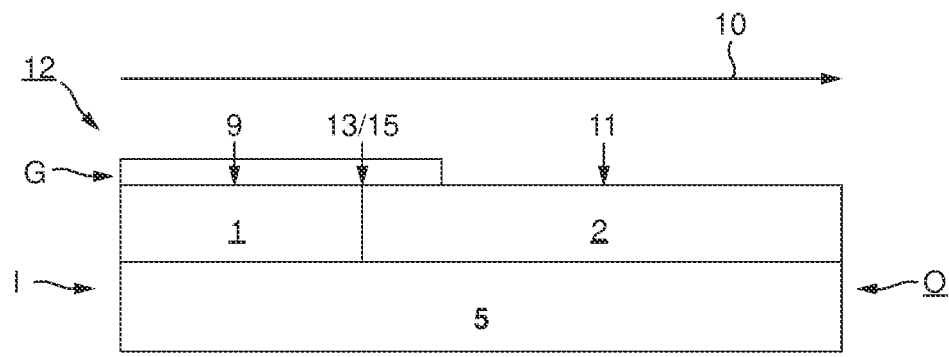
FIG. 1 shows a composite oxidation catalyst (12) according to the invention comprising a first catalyst washcoat zone (1) comprised of a first catalyst washcoat layer and disposed at an inlet end (I) of a flow-through honeycomb substrate monolith (5) having a total length L, a second catalyst washcoat zone (2) adjacent to the first catalyst washcoat zone (1) comprised of a second catalyst washcoat layer disposed at an outlet end (O) of the substrate (5), which first and second catalyst washcoat zones are disposed in series on and along a surface of the substrate and a washcoat overlayer (G) extending axially from the inlet end for up to 200% of the axial length of the underlying first catalyst washcoat layer and comprising a selective catalytic reduction-active aluminosilicate zeolite including at least one of copper, iron and manganese. That is, when in use, the substrate of the composite oxidation catalyst is oriented so that exhaust gas from the engine enters the composite oxidation catalyst first via the inlet (or upstream) end (I) and exits the composite oxidation catalyst via the outlet (or downstream) end (O) and the exhaust gas flow is in the direction indicated by the arrow at reference numeral 10. This same orientation and order of contacting the composite oxidation catalyst with exhaust gas is applied across all embodiments disclosed in the FIGS. 1 to 5 and 9 inclusive and described herein.

The composite oxidation catalyst of FIG. 1 can be made by coating substrate (5) along its entire axial length L with a first catalyst washcoat layer comprising a first refractory metal oxide support material and an aqueous solution of one or more platinum group metal salts, drying and firing the coated part; and then impregnating a portion only of the substrate coated with the first catalyst washcoat layer to a length $L_1$, wherein $L_1 < L$, with an aqueous solution of a relatively high concentration of one or more platinum group metal and optionally one or more alkaline earth metal components to form a first catalyst washcoat zone (1), wherein the second catalyst washcoat (2) comprises the unimpregnated first catalyst washcoat layer. Alternatively, the first catalyst washcoat layer itself can comprise one or more alkaline earth metal components rather than such alkaline earth metal components being present in the impregnation medium. Of course, alkaline earth metal components can also be present in both the impregnation medium and the first catalyst washcoat layer. For an explanation of "impregnation" techniques, see hereinbelow. The arrangement is such that, in the finished product, the portion of the first catalyst washcoat layer having length $L_1$ can comprise two or more supported platinum group metal components comprising both platinum and palladium.

Alternatively, the composite oxidation catalyst shown in FIG. 1 can be obtained or is obtainable by coating the substrate (5), in either order, from a first end thereof with a first catalyst washcoat layer for forming the first washcoat catalyst zone and comprising a first refractory metal oxide support material, one or more platinum group metal component such a platinum only or a combination of both platinum and palladium, e.g. platinum and palladium are the only platinum group metal components, and one or more alkaline earth metal components for an axial length $L_1$ (see the item labelled 9 in FIG. 1); and with a second, different catalyst washcoat layer comprising a second refractory metal oxide support material and one or more second platinum group metal and optionally one or more second alkaline earth metal components for forming a second oxidation catalyst zone (see the item labelled 11) for an axial length $L_2$ such that a second end (13) of the first catalyst washcoat layer (9) and a first end (15) of the second (11) catalyst washcoat layer abut one another without there being substantially any overlap between the first and second washcoat layers. In the latter method of making the embodiment of FIG. 1, it will be understood that the axial length of the first catalyst washcoat zone $L_1$ is the same, or is substantially the same, as the axial length of the first catalyst washcoat layer (9); and the axial length of the second catalyst washcoat zone $L_2$ is the same, or is substantially the same, as the axial length of the second catalyst washcoat zone $L_2$.

The FIG. 1 embodiment and each of the embodiments shown in FIGS. 2 to 5 and 9 inclusive include a porous washcoat overlayer overlying the first catalyst washcoat zone (1) a washcoat overlayer extending axially from the first substrate end for up to 200% of the axial length of the underlying first catalyst washcoat layer, which washcoat overlayer comprising a particulate metal oxide loading of >0.8 g/in$^3$, wherein the particulate metal oxide is an aluminosilicate zeolite including at least one of copper, iron and manganese. The overlayer promotes oxidation of nitrogenous reductant and the simultaneous reduction of NO$_x$ according to the mechanism shown in FIG. 1 of US patent publication no. 2010/0058746 (incorporated herein by reference; see also hereinbelow). Furthermore, the overlayer can function as a "guard bed" to reduce or prevent the first catalyst washcoat zone from becoming poisoned by phosphorus and/or zinc deposits derived from lubricant additives such as ZDDP or ZDTP. The overlayer feature ("G") is shown in each of the embodiments of FIGS. 1 to 5 and 9 inclusive.

Figure 2:
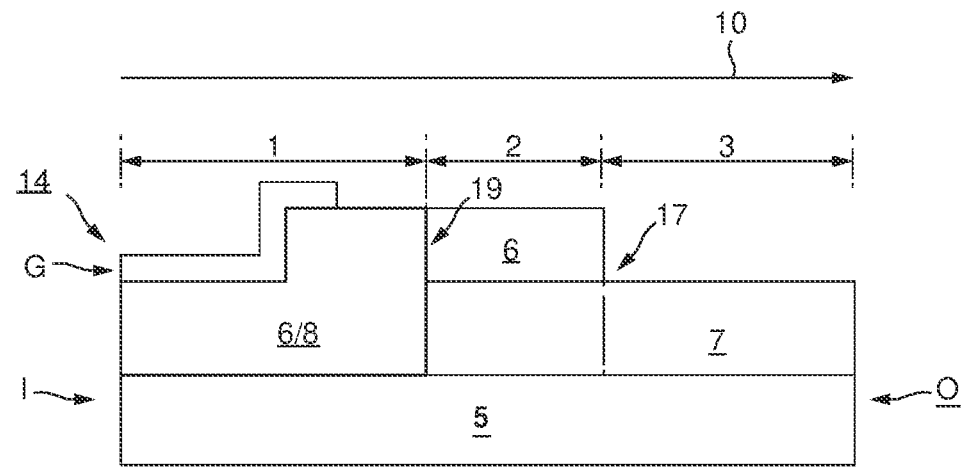
Figure 3:
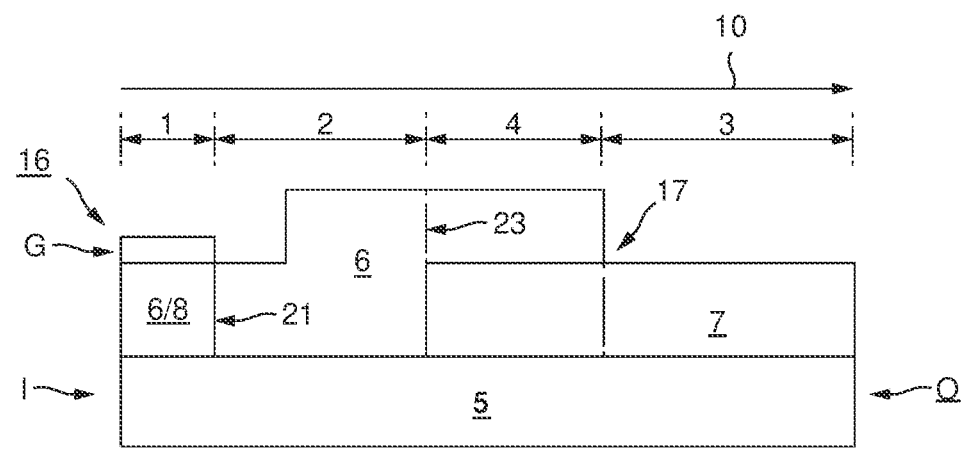

FIGS. 2 and 3 show composite oxidation catalysts (14, 16 respectively) according to the invention based on the same principle of manufacture, i.e. a second catalyst washcoat layer (7) is applied from a second end—corresponding to the outlet end (O)—of substrate (5) for an axial length $L_4$ less than a total axial length L (i.e. $L_4$<L) of a flow-through honeycomb substrate monolith (5). The second catalyst washcoat layer comprises a second refractory metal oxide support material and one or more platinum group metal component and optionally one or more second alkaline earth metal components. The substrate coated with the second catalyst washcoat layer (7) is then itself coated with a first catalyst washcoat layer (6) from the opposite end of substrate (5)—corresponding to the inlet or first substrate end (I)—to that from which the second catalyst washcoat layer was coated onto the substrate (5). The first catalyst washcoat layer comprises a first refractory metal oxide support material and one or more platinum group metal component and optionally one or more first alkaline earth metal components. The axial coating length ($L_3$) of the first catalyst washcoat layer (6) is less than the total axial substrate length L but is long enough to overlap the length ($L_4$) of the second catalyst washcoat layer (7), creating a region where the first (6) and second (7) catalyst washcoat layers are present in a two-layer construct: in other words, a "zone". The axial length of the zone of overlap of the first washcoat layer and the second washcoat layer can be defined as "$L_5$" and is shown as "2" in FIG. 2, i.e. the second washcoat catalyst zone; and as "4" in FIG. 3, i.e. the fourth washcoat catalyst zone.

It can be seen that the zone of length $L_5$ comprising the overlap of the first (6) and second (7) catalyst washcoat layers comprises a sum total of that quantity of one or more platinum group metal and optionally one or more alkaline earth metal present in both the first catalyst washcoat layer (6) and the second (7) catalyst washcoat layer in the region of the overlap. It can also be seen that because the overlap region of the first (6) and second (7) catalyst washcoat layers represents a zone of its own, the zone (labelled 3 in both FIGS. 2 and 3) comprising a single layer of the second catalyst washcoat layer (7) defined at a first end (17) by a second (downstream or outlet) end of the overlap region of the first (6) and second (7) catalyst washcoat layers and at a second end by the second substrate end (or outlet end (O)) will have a lower total platinum group metal loading than the immediately preceding, adjacent upstream overlap zone (zone 2 in FIG. 2; and zone 4 in FIG. 3).

In the arrangement shown in FIG. 2, the zone of overlap of the first (6) and second (7) catalyst washcoat layers is a second catalyst washcoat zone (labelled 2 in FIG. 2). A portion of the total length of the first catalyst washcoat layer (6), which is a first catalyst washcoat zone (labelled 1) and defined at a first end by the inlet/first substrate end (I) and at a second end by a first (upstream, i.e. nearest the inlet end) end (19) of the second catalyst washcoat zone (2), which point corresponding also to the first or upstream end of the second catalyst washcoat layer (7) can comprise a greater total platinum group metal loading (in g/ft$^3$) than the second catalyst washcoat zone (2). It can also be seen that because zone 2 shown in FIG. 2 comprises an overlap of the first (6) and the second (7) washcoat layers, that the axial length $L_3$ of the first catalyst washcoat layer (6) is equivalent to the sum of the axial lengths of the first (1) and second (2) catalyst washcoat zones. Also, the length of the first catalyst washcoat layer (6) present in the first washcoat zone (1) is the total length of the catalyst washcoat layer 6 less the length of the first washcoat layer present in the overlap zone 2, i.e. $L_5$.

In embodiments wherein the total platinum group metal loading in the first catalyst washcoat zone is greater than a total platinum group metal loading in the second catalyst washcoat zone, the feature of the total platinum group metal loading in the first catalyst washcoat zone (1) being greater than the total platinum group metal loading in the second catalyst washcoat zone (2) in each of the embodiments shown in FIGS. 2-5 inclusive can be obtained by impregnating a desired length (8) ($L_1$) of the underlying first catalyst washcoat layer (6) with a relatively high concentration of platinum group metal salts in, e.g. an aqueous solution thereof and optionally also containing aqueous salts of one or more alkaline earth metal. "Impregnation" is a method known in art by the skilled person and is disclosed, e.g. in "Catalytic Air Pollution Control—Commercial Technology", 3$^{rd}$ Edition, Ronald M. Heck et al., John Wiley & Sons, Inc. (2009) at paragraph 2.3. In FIG. 2, the axial length $L_1$ of the first catalyst washcoat zone (labelled 1) is substantially the length of the first catalyst washcoat layer (6) up to the point where the first catalyst washcoat layer (6) begins to overlap the second catalyst washcoat layer (7) at point 19.

Where it is intended that the first catalyst washcoat zone should include both platinum and palladium but the washcoat for forming the first catalyst washcoat layer (6) does not comprise one of platinum and palladium, wherein an impregnation medium is used, the impregnation medium should contain solute salts of palladium or platinum, whichever is not present in the first catalyst washcoat layer (6), so that the desired length (8) ($L_1$) of the underlying first catalyst washcoat layer comprises two or more supported platinum group metal components comprising both platinum and palladium. Of course, in any combination, the first catalyst washcoat layer itself can comprise platinum, palladium or both platinum and palladium; and separately the impregnation medium can comprise platinum, palladium or both platinum and palladium, i.e. the PGM content of the first catalyst washcoat layer and the impregnation medium can be the same or different, so long as the resulting desired length (8) ($L_1$) of the underlying first catalyst washcoat layer comprises two or more supported platinum group metal components comprising both platinum and palladium.

In embodiments where it is intended to include an alkaline earth metal in the first catalyst washcoat zone for promoting exotherm generation but the washcoat for forming the first catalyst washcoat layer (6) does not comprise one or more alkaline earth metal components, where an impregnation medium is used, the impregnation medium should contain salts of one or more alkaline earth metal. Of course, it is also possible for both the washcoat for forming the first catalyst washcoat layer (6) and the impregnation medium to contain one or more alkaline earth metal, in which case the or each alkaline earth metal or metals in the washcoat composition and in the impregnation medium can be the same or different.

The third catalyst washcoat zone (labelled 3) is defined at its second (or outlet (O)) end by the second substrate end and has an axial length $L_6$. A first end, i.e. nearest the first substrate (or inlet (I)) end, of the third catalyst washcoat zone (3) is defined hereinabove as (17).

It can be seen from the arrangement shown in FIG. 2 and as described hereinabove that each catalyst washcoat zone can be made up in part from a portion only of the axial length of a catalyst washcoat layer. Therefore, the underlying refractory metal oxide support material in a catalyst washcoat zone of which the catalyst washcoat layer is part. It follows that, where a catalyst washcoat zone comprises an overlap of catalyst washcoat layers, the refractory metal oxide support material in the catalyst washcoat zone formed from the overlap comprises the refractory metal oxide support in each of the catalyst washcoat layers present in the overlap. So, where the refractory metal oxide support material in a first catalyst washcoat layer in the overlap zone is different from the refractory metal oxide support material in the second catalyst washcoat layer, there will be two (or more) refractory metal oxide support materials in the overlap catalyst washcoat zone as a whole. Of course, it is also possible for an individual catalyst washcoat layer to comprise two or more different refractory metal oxide support materials, in which case a catalyst washcoat zone formed from a single layer of that catalyst washcoat layer will contain two or more different refractory metal oxide support materials. Similarly, where the refractory metal oxide support material is the same in each of the two catalyst washcoat layers which form a catalyst washcoat zone on the substrate by an overlap, there will be only one refractory metal oxide support material in that overlap catalyst washcoat zone.

The arrangement shown in FIG. 3 is similar to that shown in FIG. 2 and described hereinabove, except in that the axial length $L_1$ of the first catalyst washcoat zone (labelled 1) is a shorter length of the single layer of the first catalyst washcoat layer (6) formed, e.g. by impregnating a shorter length (8) of substrate (5) coated with the first catalyst washcoat layer (6) with the relatively high concentration of aqueous one or more platinum group metal salt(s) and optionally also salts of one or more alkaline earth metal. In this embodiment, a second catalyst washcoat zone (labelled 2) is defined at a first end, i.e. nearest the first substrate end or inlet, by a second end (21) of the first catalyst washcoat zone 1, e.g. the extent of the impregnation (8) of the first catalyst washcoat layer (6), and at a second end by a first end (23) of the overlap region of the first catalyst washcoat layer (6) with the underlying second catalyst washcoat layer (7) nearest the inlet end (I). Where present, the feature of a total platinum group metal loading in the first catalyst washcoat zone being greater than a total platinum group metal loading in the second catalyst washcoat zone is met by e.g. impregnating the underlying first catalyst washcoat layer, which comprises one or more platinum group metal components, with a relatively high concentration of one or more platinum group metals. Such impregnation medium can also include aqueous salts of one or more alkaline earth metals.

According to the invention definition, the third catalyst washcoat layer (labelled 3) is defined at its second (or outlet (O)) end by the second substrate end. Therefore, in the embodiment shown in FIG. 3, the zone comprised of the overlap of the first catalyst washcoat layer (6) and the second catalyst washcoat layer (7)—which is axially located between the second catalyst washcoat zone (2) and the third catalyst washcoat zone (3)—is numbered as the fourth catalyst washcoat zone and is labelled "4" in FIG. 3. It can be seen from FIG. 3 that the axial length of the first washcoat layer (6) is the sum of the axial lengths of the first (1), second (2) and fourth (4) catalyst washcoat zones. It can also be seen that the axial length of zone 2 is the total axial length $L_3$ of the first catalyst washcoat layer (6) less the axial length in both the overlap zone, zone 4, i.e. equivalent to $L_5$, and the length $L_1$ of the first catalyst washcoat zone 1. The axial length of zone 3 is defined at its second (outlet (O) or downstream end) by the second substrate end and has an axial length $L_6$.

Figure 4:
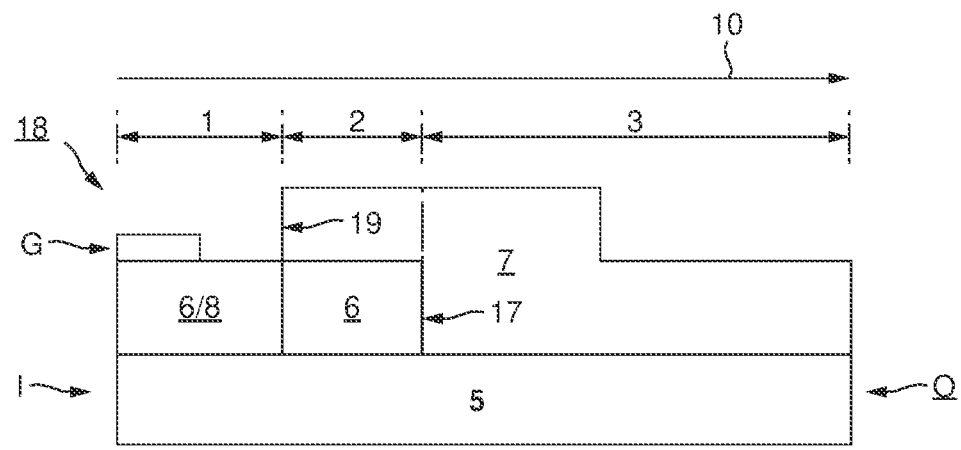
Figure 5:
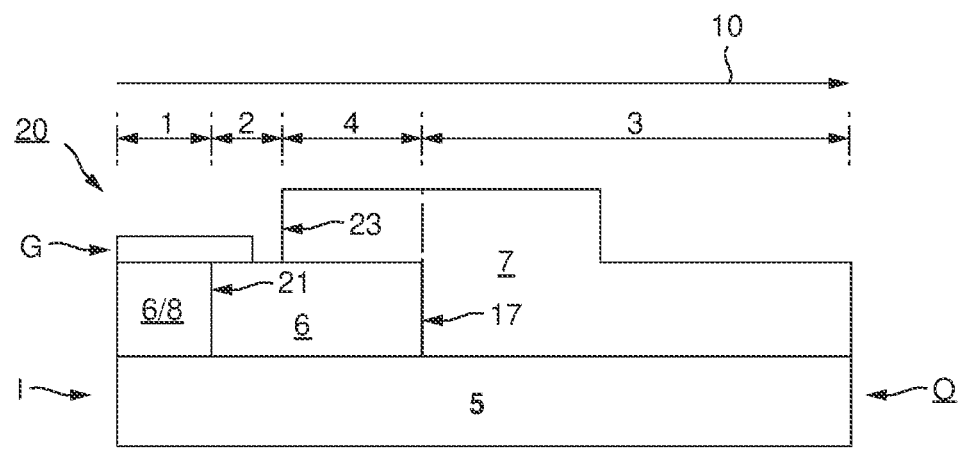

The arrangements shown in FIGS. 4 and 5 (composite oxidation catalysts 18 and 20 respectively) are similar to those shown in FIGS. 2 and 3 respectively, except in that in the embodiments shown in FIGS. 4 and 5, the first washcoat layer (6) comprising a first refractory metal oxide support material, one or more platinum group metal component and optionally one or more first alkaline earth metal component supported thereon, is coated onto the flow-through honeycomb substrate monolith (5) first from the inlet end (I) to a length $L_3$. The substrate coated with the first catalyst washcoat layer (6) is then itself coated with a second catalyst washcoat layer (7) (i.e. to a length where $L_4<1$) from the opposite end of substrate (5)—corresponding to the outlet end (O)—to that from which the first catalyst washcoat layer (6) was coated onto substrate (5). The axial coating length of the second catalyst washcoat layer (7) is less than the total axial substrate length L but is long enough to overlap the first catalyst washcoat layer (6), creating a region wherein the second (7) and first (6) catalyst washcoat layers are present in a two-layer zone. To avoid repetition, Applicant refers the reader to the explanations given hereinabove regarding the description of axial zone length, zone boundary definitions, total zone platinum group metal loading, zone refractory metal oxide support material description etc. by analogy.

Figure 6:
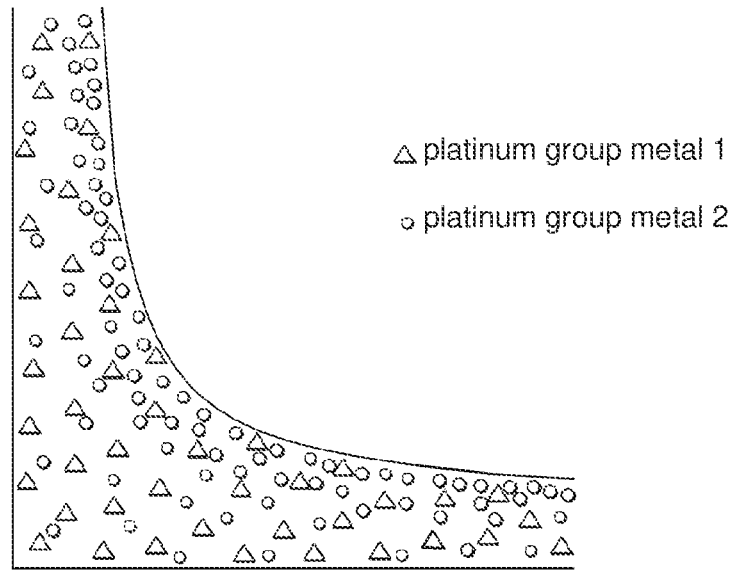

FIG. 6 is a schematic illustration of a single layer, such as a layer of the first catalyst washcoat zone, according to embodiments of the invention, which has a uniform or homogenous distribution of a first platinum group metal (e.g. platinum group metal 1 as represented by Δ) and a non-uniform (i.e. non-homogenous) distribution of a second platinum group metal (e.g. platinum group metal 2 as represented by ○).

Figure 7:
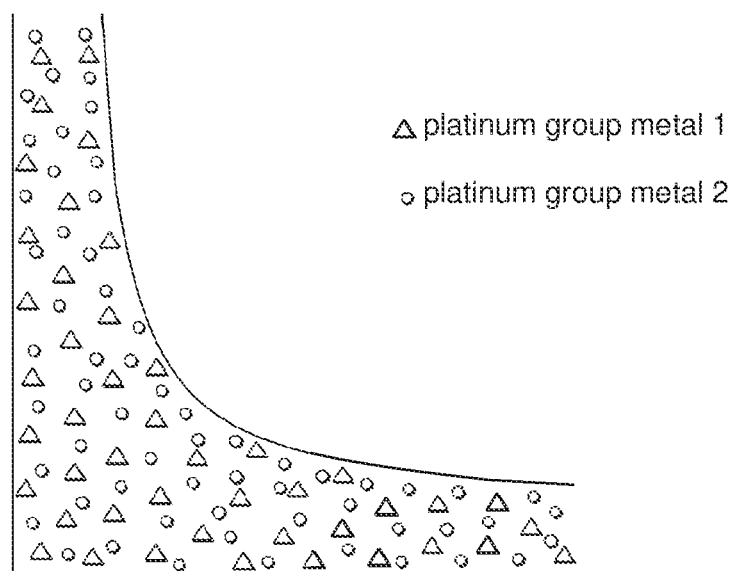

FIG. 7 is a schematic illustration showing the uniform distribution of two platinum group metals (e.g. platinum group metal 1 as represented by Δ and platinum group metal 2 as represented by ○) in embodiments of a single layer catalyst washcoat zone of the invention.

Figure 8A:
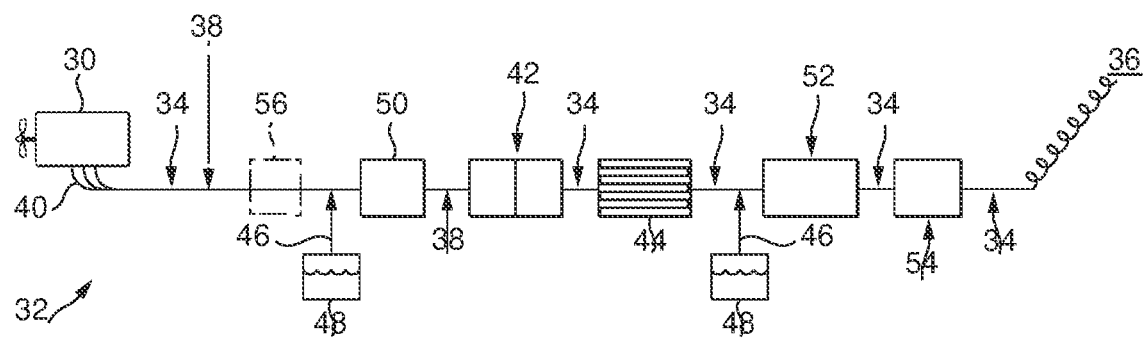
Figure 8B:
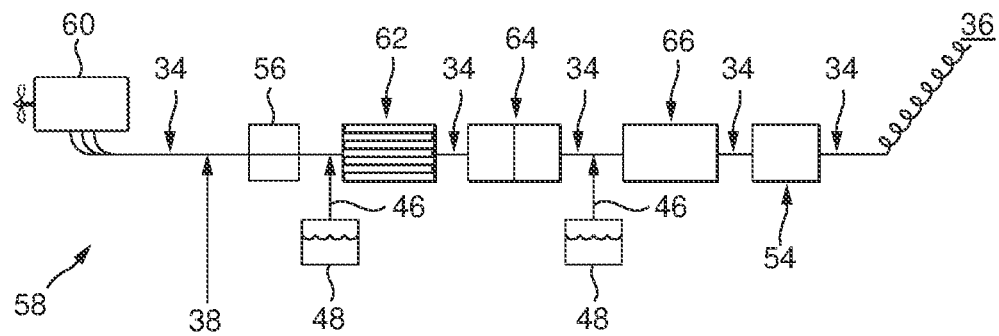

FIGS. 8A and 8B show alternative system arrangements comprising composite oxidation catalysts according to the first aspect of the invention, such as those disclosed in each of FIGS. 1 to 5 and 9 inclusive.

Figure 9:
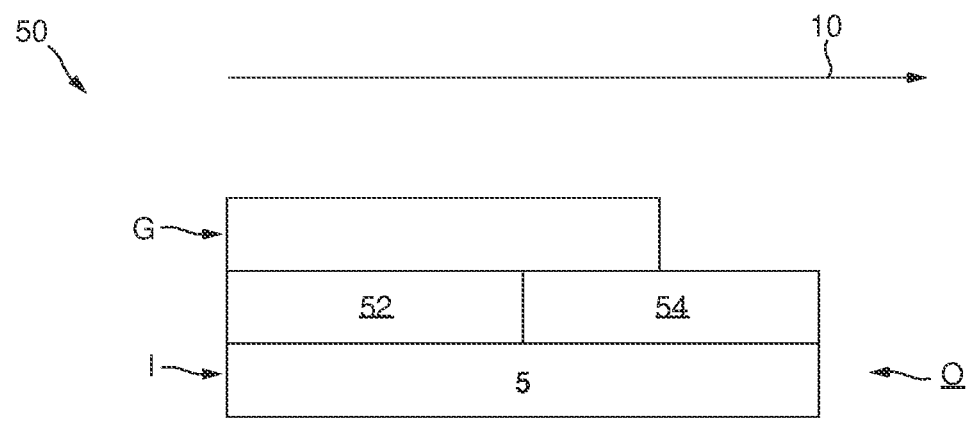

FIG. 9 is a schematic drawing of an alternative embodiment of the composite, zone-coated, dual-use ammonia and nitric oxide oxidation catalyst 50 according to the present invention, wherein common features from embodiments described hereinabove have the same references. This embodiment is designed for use downstream from a SCR catalyst-coated filter to prevent slippage of $NH_3$ to a downstream $NO_x$ sensor. In the drawing, feature 52 is a first catalyst washcoat layer comprising platinum supported on an alumina refractory metal oxide, e.g. at 0.35 g/in$^3$, coated directly onto a surface of the substrate 5, preferably a honeycomb flow-through monolith substrate, and over an axial length of 50% thereof and defined at an one end by a first end of substrate 5, corresponding to an inlet end of the substrate; feature 54 is a second washcoat layer comprising platinum supported on an alumina refractory metal oxide, e.g. at 0.35 g/in$^3$, also coated directly onto the surface of the substrate 5, also over an axial length of 50% thereof with minimal overlap with the first washcoat layer (see under "Definitions" section hereinbelow) and defined at an one end by a second end of substrate 5, corresponding to an outlet end of the substrate. In particular, there is no added alkaline earth metal component in the first catalyst washcoat layer/zone. Washcoat overlayer (G) is a copper-containing aluminosilicate zeolite CHA and a silica-to-alumina ratio of e.g. about 25 at a, for example, copper loading of about 3.3 wt % and is coated directly onto the underlying first 52 and (in part) second 54 washcoat layers over an axial length of 75% of the total substrate axial length. That is, the washcoat overlayer (G) extends axially from the first substrate end for 150% of the axial length of the underlying first catalyst washcoat layer 52.

Alternatively, the CHA is promoted by a combination of both copper and cerium (see Applicant's WO 2013/079954 A1 (incorporated herein by reference)). Washcoat overlayer (G) is defined at a first end by the first end of substrate 5, corresponding to an inlet end of the substrate. The washcoat loading of the washcoat overlayer (G) is e.g. 1.8 gin$^{-3}$.

In one embodiment of the FIG. 9 catalyst, the first catalyst washcoat layer 52 comprises platinum as the only platinum group metal, i.e. a platinum to palladium weight ratio of 1:0, at a platinum loading of 1 gft$^{-3}$; and the second catalyst washcoat layer 54 also comprises platinum as the only platinum group metal, i.e. a platinum to palladium weight ratio of 1:0, at a platinum loading of 3 gft$^{-3}$. Washcoat overlayer (G) comprises 3.3 wt % copper as the only added promoting transition metal of the CHA aluminosilicate zeolite (SAR about 25).

In another embodiment of the FIG. 9 catalyst, the first catalyst washcoat layer 52 comprises platinum as the only platinum group metal, i.e. a platinum to palladium weight ratio of 1:0, at a platinum loading of 1.25 gft$^{-3}$; and the second catalyst washcoat layer 54 also comprises platinum as the only platinum group metal, i.e. a platinum to palladium weight ratio of 1:0, at a platinum loading of 3.75 gft$^{-3}$. Washcoat overlayer (G) comprises copper and cerium as the only added promoting transition metals of the CHA aluminosilicate zeolite (SAR about 25; 3.3 wt % copper; 1.1 wt % cerium).

DETAILED DESCRIPTION OF THE INVENTION

For the avoidance of doubt, the composite oxidation catalyst described herein is termed an "oxidation catalyst" because it can oxidise pollutants in an exhaust gas during normal lean-burn operation of the compression ignition engine, which produces a lean exhaust gas, primarily carbon monoxide and unburned hydrocarbons, and nitrogenous reductant, particularly ammonia. The composite oxidation catalyst can also oxidise nitrogen monoxide in the exhaust gas to nitrogen dioxide to promote downstream catalytic activity, such as the CRT® effect and/or promote the selective catalytic reduction reaction and such NO oxidation activity can be enhanced by using the features of one or more of the dependent claims appended hereto. Since it is preferably used for treating exhaust gases produced by a diesel compression ignition engine, it may also be referred to as a "diesel oxidation catalyst". Embodiments of the composite oxidation catalyst according to the present invention can be formulated to generate an exotherm from additional hydrocarbons introduced into the exhaust gas thereby to heat a downstream particulate matter filter and thereby to regenerate the filter (i.e. combust soot trapped thereon (active regeneration)).

The activity of the composite oxidation catalyst is not limited to oxidation reactions, although the oxidation catalyst should be able to oxidise one or more pollutants in an exhaust gas of a compression ignition engine during normal lean-burn operation. For example, assuming appropriate conditions, the PGM-containing components of the oxidation catalyst may additionally be able to perform a reduction reaction, such as the reduction of oxides of nitrogen ($NO_x$) using hydrocarbon in the exhaust gas as reductant (so-called lean $NO_x$ catalysis, DeNO$_x$ catalysis or hydrocarbon-SCR) and/or may be able to temporarily store one or more pollutants from the exhaust gas, such as the temporary adsorption of $NO_x$ and/or hydrocarbons. For the further avoidance of doubt, use of the composite oxidation catalyst to generate an exotherm from additional hydrocarbon fuel injected into the exhaust gas is not "normal use" (see the discussion on regeneration frequency in the background section hereinabove). That is, "normal lean-burn operation" is that period between exotherm generation events.

Regarding NO oxidation activity, preferably the composite oxidation catalyst as a whole promotes NO oxidation over >10% of the operating window of the oxidation catalyst during normal use, such as >20%, >30%, >40% or >50%. This is in marked contrast the oxidation catalyst disclosed in WO 2009/076574 discussed hereinabove, wherein the diesel oxidation catalyst is effective to produce substantially no additional $NO_2$ in the exhaust gas stream after passing through the diesel oxidation catalyst over about 90% of the operating window of the diesel oxidation catalyst. The composite oxidation catalyst according to the present invention does this by including at least one zone in the oxidation catalyst having a weight ratio of platinum to palladium of >1, such as >1.5:1 or >2:1, optionally platinum only as the only platinum group metal present in that particular zone, i.e. a weight ratio of platinum to palladium of 1:0 (or "infinity" (∞)). In this regard, according to the invention, a total platinum group metal loading in the first catalyst washcoat zone defined in grams of platinum group metal per cubic foot of substrate volume (g/ft$^3$) is different from the total platinum group metal loading in the second catalyst washcoat zone. Optionally, the definition "a total platinum group metal loading in the first catalyst washcoat zone defined in grams of platinum group metal per cubic foot of substrate volume (g/ft$^3$) is different from the total platinum group metal loading in the second catalyst washcoat zone" means "a total platinum (metal) loading in the first catalyst washcoat zone defined in grams of platinum per cubic foot of substrate volume (g/ft$^3$) is different from the total platinum loading in the second catalyst washcoat zone".

According to the first aspect, the second catalyst washcoat zone can be defined at a second end thereof by the second substrate end and wherein the first catalyst washcoat zone comprises the first catalyst washcoat layer and the second catalyst washcoat zone comprises the second catalyst washcoat layer. That is, the composite oxidation catalyst as a whole comprises two catalyst washcoat zones (see e.g. the arrangement shown in FIG. 1). According to the invention, the total platinum group metal loading in the first catalyst washcoat zone defined in grams of platinum group metal per cubic foot of substrate volume (g/ft$^3$) is different from the total platinum group metal loading in the second catalyst washcoat zone.

In embodiments, the total platinum group metal loading in the first catalyst washcoat zone is greater than a total platinum group metal loading in the second catalyst washcoat zone. Thus, in the embodiment of FIG. 1, the total platinum group metal loading in the first catalyst washcoat zone defined in grams of platinum group metal per cubic foot of substrate volume (g/ft$^3$) is greater than the total platinum group metal loading in the second catalyst washcoat zone.

Alternatively, the total platinum group metal loading in the first catalyst washcoat zone is less than the total platinum group metal loading in the second catalyst washcoat zone. So, in the embodiment shown in FIG. 9, the total platinum group metal loading in the first catalyst washcoat zone defined in grams of platinum group metal per cubic foot of substrate volume (g/ft$^3$) is less than the total platinum group metal loading in the second catalyst washcoat zone.

Methods of making such a catalyst having two catalyst washcoat zones include a method, wherein in step (a) the catalyst washcoat extends along the total length L of the substrate. It will be appreciated that in this method, the first refractory metal oxide support material is the same as the second refractory metal oxide support material. Alternatively, the composite oxidation catalyst shown in FIG. 1 can be obtained or is obtainable by coating the substrate (5), in either order, from a first end thereof with a first catalyst washcoat layer for forming the first washcoat catalyst zone and comprising a first refractory metal oxide support material, e.g. two or more platinum group metal components comprising both platinum and palladium and e.g. one or more alkaline earth metal components for an axial length $L_1$ (see the item labelled 9 in FIG. 1); and with a second, different catalyst washcoat layer comprising a second refractory metal oxide support material and one or more second platinum group metal and optionally one or more second alkaline earth metal components for forming a second oxidation catalyst zone (see the item labelled 11) for an axial length $L_2$ such that a second end (13) of the first catalyst washcoat layer (9) and a first end (15) of the second (11) catalyst washcoat layer abut one another without there being substantially any overlap between the first and second washcoat layers. In the latter method of making the embodiment of FIG. 1, it will be understood that the axial length of the first catalyst washcoat zone $L_1$ is the same, or is substantially the same, as the axial length of the first catalyst washcoat layer (9); and the axial length of the second catalyst washcoat zone $L_2$ is the same, or is substantially the same, as the axial length of the second catalyst washcoat zone $L_2$. Further details of methods of making the a two-zone composite oxidation catalyst according to the first invention aspect are described hereinabove in connection to FIG. 1. It will be understood that the catalyst washcoat layer of step (a) can comprise a platinum component, a palladium component or both platinum and a palladium components and the solution of step (b) can comprise platinum, palladium or both platinum and palladium, so long as the combination of steps (a) and (b) arrives at a first catalyst washcoat zone having a length $L_1$ comprising two or more supported platinum group metal components comprising both platinum and palladium. Application of the washcoat overlayer is typically done when the underlying catalyst washcoat layers have been dried and fired on the substrate monolith.

Alternatively, according to the first aspect, the composite oxidation catalyst can comprise three or more catalyst washcoat zones, including one zone formed from a two-layer overlap region of the first catalyst washcoat layer and the second catalyst washcoat layer, wherein a third catalyst washcoat zone comprising a third refractory metal oxide support material and one or more platinum group metal components supported thereon is defined at a second end thereof by the second substrate end and wherein a total platinum group metal loading in the third catalyst washcoat zone defined in grams of platinum group metal per cubic foot of substrate volume (g/ft$^3$) is less than the total platinum group metal loading in the second catalyst washcoat zone.

A composite oxidation catalyst comprising three catalyst washcoat zones can comprise a third catalyst washcoat zone defined at a first end thereof by a second end of the second catalyst washcoat zone (see e.g. the arrangements shown in FIGS. 2 and 4).

Such composite oxidation catalyst can comprise a first catalyst washcoat layer and a second catalyst washcoat layer, wherein the first catalyst washcoat layer comprises a refractory metal oxide support material and one or more platinum group metal components supported thereon, has a length $L_3$, wherein $L_3<L$, and is defined at one end by the first substrate end; and the second catalyst washcoat layer comprises a refractory metal oxide support material and one or more platinum group metal component supported thereon, has a length $L_4$, wherein $L_4<L$, and is defined at a second end by the second substrate end, wherein the second catalyst washcoat zone comprises a two-layer overlap region of the first catalyst washcoat layer and the second catalyst washcoat layer and wherein the third catalyst washcoat zone comprises a single layer of the second catalyst washcoat layer that is not comprised of the overlap region.

A composite oxidation catalyst according to the first aspect of the invention can comprise four catalyst washcoat zones, wherein a fourth catalyst washcoat zone is located between the second catalyst washcoat zone and the third catalyst washcoat zone, which fourth catalyst washcoat zone comprises a fourth refractory metal oxide support material and one or more platinum group metal components supported thereon and is defined at a first end thereof by a second end of the second catalyst washcoat zone and at a second end thereof by a first end of the third catalyst washcoat zone and wherein a total platinum group metal loading in the fourth catalyst washcoat zone defined in grams of platinum group metal per cubic foot of substrate volume ($g/ft^3$) is greater than the total platinum group metal loading in each of the second catalyst washcoat zone and the third catalyst washcoat zone wherein the first catalyst washcoat layer has a length $L_3$, wherein $L_3<L$, and is defined at one end by the first substrate end; and the second catalyst washcoat layer has a length $L_4$, wherein $L_4<L$, and is defined at a second end by the second substrate end, wherein the fourth catalyst washcoat zone comprises the two-layer overlap region of the first catalyst washcoat layer and the second catalyst washcoat layer and wherein the third catalyst washcoat zone comprises a single layer of the second catalyst washcoat layer that is not comprised of the overlap region.

In the three and four zone arrangements described hereinabove, preferably the one or more platinum group metal component in the third catalyst washcoat zone consists essentially of platinum. It will be appreciated that, where the one or more platinum group metal in the third catalyst washcoat zone consists essentially of platinum, in arrangements featuring an overlap of first and second catalyst washcoat layers, the second catalyst washcoat layer that forms the third catalyst washcoat zone also consists essentially of platinum.

In two, three and four zone arrangements of the invention, a mass ratio of platinum to palladium in each successive catalyst washcoat zone arrayed in series along the substrate length L after the first catalyst washcoat zone can be greater than an immediately preceding catalyst washcoat zone.

The first catalyst washcoat zone and/or the first catalyst washcoat layer can comprise one or more first alkaline earth metal components supported on the refractory metal oxide support material.

It will further be appreciated that in composite oxidation catalysts having two zones as described herein, the second catalyst washcoat zone can comprise one or more alkaline earth metal, such as barium and/or strontium, preferably barium.

It will also be appreciated that in composite oxidation catalysts having three zones as described herein, the second catalyst washcoat zone, the third catalyst washcoat zone or both the second catalyst washcoat zone and the third catalyst washcoat zone can each comprise one or more alkaline earth metal, such as barium and/or strontium, preferably barium.

It will be further appreciated that in composite oxidation catalysts having four zones as described herein, the second catalyst washcoat zone, the third catalyst washcoat zone and/or the fourth catalyst washcoat zone can each comprise one or more alkaline earth metal, such as barium and/or strontium, preferably barium.

It will further be appreciated that in composite oxidation catalysts having three or four zones as described herein, the first catalyst washcoat layer, the second catalyst washcoat layer and/or both the first catalyst washcoat layer and the second catalyst washcoat layer can each comprise one or more alkaline earth metal, such as barium and/or strontium, preferably barium.

Methods of making three or four zone composite oxidation catalysts according to the invention include a method wherein in step (a) the catalyst washcoat layer is a first catalyst washcoat layer which extends from the first substrate end to less than the total length of the substrate, which method further comprising a step (a') before step (a) or after step (a) but in either case before step (b) of applying a second catalyst washcoat layer to the substrate for a length extending from the second substrate end to less than the total length of the substrate, such that the first catalyst washcoat layer in part overlaps the second catalyst washcoat layer or the second catalyst washcoat layer in part overlaps the first catalyst washcoat layer, wherein the second catalyst washcoat layer comprises a refractory metal oxide support material and one or more platinum group metal components, it being understood that the platinum group metal composition of a washcoat catalyst zone including the two overlapping layers includes the total platinum group metal present in each of the two overlapping layers of the zone.

Where the above method is used to make part of a composite oxidation catalyst according to the invention having three or more zones, it will be understood that the axial length $L_1$ of the impregnation step can determine the number of catalyst washcoat zones present along the axial substrate length. This is further explained with reference to FIGS. 2, 3, 4 and 5 herein.

Where $L_1$ is less than an axial length between the first substrate end and a first end of the second catalyst washcoat, representing an end of an overlap region of the first catalyst washcoat layer and the second catalyst washcoat layer nearest the first substrate end, the second catalyst washcoat zone comprises a single layer of the first catalyst washcoat layer defined at one end by the second end of the first catalyst washcoat zone $L_1$ and at a second end by a first end of the overlap region of the first catalyst washcoat layer and the second catalyst washcoat layer nearest the first substrate end. By appropriate formulation of PGM concentrations, a fourth catalyst washcoat zone can be defined by the first end of the overlap region of the first and second washcoat layers nearest the first substrate end, wherein the platinum group metal loading in the first catalyst washcoat zone ($g/ft^3$) >fourth catalyst washcoat zone>second catalyst washcoat zone. A third catalyst washcoat zone can be defined at a second end by the substrate end opposite from the substrate end from which the first catalyst washcoat layer extends and at a first end by the end of an overlap region of the first catalyst washcoat layer and the second catalyst washcoat layer nearest the end from which the second catalyst washcoat layer extends, i.e. also corresponding to the second end of the fourth catalyst washcoat zone. This arrangement is shown in FIGS. 3 and 5 herein.

Where $L_1$ is the same length as the axial length of the single layer of the first catalyst washcoat layer extending from the first substrate end until the first catalyst washcoat layer enters the overlap region of the second catalyst washcoat zone, the oxidation catalyst as a whole comprises three axially arranged catalyst washcoat zones, which can be numbered sequentially in series from the first substrate end as first, second and third catalyst washcoat zones.

Alternatively, an oxidation catalyst having three or more catalyst washcoat zones according to the invention can in part be made in an adaptation to the method for making an oxidation catalyst according to the sixth invention aspect having two catalyst washcoat zones described hereinabove, as follows. Firstly, the substrate is coated with a first catalyst washcoat layer along its total length L. Secondly, a second catalyst washcoat layer comprising a refractory metal oxide support material and one or more platinum group metal components can be coated from a first substrate end on top of the first catalyst washcoat layer to an axial length less than the total substrate length L or else the first catalyst washcoat layer can be impregnated from the first substrate end with an impregnation solution comprising one or more platinum group metal salts and optionally one or more alkaline earth metal salts to a length less than the total substrate length L. The second catalyst washcoat layer or the impregnated first catalyst washcoat layer will, in part, form the middle or second of the three catalyst washcoat zones arranged axially along the substrate. Thirdly, a third catalyst washcoat layer comprising a refractory metal oxide support material and one or more platinum group metal components being the first catalyst washcoat zone $L_1$ can be coated from the first substrate end on top of the second catalyst washcoat layer (or else impregnated onto the impregnated first washcoat layer for a zone length $L_1$ corresponding to the first catalyst washcoat zone) to an axial length less than the second catalyst washcoat layer or the axial length of the first impregnation of the second step above. It will be appreciated that the platinum group metal content of the first catalyst washcoat zone $L_1$ comprises a combination of the platinum group metal composition of the underlying first catalyst washcoat layer, the second catalyst washcoat layer or impregnation solution and the third catalyst washcoat layer or impregnation solution. Where present, the one or more alkaline earth metal components can be present in the washcoat or impregnation step of the first, second and/or third application steps.

It is preferred that at least the third step is performed as an impregnation to a length $L_1$ corresponding to step (b) from the sixth invention aspect. This is because multiple layer-on-layer coatings reduce the cross-sectional area of the substrate open frontal area for allowing gas to pass, thereby undesirably increasing back pressure in the system. Therefore, a composite oxidation catalyst, wherein at least one catalyst washcoat zone is formed from an impregnation step of an underlying catalyst washcoat layer is preferred, preferably the third step corresponding to formation of the first catalyst washcoat zone.

In use in an exhaust system for a vehicular compression ignition engine, the first substrate end of the oxidation catalyst according to the first aspect of the invention comprising the first catalyst washcoat zone is oriented to the upstream side, i.e. nearest the engine. That is, the first substrate end can be defined as a first, upstream inlet substrate end and the second substrate end can be defined as a second, downstream substrate (or outlet) end.

Platinum Group Metal Loading

In general, each catalyst washcoat zone in the composite oxidation catalyst according to the present invention comprises one or more; or two or more platinum group metal components selected from the group consisting of platinum, palladium, rhodium, iridium, ruthenium and a mixture or alloy of any two or more thereof. Generally, the one or more platinum group metal component in the first catalyst washcoat zone comprises platinum.

The one or more platinum group metal component in the first catalyst washcoat zone can consist essentially of platinum (see for example the embodiment of FIG. 9 described hereinabove). Preferably, the first catalyst washcoat zone comprises both platinum and palladium as the only platinum group metals present in the first catalyst washcoat zone.

Specifically, the one or more platinum group metal component in the first catalyst washcoat zone and/or the first catalyst washcoat layer can comprise both platinum and palladium, e.g. the more than one platinum group metal component consists essentially of or consists of platinum and palladium. Preferably, the only platinum group metals present in the first catalyst washcoat zone and/or the first catalyst washcoat layer are platinum and palladium. It will be appreciated that where the first catalyst washcoat layer comprises both platinum and palladium, any catalyst washcoat zone including the first catalyst washcoat layer will also comprise both platinum and palladium.

A weight ratio of platinum to palladium in the first catalyst washcoat zone can be ≥1, which term includes a weight ratio of platinum to palladium of 1:0 (see e.g. the FIG. 9 embodiments). The weight ratio of platinum to palladium in the first catalyst washcoat zone can be 10:1≥1.5:1.

Alternatively, a weight ratio of platinum to palladium in the first catalyst washcoat zone can be <1, which term includes a weight ratio of platinum to palladium of 0:1. However, in embodiments where the first catalyst washcoat zone is <1, preferably, weight ratio of platinum to palladium in the first catalyst washcoat zone is ≥1:3 (see Examples 11 to 13 hereinbelow).

Where a catalyst washcoat zone—other than the first catalyst washcoat zone—comprises only one platinum group metal, preferably it is platinum, i.e. the one or more platinum group metal component consists essentially of or consists of platinum. The one or more platinum group metal component in the second catalyst washcoat zone can comprise platinum. The one or more platinum group metal component in the second catalyst washcoat zone can consist essentially of platinum. It is further preferred that the one or more platinum group metal components in the second catalyst washcoat zone comprises, i.e. intentionally comprises, platinum, such as both platinum and palladium or platinum may be the only platinum group metal present in the second catalyst washcoat zone, e.g. the one or more platinum group metal component in the second catalyst washcoat zone comprises or consists of platinum; or the more than one platinum group metal component in the second catalyst washcoat zone consists of both platinum and palladium. A mass ratio of platinum to palladium in the second catalyst washcoat zone is preferably greater than a mass ratio of platinum to palladium in the first catalyst washcoat zone. Optionally, the content of platinum in the second catalyst washcoat zone is greater than 1 wt. % of the total metal including platinum group metals and base metals (e.g. alkaline earth metals) supported on the refractory metal oxide support material in the zone.

Preferably where the substrate comprises three or more catalyst washcoat zones, the third catalyst washcoat zone or the second catalyst washcoat layer comprises platinum, i.e. intentionally comprises platinum, such as both platinum and palladium or platinum may be the only platinum group metal present in the third catalyst washcoat zone or the second catalyst washcoat layer. Optionally, the content of platinum in the third catalyst washcoat zone is greater than 1 wt. % of the total metal including platinum group metals and base metals (e.g. alkaline earth metals) supported on the refractory metal oxide support material in the zone.

In a preferred arrangement, platinum is the only platinum group metal in the second catalyst washcoat layer, i.e. the one or more platinum group metal component in the second catalyst washcoat layer consists of platinum (a Pt:Pd weight of 1:0) because this feature provides more stable $NO_2$ generation for operation of downstream catalyst functions, particularly in arrangements where the second catalyst washcoat layer overlaps with the first catalyst washcoat layer, as is shown in FIGS. 4 and 5. Therefore, for stable $NO_2$ generation, the arrangement wherein the one or more platinum group metal component in the second catalyst washcoat layer consists of platinum is preferred where the second catalyst washcoat layer overlaps the first catalyst washcoat layer. In preferred arrangements wherein the platinum is the only platinum group metal present in the third catalyst washcoat zone or the second catalyst washcoat layer, i.e. a Pt:Pd weight ratio of 1:0, the third catalyst washcoat zone or the second catalyst washcoat layer comprises manganese (see hereinbelow).

Preferably, the second catalyst washcoat zone comprises both platinum and palladium, e.g. the more than one platinum group metal component in the second catalyst washcoat zone consists of platinum and palladium because this feature improves hydrocarbon slip control.

Therefore, in general, any catalyst washcoat zone which is defined at a second end thereof by the second (outlet) end of the substrate intentionally comprises platinum, wherein, optionally, the content of platinum in the catalyst washcoat zone is greater than 1 wt. % of the total metal including platinum group metals and base metals (e.g. alkaline earth metals) supported on the refractory metal oxide support material in the zone.

Typically, a total platinum group metal loading on the substrate as a whole (calculated as elemental metal) is 5 to 60 $g/ft^3$, preferably 8 to 50 $g/ft^3$ for application to heavy-duty diesel engine exhaust systems.

A weight ratio of Pt:Pd on the substrate as a whole (calculated as elemental metal) is preferably 3:2 to 9:1, preferably 2:1 to 7:1, most preferably 3:1 to 5:1.

The platinum group metal loading in the first catalyst washcoat zone (calculated as elemental metal) is preferably less than 100 $g/ft^3$, preferably 25-75 $g/ft^3$ and most preferably 35-65 $g/ft^3$. It will be appreciated that the first catalyst washcoat zone can comprise an "underlying" platinum group metal loading in a first catalyst washcoat layer, generally a single layer of the first catalyst washcoat layer, which is subsequently impregnated with a high concentration solution of platinum group metal salts, before being dried and calcined. As a result, the first catalyst washcoat zone is a combination of the platinum group metal loadings from both the first catalyst washcoat layer and the impregnation solution.

The platinum group metal loading in the second and subsequent catalyst washcoat zones as a whole, i.e. the total platinum group metal in catalyst washcoat zones other than the first catalyst washcoat zone (calculated as elemental metal), can depend on the embodiment used. So, for example, in embodiments comprising a total of two zones only, such as is shown in FIGS. 1 and 9, the total platinum group metal loading in the second catalyst washcoat zone is preferably 1 to 10 $g/ft^3$. In the specific embodiment shown in FIG. 9, the first catalyst washcoat layer at the inlet end comprises Pt as the only platinum group metal and at a washcoat loading of 1.25 $g/ft^3$, whereas the second catalyst washcoat layer at the outlet end comprises Pt as the only platinum group metal at a washcoat loading of 3.75 $g/ft^3$.

However, in embodiments comprising three catalyst washcoat zones, wherein the second catalyst washcoat zone comprises an overlap region of first and second catalyst washcoat layers (see the embodiments in FIGS. 2 and 4, for example)—or embodiments comprising four catalyst washcoat zones wherein the fourth catalyst washcoat zone comprises an overlap region of first and second catalyst washcoat layers (see the embodiments in FIGS. 3 and 5, for example)—the total platinum group metal loading in the second (or fourth) catalyst washcoat zone can be 10 to 40 $g/ft^3$, preferably 15 to 35 $g/ft^3$.

In embodiments comprising three or four catalyst washcoat zones, such as those shown in any one of FIGS. 2 to 5 inclusive, the total platinum group metal loading in the third catalyst washcoat zone can be 1 to 30 $g/ft^3$, preferably 5 to 20 $g/ft^3$.

In embodiments comprising four catalyst washcoat zones, such as those shown in FIG. 3 or 5, the total platinum group metal loading in the second catalyst washcoat zone can be 1 to 30 $g/ft^3$, preferably 5 to 20 $g/ft^3$. However, the total washcoat loading in the second catalyst washcoat zone is always greater than in the third catalyst washcoat zone.

The one or more platinum group metal component supported on a refractory metal oxide support material and/or—where present—the one or more alkaline earth metal component can be prefixed to the refractory metal oxide support material prior to forming a washcoat layer therewith and so will be present throughout any washcoat layer coated with such washcoat coating. However, in a preferred methodology, a solute salt of the one or more platinum group metal components and optionally a solute salt of the one or more first alkaline earth metal components are present in an, e.g. aqueous, washcoat slurry also containing "fresh" refractory metal oxide material and applied to the substrate and the one or more platinum group metal components and the one or more first alkaline earth metal components are fixed to the refractory metal oxide support material through a drying and calcination process following coating of the washcoat slurry on to the substrate. By "fresh refractory metal oxide material", it is meant that no platinum group metal component and/or alkaline earth metal component has been pre-fixed to the refractory metal oxide component. This method is preferred because it is less energy intensive, i.e. it avoids a two-step process of firstly preparing a supported pre-fixed refractory metal oxide product and then using this pre-fixed product to prepare a washcoat slurry for coating. Furthermore, the inventors have discovered that it may be advantageous for exotherm generation that at least the first catalyst washcoat layer has a non-uniform distribution of the one or more platinum group metal components and/or the one or more alkaline earth metal components throughout its thickness (i.e. the direction perpendicular to the surface of the substrate represents the thickness of the catalyst layer). This advantageous feature is not available or not available to the same extent as to achieve the desired effect where the platinum group metal or alkaline earth metal are pre-fixed to the refractory metal oxide support material.

For an explanation of this feature of Applicant's invention, see hereinbelow under the "Non-uniform distribution of alkaline earth metal component and/or platinum group metal component in washcoat layer" heading.

In a possible method of manufacture of the composite oxidation catalyst of the invention, discussed also below, the first catalyst washcoat zone is obtained by or is obtainable by, in part, the steps of:
 (a) applying a catalyst washcoat layer to the substrate surface for a length extending from one end of the substrate, which catalyst washcoat layer comprising a refractory metal oxide support material and one or more platinum group metal component; and
 (b) impregnating the catalyst washcoat layer in a zone of length $L_1$ defined at one end by the first substrate end with a solution containing one or more platinum group metal.

It will be understood, therefore, that where a catalyst washcoat layer, e.g. the first catalyst washcoat layer comprising one or more platinum group metal components supported on a refractory metal oxide support material, is itself impregnated with a solution comprising one or more platinum group metal component, a platinum group metal composition of the resulting zone is a combination of the underlying catalyst washcoat layer and the impregnating solution. So, for example, a platinum to palladium mass (i.e. weight) ratio in the first catalyst washcoat zone as a whole is derived from the total platinum and palladium derived from both the catalyst washcoat layer, i.e. the first catalyst washcoat layer, and the impregnating solution.

It will be further understood that, in step (a) hereinabove, the catalyst washcoat layer is a first catalyst washcoat layer which extends from the first substrate end to less than the total length of the substrate, which method further comprising a step (a') before step (a) but in either case before step (b) of applying a second catalyst washcoat layer to the substrate for a length extending from the second substrate end to less than the total length of the substrate, such that the first catalyst washcoat layer in part overlaps the second catalyst washcoat layer or the second catalyst washcoat layer in part overlaps the first catalyst washcoat layer, wherein the second catalyst washcoat layer comprises a refractory metal oxide support material and one or more platinum group metal components.

As discussed hereinabove in relation to FIGS. 4 and 5, preferably the first catalyst washcoat layer extends from the first substrate end and the second catalyst washcoat layer extends from the second substrate end, whereby the second catalyst washcoat layer in part overlaps the first catalyst washcoat layer.

According to the invention, the first catalyst washcoat zone can comprise both platinum (Pt) and palladium (Pd). In embodiments wherein the first catalyst washcoat zone comprises both platinum and palladium, a weight ratio of platinum to palladium can be 1 or <1. Although there is a general desire to reduce the amount of palladium in the composite oxidation catalyst relative to platinum to reduce the total cost of the platinum group metals in the catalyst, as can be seen from sample 10.5 in Example 10 hereinbelow, Applicant's experimental data suggest that where the first catalyst washcoat zone comprises both Pt and Pd at $\geqslant 1$, it is undesirable to remove palladium from the first catalyst washcoat zone entirely without detrimentally affecting the exotherm generation functionality of the catalyst as it ages. In this regard, sample 10.5 in Example 10 shows that where the underlying washcoat layer having a Pt:Pd weight ratio of 2:1 is impregnated with an impregnation medium comprising no palladium, i.e. a Pt:Pd weight ratio of 1:0, to form the first catalyst washcoat zone having an approximate Pt:Pd weight ratio of 47:1, the ability of the resulting catalyst to promote an exotherm is compromised, i.e. the first catalyst washcoat zone is less stable to ageing. However, although less preferred, sample 10.5 in Example 10 remains an effective composite oxidation catalyst for the purposes of the present invention.

In embodiments wherein the first catalyst washcoat zone comprises both platinum and palladium, a weight ratio of platinum to palladium can be $\geqslant 1$, generally it is preferred that the weight ratio of platinum (Pt) to palladium (Pd) in the first catalyst washcoat zone is 10:1$\geqslant$ 1:1, preferably 10:1 $\geqslant$ 1.5:1 or 6:1$\geqslant$ 1.5:1, more preferably 4:1$\geqslant$ 1.5:1, e.g. 6:1 $\geqslant$ 2:1, 4:1$\geqslant$ 1.5:1 or 2:1$\geqslant$ 1:1 since Example 10 also shows that the inlet temperature at <500° C. exotherm fail (° C.) test for aged composite oxidation catalysts having a first catalyst washcoat zone derived from the impregnation of an underlying catalyst washcoat layer comprising a Pt:Pd weight ratio of 2:1 with an impregnation medium having a Pt:Pd weight ratio of 1:1, 2:1, 3:1 and 4:1 are similar. It was also found that, in combination with the alkaline earth metal component, a Pt:Pd$\geqslant$ 1:1 weight ratio improves exotherm light-off temperature (the light-off temperature is reduced) allowing for increased exotherm generation from lower exhaust gas temperatures in active and active-passive regeneration systems.

It will be understood that further reductions in total platinum group metal cost in the composite oxidation catalyst according to the invention for equivalent functionality can be obtained where the first catalyst washcoat zone comprises higher Pt:Pd weight ratio (because the current cost by weight of palladium is significantly more than that of platinum), e.g. at $\geqslant$ 1.5:1, such as the preferred 10:1 $\geqslant$ 1.5:1 range or at $\geqslant$ 2:1 in combination with an outlet zone, e.g. the third catalyst washcoat zone, defined at one end by the outlet end of the composite oxidation catalyst substrate comprising a pre-formed manganese doped mixed magnesium aluminium metal oxide. A composite oxidation catalyst having an outlet zone comprising this composition has been shown in Example 8 to improve exotherm performance and may enable the use of lower quantities of platinum group metal in the outlet zone or second catalyst washcoat layer in part forming the outlet (third catalyst washcoat) zone.

Preferably, particularly in embodiments comprising three or more catalyst washcoat zones, the one or more platinum group metals in the second catalyst washcoat zone comprises both platinum and palladium. In a particularly preferred feature, a mass ratio of platinum to palladium in the second catalyst washcoat zone is greater than a mass ratio of platinum to palladium in the first catalyst washcoat zone. In combination with a platinum group metal loading in the second catalyst washcoat zone, the advantage of this Pt:Pd mass ratio in the second catalyst washcoat zone is that the catalyst improves hydrocarbon slip control, CO oxidation and NO oxidation.

In this regard, in embodiments consisting of two zones, e.g. as is shown in FIG. 1—allowing for any overlap from production methodology (see "Definitions" section hereinbelow)—preferably the second catalyst washcoat zone comprises a Pt-rich PGM composition comprising palladium, preferably at a weight ratio of or $\geqslant$ 2:1. In combination with a first catalyst washcoat zone comprising Pt:Pd at $\geqslant$ 1:1, this feature has been found to be advantageous because a Pt-only (i.e. a Pt:Pd weight ratio of 1:0) second catalyst washcoat zone has been found to be detrimental to exotherm light-off and HC slip in an aged catalyst. In this regard, the presence of Pd in addition to Pt in the second catalyst washcoat zone can improve the stability to ageing of the second catalyst washcoat zone, i.e. maintaining oxidation activity through ageing. However, in combination with manganese, a Pt:Pd weight ratio of 1:0 in the second catalyst washcoat zone has been found to be beneficial for NO oxidation (see Example 8 and hereinbelow).

In composite oxidation catalysts according to the invention comprising three catalyst washcoat zones, preferably a mass ratio of platinum to palladium increases from the first catalyst washcoat zone to the second catalyst washcoat zone to the third catalyst washcoat zone. This can be done, for example, in the embodiments shown in FIGS. 2 and 4 wherein the second catalyst washcoat layer (7) has a higher Pt:Pd mass ratio than the first catalyst washcoat layer, preferably a mass ratio of 1:0, i.e. Pt only and substantially no Pd, so that the single layer of the second catalyst washcoat layer in the third catalyst washcoat zone (3) has the highest Pt:Pd ratio of any of the catalyst washcoat zones arranged on the substrate. However, the same comments apply as those described in connection with composite oxidation catalysts comprising only two catalyst washcoat zones, i.e. stability to ageing for the third catalyst washcoat zone can be improved by including some palladium e.g. at ⩾ 10:1, ⩾ 5:1, ⩾ 3:1 or ⩾ 2:1 while still maintaining the preferred arrangement of the mass ratio of platinum to palladium increasing from the first catalyst washcoat zone to the second catalyst washcoat zone to the third catalyst washcoat zone. In the context of three-zone composite oxidation catalysts, reference is also made to the benefit of also including manganese in the third catalyst washcoat zone (3) (see Example 8 and hereinbelow).

Furthermore, in a composite oxidation catalyst having four catalyst washcoat zones, a mass ratio of platinum to palladium in each successive catalyst washcoat zone at the inlet end arrayed in series along the substrate length L after the first catalyst washcoat zone is greater than an immediately preceding catalyst washcoat zone. This can again be accomplished, for example, in the embodiments shown in FIGS. 3 and 5 wherein the second catalyst washcoat layer (7) has a higher Pt:Pd mass ratio than the first catalyst washcoat layer, preferably a mass ratio of 1:0, i.e. Pt only and substantially no Pd, so that the single layer of the second catalyst washcoat layer in the third catalyst washcoat zone (3) has the highest Pt:Pd ratio of any of the catalyst washcoat zones. However, the same comments apply as those described in connection with composite oxidation catalysts comprising only two catalyst washcoat zones, i.e. stability to ageing for the third catalyst washcoat zone can be improved by including some palladium e.g. at ⩾ 10:1, ⩾ 5:1, ⩾ 3:1 or ⩾ 2:1 while still maintaining the preferred arrangement of the mass ratio of platinum to palladium increasing from the first catalyst washcoat zone to the second catalyst washcoat zone to the third catalyst washcoat zone. In the context of four-zone composite oxidation catalysts, reference is also made to the benefit of also including manganese in the third catalyst washcoat zone (3) (see Example 8 and hereinbelow).

It will be appreciated that—in the context of a four-zone composite oxidation catalyst according to the invention—the feature "in each successive catalyst washcoat zone arrayed in series along the substrate length L after the first catalyst washcoat zone at the inlet end is greater than an immediately preceding catalyst washcoat zone" is a different order from the numbering of the catalyst washcoat zones in FIGS. 3 and 5. That is, in FIGS. 3 and 5, the order of numbering the washcoat catalyst zones from the first catalyst washcoat zone (1) is 1→2→4→3. This is because the third catalyst washcoat zone (3) is defined at a second end by the second substrate end (or outlet end). However, the feature "in each successive catalyst washcoat zone arrayed in series along the substrate length L after the first catalyst washcoat zone at the inlet end is greater than an immediately preceding catalyst washcoat zone" requires e.g. that a mass ratio of Pt:Pd in the fourth catalyst washcoat zone is greater than that in the immediately preceding second catalyst washcoat zone (2) and that the Pt:Pd mass ratio in the third catalyst washcoat zone (3) is greater than the immediately preceding fourth catalyst washcoat zone (4).

Preferably, the one or more platinum group metal in the second catalyst washcoat zone comprises both platinum and palladium, wherein a mass ratio of platinum to palladium is >1:1 preferably 10:1>3:2 such as 5:1>3:2.

Typically, the first catalyst washcoat zone or first catalyst washcoat layer does not comprise rhodium.

It may be preferable that the second catalyst washcoat zone or the second catalyst washcoat layer does not comprise rhodium.

The third or fourth catalyst washcoat zone may not comprise rhodium.

It may further be preferable that the composite oxidation catalyst according to the invention is substantially free from rhodium altogether.

The inventors have also found that there may be an advantage for improved exotherm generation where there is a non-uniform distribution of the one or more platinum group metal component and/or the one or more first alkaline earth metal component in a direction perpendicular to the surface of the substrate. This is discussed in greater detail under the "Non-uniform distribution of alkaline earth metal component and/or platinum group metal component in washcoat layer" heading below.

Alkaline Earth Metal Component

According to the invention, the first catalyst washcoat zone and/or the first catalyst washcoat layer can comprise one or more first alkaline earth metal components supported on the refractory metal oxide support material.

It will be understood that the purpose of the alkaline earth in the composite oxidation catalyst according to the invention is not to store $NO_x$ for later release and reduction by the lean $NO_x$ catalysis process discussed above. This is the purpose of a specially designed catalyst called a lean $NO_x$ trap (LNT) which can also include alkaline earth metal, platinum group metals and optionally ceria, doped ceria or ceria mixed oxide components, but which LNT must be used in combination with specially programmed engine control unit. This engine control operates lean of the stoichiometric mode of operation, during which period $NO_x$ is absorbed on the LNT, and an operation mode wherein a pulse of rich exhaust gas containing additional reducing species, such as CO and/or hydrocarbons contact the LNT, thereby desorbing absorbed $NO_x$ and reducing it via the lean $NO_x$ catalysis reaction over the platinum group metal. In use of the LNT, the frequency of the lean/rich cycle is of the order of about 60 seconds lean and 5 second rich. Desulfation of the LNT is less frequent but the period of enrichment may be longer. However, control of the desulfation event also requires a specially programmed engine control unit.

The composite oxidation catalyst of the present invention may be distinguished from a LNT in at least two significant ways. Firstly, LNTs are not used in treating exhaust gas from heavy-duty diesel engines, which instead use SCR catalysts. This is primarily because a LNT catalyst for a heavy-duty diesel vehicle would need to be so voluminously large that the cost of the platinum group metals required would make the cost of the catalyst prohibitive. Secondly, preferably the composite oxidation catalyst of the present invention contains substantially no ceria, doped ceria or ceria mixed oxide or composite oxide components.

Where the first catalyst washcoat zone comprises an alkaline earth metal for the purposes of generating an exotherm, optionally for catalyst washcoat zones other than the first catalyst washcoat zone, such other zones may show increased NO oxidation where there is a lower alkaline earth metal loading or substantially no alkaline earth metal present in a zone or zones other than the first catalyst washcoat zone.

According to the first invention aspect, the first catalyst washcoat zone can comprise one or more first alkaline earth metal component supported on the first, refractory metal oxide support material. The inventors have found that, for the purpose of generating an exotherm from hydrocarbon fuel, the presence of an alkaline earth metal component, preferably comprising barium, improves HC conversion to such an extent that the quantity of one or more platinum group metal in the first catalyst washcoat zone can be reduced by approximately 7 g/ft³ and still have the same activity. It is believed that the relatively high platinum group metal loading in the first catalyst washcoat zone rapidly starts and accelerates the exotherm reaction, whilst the presence of the one or more alkaline earth metal stabilises the PGM, e.g. by reducing sintering and improving thermal durability.

The one or more alkaline earth metal component in the first catalyst washcoat zone is preferably barium (Ba) or strontium (Sr), preferably Ba, e.g. the one or more first alkaline earth metal components in the first catalyst washcoat zone consists of barium.

Reasons for preferring barium over other alkaline earth metals is explained under the heading "Non-uniform distribution of alkaline earth metal component and/or platinum group metal component in washcoat layer" hereinbelow.

A total alkaline earth metal component loading in the first catalyst washcoat zone can be from 10-100 g/ft³ calculated as elemental metal, preferably 20-80 g/ft³. Too much alkaline earth metal component can be detrimental to exotherm generation. In this regard, weight ratio of total elemental alkaline earth metal to total elemental platinum group metal in the first catalyst washcoat zone can be <1:1, such as 1:1 to 1:2, preferably 1:1 to 50:80.

In a method of making the disclosed composite oxidation catalyst, the one or more first alkaline earth metal components can be present in the catalyst washcoat layer applied in step (a) and/or in the impregnation solution of step (b), but it is preferably present in the catalyst washcoat layer, e.g. the first catalyst washcoat layer, of step (a) of the sixth invention aspect. This is because, where the alkaline earth metal, e.g. barium, salts are present in the impregnation medium of step (b), they can be more difficult to control using preferred pH ranges for use of the platinum group metal salts in the impregnation medium and so many migrate by wicking away from the target first catalyst washcoat zone. Since there is more control available of eventual alkaline earth metal location in the finished product where the alkaline earth metal component is present in a washcoat, which is then dried and calcined after coating, this alternative is preferred.

It will be understood that where a catalyst washcoat layer, e.g. the first catalyst washcoat layer, comprising one or more alkaline earth metal is applied in step (a) and which catalyst washcoat layer is itself impregnated with a solution in step (b) comprising one or more alkaline earth metal components, a composition of the resulting impregnated zone is a combination of the content of alkaline earth metal component in the underlying catalyst washcoat layer and in the impregnating solution.

The second catalyst washcoat zone can also comprise one or more alkaline earth metal component, preferably comprising barium. This may be derived from one or more first alkaline earth metal component, preferably barium, being present in the catalyst washcoat layer of method step (a), e.g. the first catalyst washcoat layer, or where the composite oxidation catalyst comprises a third or fourth catalyst washcoat zone, the second catalyst washcoat layer. The one or more alkaline earth metal component present in the second catalyst washcoat layer may be referred to herein as one or more second alkaline earth metal component. The third and fourth catalyst washcoat layer may also include one or more second alkaline earth metal component, preferably barium.

The inventors have also found that there may be an advantage for improved exotherm generation at least from the first catalyst washcoat zone where there is a non-uniform distribution of the one or more platinum group metal component and/or the one or more first alkaline earth metal component in a direction perpendicular to the surface of the substrate. This is discussed in greater details under the "Non-uniform distribution of alkaline earth metal component and/or platinum group metal component in washcoat layer" heading below.

Refractory Metal Oxide Support Material

The first, second, third or fourth refractory metal oxide support material or the refractory metal oxide support material of the first and/or second catalyst washcoat layer is each generally selected from the group consisting of alumina, magnesia, silica, zirconia, titania, ceria and a composite oxide or a mixed oxide of two or more thereof. In principle any suitable refractory metal oxide support material may be used as the first refractory metal oxide support material. The support material of each of the first, second, third or fourth refractory metal oxide support material or the refractory metal oxide support material of the first or second catalyst washcoat layer can be the same as each other or different from each other. However, it will be appreciated that where the composite oxidation catalyst shown in FIG. 1 can be a single washcoat layer of length L impregnated at a first end to an axial length $L_1$ to define a first catalyst washcoat zone (1) and a second catalyst washcoat zone (2), the refractory metal oxide support material in the first and second catalyst washcoat zones will be the same.

Furthermore, in the embodiments comprising three and four catalyst washcoats zones shown in FIGS. 2-5 inclusive, if the refractory metal oxide support material(s) used in the first catalyst washcoat (6) is "X", because the first, second and (where present) fourth catalyst washcoat zones comprise a portion only of the whole length $L_3$ of the first catalyst washcoat layer (6), each of the first, second and (where present) fourth catalyst washcoat zones will each comprise the refractory metal oxide support material(s) "X", i.e. the first, second and (where present) fourth refractory metal oxide support material(s) will be the same. Similarly, where the second catalyst washcoat layer (7) in the embodiments shown in FIGS. 2-5 comprises refractory metal oxide support material(s) "Y", the third catalyst washcoat zone and where present the second or fourth catalyst washcoat zones which comprise overlap regions comprise a portion only of the whole length $L_4$ of the second catalyst washcoat layer (7) and so each of these zones will comprise the refractory metal oxide support material(s) "Y".

It is preferred that the refractory metal oxide support material is selected from the group consisting of alumina, silica, zirconia, ceria and a composite oxide or a mixed oxide of two or more thereof, most preferably selected from the group consisting of alumina, silica and zirconia and a composite oxide or a mixed oxide of two or more thereof. Mixed oxides or composite oxides include silica-alumina and ceria-zirconia, most preferably silica-alumina. Preferably, the refractory metal oxide support material does not comprise ceria or a mixed oxide or composite oxide including ceria. More preferably, the refractory oxide is selected from the group consisting of alumina, silica, and silica-alumina. The refractory oxide may be alumina. The refractory oxide may be silica. The refractory oxide may be silica-alumina.

Because the first catalyst washcoat zone comprises one or more first alkaline earth metal component supported on the first refractory metal oxide support material, preferably the first refractory metal oxide support material of the first catalyst washcoat zone or the underlying catalyst washcoat, e.g. the first catalyst washcoat, comprises, or consists essentially of, alumina doped with a heteroatom component. The heteroatom component typically comprises silicon, manganese (see hereinbelow) magnesium, barium, lanthanum, cerium, titanium, or zirconium or a combination of two or more thereof. The heteroatom component may comprise, or consist essentially of, or consist of, an oxide of silicon, an oxide of manganese, an oxide of magnesium, an oxide of barium, an oxide of lanthanum, an oxide of cerium, an oxide of titanium or an oxide of zirconium. More preferably, the alumina doped with a heteroatom component is alumina doped with silica or alumina doped with magnesium oxide or alumina doped with manganese oxide. Even more preferably, the alumina doped with a heteroatom component is alumina doped with silica. Alumina doped with a heteroatom component can be prepared using methods known in the art or, for example, by a method described in U.S. Pat. No. 5,045,519.

The inclusion of a dopant may stabilise the refractory metal oxide support material or promote catalytic reaction of the supported platinum group metal. Typically, the dopant may be selected from the group consisting of zirconium (Zr), titanium (Ti), silicon (Si), yttrium (Y), lanthanum (La), praseodymium (Pr), samarium (Sm), neodymium (Nd), barium (Ba) and an oxide thereof. In general, the dopant is different to the refractory metal oxide (i.e. the cation of the refractory metal oxide). Thus, for example, when the refractory metal oxide is titania, then the dopant is not titanium or an oxide thereof.

When the refractory metal oxide support material is doped with a dopant, then typically the refractory metal oxide support material comprises a total amount of dopant of 0.1 to 10% by weight. It is preferred that the total amount of dopant is 0.25 to 7% by weight, more preferably 2.5 to 6.0% by weight. Preferably the dopant is silica, because oxidation catalysts comprising such support materials in combination with platinum group metals and alkaline earth metals promote oxidation reactions, such as CO and hydrocarbon oxidation.

When the refractory metal oxide support material is a silica-alumina, then generally the refractory oxide consists essentially of 20 to 95% by weight of alumina and 5 to 80% by weight of silica (e.g. 50 to 95% by weight alumina and 5 to 50% by weight silica), preferably 35 to 80% by weight of alumina and 20 to 65% by weight silica (e.g. 55 to 80% by weight alumina and 20 to 45% by weight silica), even more preferably 45 to 75% by weight of alumina and 25 to 55% by weight silica. Silica-aluminas having higher silica content, e.g. approximately 30% by weight silica content, can provide greater sulfur tolerance to the composite oxidation catalyst as a whole When the refractory oxide is ceria-zirconia, then generally the refractory oxide consists essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

Typically, the first and second catalyst washcoat layers comprises an amount of the first refractory metal oxide support material of 0.1 to 3.5 g in$^{-3}$ (e.g. 0.25 to 3.0 g in$^3$), preferably 0.3 to 2.5 g in$^{-3}$, still more preferably 0.5 to 2.0 g in$^{-3}$, and even more preferably 0.6 to 1.75 g in$^3$ (e.g. 0.75 to 1.5 g in$^3$).

In general, the refractory metal oxide support materials for use in the present invention is in particulate form. The first support material may have a D$_{90}$ particle size of ≤ 50 μm, preferably ≤ 30 μm, and more preferably ≤ 20 μm (as determined by conventional laser diffraction techniques). The particle size distribution of the refractory metal oxide support material is selected to aid adhesion to the substrate. The particles are generally obtained by milling.

Additionally, the or each support material in each of the first, second, third or fourth refractory metal oxide support material and/or the refractory metal oxide support material of the first or second catalyst washcoat may or may not comprise, or consist essentially of, a hydrocarbon adsorbent. The hydrocarbon adsorbent may be selected from a zeolite, active charcoal, porous graphite and a combination of two or more thereof. Where present, it is preferred that the hydrocarbon adsorbent is a zeolite, most preferably an aluminosilicate zeolite.

When the support material comprises a hydrocarbon adsorbent, then typically the total amount of hydrocarbon adsorbent is 0.05 to 3.00 g in$^{-3}$, particularly 0.10 to 2.00 g in$^{-3}$ (e.g. 0.2 to 0.8 g in$^{-3}$).

When the hydrocarbon adsorbent is a zeolite, then preferably each zeolite is a medium pore zeolite (e.g. a zeolite having a maximum ring size of ten tetrahedral atoms) or a large pore zeolite (e.g. a zeolite having a maximum ring size of twelve tetrahedral atoms).

Examples of suitable zeolites or types of zeolite include faujasite (FAU), clinoptilolite, mordenite, silicalite (MFI), ferrierite, zeolite X (FAU), zeolite Y (FAU), ultrastable zeolite Y (FAU), AEI zeolite, ZSM-5 zeolite, ZSM-12 zeolite (MTW), ZSM-20 zeolite, ZSM-34 zeolite, CHA zeolite, SSZ-13 zeolite, SAPO-5 zeolite (AFI), offretite, a beta zeolite or a copper CHA zeolite. Where present, the zeolite is preferably ZSM-5 (a medium pore zeolite), a beta zeolite (a large pore zeolite) or a Y zeolite (a large pore zeolite). Where present, Y zeolite or Beta zeolite is preferred, with Beta zeolite being most preferred.

However, it is preferred according to the present invention that the platinum group metal-containing oxidation catalyst zones and layers do not comprise hydrocarbon adsorbents at all, particularly zeolites, because zeolites can be hydrothermally degraded during exotherm generation events, making their inclusion less desirable. The inclusion of hydrocarbon adsorbents in oxidation catalysts for heavy-duty vehicles is also less necessary because the exhaust gas temperatures emitted from heavy duty diesel engines rarely fluctuate in use below temperatures where hydrocarbon adsorption would be desirable to improve overall cycle hydrocarbon conversion.

Platinum Group Metal-Containing Catalyst Washcoat Zone Length

In embodiments comprising two platinum group metal-containing catalyst washcoat zones only, such as is shown in FIG. 1, the length of the first catalyst washcoat zone can be <50%, preferably 20 to 40% of the total substrate length.

However, in embodiments comprising three or four catalyst washcoat zones, e.g. those shown in any one of FIGS. 2-5 inclusive, the length of the first washcoat zone can be 15 to 35% of the total substrate length (L).

In embodiments comprising three or four catalyst washcoat zones, e.g. those shown in any one of FIGS. 2-5 inclusive, the length of the overlap region of the first and second catalyst washcoat layers (6, 7), i.e. the length of the second catalyst washcoat zone in FIGS. 2 and 4 or the length of the fourth catalyst washcoat zone in FIGS. 3 and 5 can be 10-40%, preferably 10-30% of the total substrate length (L).

In embodiments comprising three or four catalyst washcoat zones, e.g. those shown in any one of FIGS. 2-5 inclusive, the length of the third catalyst washcoat zone can be 10 to 40% of the total substrate length (L), more preferably 15-35%, such as 20-30% of the total substrate length (L).

In embodiments comprising four catalyst washcoat zones, e.g. those shown in FIGS. 3 and 5, the second catalyst washcoat zone in FIGS. 3 and 5 can be 1-40%, preferably 5-30% of the total substrate length (L).

In a particularly preferred embodiment, the inlet catalyst washcoat layer 6 is coated on the substrate first to a length of approximately 80% L and then the outlet catalyst washcoat layer 7 is coated on the substrate to a length of approximately 50% L, i.e. overlapping catalyst washcoat layer 6 by 30% L. The length of the first washcoat zone can be 15 to 35% of the total substrate length (L).

Since substrate lengths can vary, it is generally more useful to refer to lengths of the first, second and, where present, third and fourth catalyst washcoat zones by their axial lengths relative to the total axial substrate length, i.e. as a percentage or fraction. Generally, substrates with application in the present invention are 3 to 6 inches in length inclusive, more typically 4 to 6 inches. It is possible, therefore, to refer to a washcoat layer length or a washcoat zone length by reference to the percentage zone length x the total substrate length (L).

Non-Uniform Distribution of Alkaline Earth Metal Component and/or Platinum Group Metal Component in Washcoat Layer This aspect is illustrated in FIGS. 6 and 7 and as briefly described in the description of the drawings hereinabove.

In the first invention aspect, the first catalyst washcoat zone can have a non-uniform distribution of one or more platinum group metal components and/or one or more first alkaline earth metal components in a direction perpendicular to the surface of the substrate as determined by electron probe microanalysis (EPMA), wherein a concentration of the one or more platinum group metal components and/or the first alkaline earth metal components decreases in a perpendicular direction toward the surface of the substrate as determined by EPMA.

It has been found that a non-uniform vertical distribution of one or more platinum group metal components and/or one or more first alkaline earth metal components can be achieved within a single layer. Thus, the benefits associated with layering to achieve a non-uniform vertical distribution of these components through the layers of the catalyst can be obtained by using a single layer or fewer layers.

In the composite oxidation catalyst of the invention, the first catalyst washcoat zone can have a non-uniform distribution of one or more platinum group metal components and/or one or more first alkaline earth metal components in a direction perpendicular to the surface of the substrate, optionally in a single layer, e.g. a catalyst washcoat layer, such as the first catalyst washcoat layer (i.e. the catalyst layer does not comprise a plurality of layers).

Preferably, the catalyst washcoat layer has a non-uniform distribution of the one or more platinum group metal components and/or one or more alkaline earth metal components throughout its thickness (i.e. the direction perpendicular to the surface of the substrate represents the thickness of the catalyst layer), most preferably both the one or more platinum group metal components and the one or more alkaline earth metal components.

Typically, the catalyst washcoat layer has a first surface and a second surface. Generally, the first surface is parallel (e.g. substantially parallel) to the second surface (i.e. the plane containing the first surface is parallel to the plane containing the second surface). The first surface and second surface are typically parallel to the surface of the substrate. Thus, the direction perpendicular to the surface of the substrate is also perpendicular to the first surface and/or the second surface.

The perpendicular distance between the first surface and the second surface is generally the thickness of the catalyst washcoat layer.

The first surface may be an exposed surface of the catalyst layer or an additional layer (e.g. second layer) may be disposed or supported on the first surface. The first surface is generally on the upper side (i.e. it is the top surface) of the catalyst layer. By exposed, it is meant that the first surface is not completely or substantially covered by another material and typically an exhaust gas passing through the catalyst comes into contact with the first surface before the second surface.

The second surface is not an exposed surface of the catalyst washcoat layer. Generally, the second surface is in direct contact with a surface of the substrate and/or a surface of another layer. Thus, the second surface is generally the underside (i.e. it is the bottom or lowest surface) of the catalyst washcoat layer.

Preferably, the amount of the one or more platinum group metal components and/or the one or more first alkaline earth metal components decreases in a perpendicular direction toward the surface of the substrate (i.e. the amount of the one or more platinum group metal components and/or the one or more first alkaline earth metal components decreases from the first surface to the second surface). The amount of the one or more platinum group metal components and/or the one or more first alkaline earth metal components may continuously decrease or discontinuously decrease, preferably continuously decrease, in a perpendicular direction toward the surface of the substrate. Thus, when, for example, the first catalyst washcoat zone comprises a single layer, which is a catalyst washcoat layer, then the amount of the one or more platinum group metal components and/or the one or more first alkaline earth metal components decreases from an exposed surface of the catalyst washcoat layer toward the surface of the substrate.

The catalyst washcoat layer may have a linear or non-linear rate of decrease in the amount of the one or more platinum group metal components and/or the one or more first alkaline earth metal components in a perpendicular direction toward the surface of the substrate (i.e. a linear or a non-linear rate of decrease in the amount of the first platinum group metal in a perpendicular direction from the first surface to the second surface).

Typically, at least 60% of the total amount of the one or more platinum group metal components and/or the one or more first alkaline earth metal components (e.g. of the catalyst washcoat layer) can be distributed between the first surface and a point or a plane in the catalyst washcoat layer that is half way between the first surface and the second surface (e.g. at 50% of the perpendicular distance between the first surface and the second surface). The plane is typically parallel to the first surface. The reference to "halfway between" in this context generally refers to the mean halfway distance between the first surface and the second surface. It is preferred that at least 70%, more preferably at least 75%, such as at least 80%, still more preferably at least 90%, of the total amount of the one or more platinum group metal components and/or the one or more first alkaline earth metal components (e.g. of the catalyst washcoat layer) can be distributed between the first surface and a point or a plane in the catalyst washcoat layer that is half way between the first surface and the second surface.

Generally, at least 60% of the total amount of the one or more platinum group metal components and/or the one or more first alkaline earth metal components (e.g. of the catalyst washcoat layer) can be distributed between the first surface and a point or a plane in the catalyst washcoat layer that is 25% of the perpendicular distance from the first surface to the second surface. The plane is typically parallel to the first surface. It is preferred that at least 70%, more preferably at least 75%, such as at least 80%, still more preferably at least 90%, of the total amount of the one or more platinum group metal components and/or the one or more first alkaline earth metal components (e.g. of the catalyst washcoat layer) can be distributed between the first surface and a point or a plane in the catalyst washcoat layer that is 25% of the perpendicular distance from the first surface to the second surface.

At least 60% of the total amount of the one or more platinum group metal components and/or the one or more first alkaline earth metal components (e.g. of the catalyst washcoat layer) can be distributed between the first surface and a point or a plane in the catalyst washcoat layer that is 10% of the perpendicular distance from the first surface to the second surface. The plane is typically parallel to the first surface. It is preferred that at least 70%, more preferably at least 75%, such as at least 80%, still more preferably at least 90%, of the total amount of the one or more platinum group metal components and/or the one or more first alkaline earth metal components (e.g. of the catalyst washcoat layer) can be distributed between the first surface and a point or a plane in the catalyst washcoat layer that is 10% of the perpendicular distance from the first surface to the second surface.

The non-uniform distribution of the first platinum group metal in a direction perpendicular to the surface of the substrate may, in general, be a gradated distribution of the one or more platinum group metal components and/or the one or more first alkaline earth metal components. Alternatively, the non-uniform distribution of the first platinum group metal in a direction perpendicular to the surface of the substrate may be a stepwise distribution of the one or more platinum group metal components and/or the one or more first alkaline earth metal components.

The catalyst washcoat layer may have a uniform horizontal distribution or a non-uniform horizontal distribution of the one or more platinum group metal components and/or the one or more first alkaline earth metal components.

Typically, the distribution of the one or more platinum group metal components and/or the one or more first alkaline earth metal components in a direction parallel to the surface of the substrate (i.e. a longitudinal plane) and perpendicular to a central longitudinal axis of the substrate (i.e. direction parallel to the inlet end face and/or the outlet end face of the substrate) is uniform or non-uniform. It is preferred that the distribution of the first platinum group metal in a direction parallel to the surface of the substrate and perpendicular to a central longitudinal axis of the substrate is uniform.

Generally, the distribution of the one or more platinum group metal components and/or the one or more first alkaline earth metal components in a direction parallel to the surface of the substrate (i.e. a longitudinal plane) and parallel to a central longitudinal axis of the substrate (i.e. direction perpendicular to the inlet end face and/or the outlet end face of the substrate) may be uniform or non-uniform. It is preferred that the distribution of the one or more platinum group metal components and/or the one or more first alkaline earth metal components in a direction parallel to the surface of the substrate and parallel to a central longitudinal axis of the substrate is uniform.

Methods of obtaining the non-uniform distribution of one or more platinum group metal components and/or the one or more first alkaline earth metal components in the first catalyst washcoat zone in a direction perpendicular to the surface of the substrate is regular heat drying of solute salt of one or more platinum group metal components impregnated into a washcoat coating comprising one or more platinum group metal and the first refractory metal oxide support material, wherein the one or more first alkaline earth metal components are present in the washcoat coating and/or as a solute salt in an impregnation medium with the solute salt of one or more platinum group metal components. Preferably, the first alkaline earth metal components are present in the washcoat coating onto which the one or more platinum group metal components are impregnated. Impregnation is a common general knowledge technique discussed e.g. at Chapter 2.3 of Heck et al., "Catalytic Air Pollution Control—Commercial Technology", third edition (2009), John Wiley & Sons, Inc. This reference chapter also discusses heat drying and calcination. The inventors found that an alternative drying method, freeze drying (see for example WO 2009/080155), which forms well dispersed alkaline earth metal particles in a direction perpendicular to the surface of the substrate, produces less useful exotherms. Further explanation can be found under the "Methods of Making" heading hereinbelow.

It is preferred that the alkaline earth metal is barium. We have found in using non-barium alkaline earth metals, e.g. as their acetates, that non-barium alkaline earth metal salts are less mobile in the drying step and so tend not to form such a non-uniform distribution as for alkaline earth metals salts such as strontium, calcium or magnesium. Applicant believes that the presence of platinum group metal, particularly palladium, and barium at the upper surface of the catalyst washcoat layer, e.g. in a so-called "crust" is beneficial to the exotherm generation function which is the primary intention of the composite oxidation catalyst of the present invention. Preferably, therefore, in addition to there being a non-uniform distribution of a barium component in a direction perpendicular to the surface of the substrate as determined by EPMA, wherein a concentration if the barium component decreases in a perpendicular direction toward the surface of the substrate, also the concentration of palladium decreases in a perpendicular direction toward the surface of the substrate.

Washcoat Overlayer

According to the invention, a washcoat overlayer extends axially from the first substrate end for up to 200% of the axial length of the underlying first catalyst washcoat layer, which washcoat overlayer comprising a particulate metal oxide loading of >0.8 g/in$^3$, wherein the particulate metal oxide is an aluminosilicate zeolite including at least one of copper, iron and manganese, preferably copper only or combinations comprising both copper and manganese; or copper and iron.

In embodiments wherein where the aluminosilicate zeolite in the washcoat overlayer includes copper, the aluminosilicate zeolite can also include cerium. The benefits of including cerium with the copper for SCR catalyst activity are disclosed in Applicant's WO 2013/079954 (incorporated herein by reference).

The total amount of copper, iron, manganese and, where present, cerium included in the aluminosilicate zeolite of the washcoat overlayer can be 0.1 to 20.0 wt. %, such as about 0.5 wt. % to about 15 wt. %; or 0.10% and about 10% by weight of the total weight of the catalyst. Preferably, the total amount of copper, iron, manganese and, where present, cerium included in the aluminosilicate zeolite of the washcoat overlayer is about 1 wt. % to about 9 wt. %, most preferably about 0.2% and about 5% by weight of the total weight of the catalyst.

Regarding cerium loading specifically, the cerium loading can be 0.5 to 5.0 wt % based on the total weight of the aluminosilicate zeolite, copper and cerium, preferably 0.8 to 2.0 wt % and most preferably 0.8-1.5 wt %. Depending on washcoat loading, the cerium content is about 20 to 50 in g/ft$^3$.

According to the invention, the washcoat overlayer extends axially for up to 200%, optionally 150% of the axial length of the underlying first catalyst washcoat layer from the first substrate end in order thereby to protect it from phosphorus and/or zinc poisoning when in use in an exhaust system of a heavy-duty diesel engine, preferably for >50% of the axial length of the underlying first catalyst washcoat zone, such as >60%, >70%, >80%, >90% or >100% or up to 120% of the axial length thereof. The preferred parameter range of axial length of the washcoat overlayer relative to the underlying first catalyst washcoat layer is typically dictated by the total number of zones in the underlying platinum group metal-containing first catalyst washcoat layer. For example, where an underlying first catalyst washcoat zone and an underlying first catalyst washcoat layer have the same axial length, e.g. in two zone embodiments such as that shown in FIG. 9, the washcoat overlayer can extend to longer percentages of axial length, e.g. <200%, of the underlying catalyst washcoat layer (see also the embodiments in Example 1 where the axial length of the washcoat overlayer is 166% that of the underlying first washcoat layer/zone). However, in embodiments wherein the first catalyst washcoat zone is formed of a portion only of an axially longer underlying catalyst washcoat layer (see e.g. layer (6/8) in the three and four zone embodiments shown in FIGS. 2 to 5, the parameter range of axial length of the washcoat overlayer can be at a lower end of the scale. In this respect, see the specific embodiment of Example 3 hereinbelow, based on the construction of FIG. 5, wherein the washcoat overlayer "G" is 120% of the axial length of the first washcoat zone (6/8). However, it also noted that in Example 2B, the NO$_2$/NO$_x$ generated by the composite oxidation catalyst in use is influenced by the axial length of the washcoat overlayer, i.e. the % axial length of the "exposed" catalyst washcoat layer at the outlet end of the composite oxidation catalyst. In particular, a longer % axial length of exposure has been found to increase the NO$_2$/NO$_x$ generated in the composite oxidation catalyst relative to a shorter % axial length of exposure.

The aluminosilicate zeolite including at least one of copper, iron and manganese and, where present, cerium is active for catalysing reactions (1)-(3) inclusive hereinabove. In combination with the underlying platinum group metal-containing first catalyst washcoat zone and/or layer, the composite catalyst can catalyse the reactions (1)-(5) inclusive. That is, the washcoat overlayer can be described as a selective catalytic reduction (SCR) catalyst.

SCR catalysts comprising aluminosilicate zeolites are known. A zeolitic molecular sieve is a microporous aluminosilicate having any one of the framework structures listed in the Database of Zeolite Structures published by the International Zeolite Association (IZA).

In embodiments wherein the particulate metal oxide comprises aluminosilicate zeolite, examples of suitable zeolites or zeolite framework types include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-13 zeolite, offretite, a beta zeolite or a copper CHA zeolite. The zeolite is preferably ZSM-5, a beta zeolite or a Y zeolite. The aluminosilicate zeolite can include one or more base metals, such as at least one of copper, iron or manganese. For example, where the aluminosilicate zeolite is has the CHA framework type code, the CHA can be promoted with copper.

The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200 or preferably 5 to 50.

Any of the SCR catalysts can comprise a small pore, a medium pore or a large pore molecular sieve, or a mixture thereof. A "small pore molecular sieve" is a molecular sieve containing a maximum ring size of 8 tetrahedral atoms. A "medium pore molecular sieve" is a molecular sieve containing a maximum ring size of 10 tetrahedral atoms. A "large pore molecular sieve" is a molecular sieve having a maximum ring size of 12 tetrahedral atoms.

Any of the SCR catalysts can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SFW, SIV, THO, TSC, UEI, UFI, VNI, YUG, and ZON, and mixtures and/or intergrowths thereof. Preferably the small pore molecular sieve is selected from the group of Framework Types consisting of CHA, LEV, AEI, AFX, ERI, SFW, KFI, DDR and ITE.

Any of the SCR catalysts can comprise a medium pore molecular sieve selected from the group of Framework Types consisting of AEL, AFO, AHT, BOF, BOZ, CGF, CGS, CHI, DAC, EUO, PER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore molecular sieve selected from the group of Framework Types consisting of MFI, FER and STT.

Any of the SCR catalysts can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of MOR, OFF and BEA.

It will be noted that, hereinabove, it is preferred according to the present invention that the platinum group metal-containing oxidation catalyst zones and layers do not comprise zeolite hydrocarbon adsorbents at all because zeolites can be hydrothermally degraded during exotherm generation events, making their inclusion less desirable. For this reason, it is preferred that the aluminosilicate zeolites for use in the washcoat overlayer consist of small pore zeolites, according to the above definition.

The molecular sieves in the Cu-SCR and Fe-SCR catalysts are preferably selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, BEA, MFI and FER and mixtures and/or intergrowths thereof. More preferably, the molecular sieves in the Cu-SCR and Fe-SCR are selected from the group consisting of AEI, AFX, CHA, DDR, ERI, ITE, KFI, LEV, SFW, BEA, MFI and FER, and mixtures and/or intergrowths thereof.

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zero valent metal atoms or clusters, isolated cations, mononuclear or polynuclear oxycations, or as extended metal oxides. Preferably, the metals can be iron, copper, and mixtures or combinations thereof.

The metal can be combined with the zeolite using a mixture or a solution of the metal precursor in a suitable solvent. The term "metal precursor" means any compound or complex that can be dispersed on the zeolite to give a catalytically active metal component. Preferably the solvent is water due to both economics and environmental aspects of using other solvents. When copper, a preferred metal is used, suitable complexes or compounds include, but are not limited to, anhydrous and hydrated copper sulfate, copper nitrate, copper acetate, copper acetylacetonate, copper oxide, copper hydroxide, and salts of copper ammines (e.g. $[Cu(NH_3)_4]^{2+}$). This invention is not restricted to metal precursors of a particular type, composition, or purity. The molecular sieve can be added to the solution of the metal component to form a suspension, which is then allowed to react so that the metal component is distributed on the zeolite. The metal can be distributed in the pore channels as well as on the outer surface of the molecular sieve. The metal can be distributed in ionic form or as a metal oxide. For example, copper may be distributed as copper (II) ions, copper (I) ions, or as copper oxide. The molecular sieve containing the metal can be separated from the liquid phase of the suspension, washed, and dried. The resulting metal-containing molecular sieve can then be calcined to fix the metal in the molecular sieve.

Furthermore, as explained in the introduction to this specification, lubricants for heavy-duty vehicles have a relatively high content of additives comprising zinc and/or phosphorus. As a result, when in use, over a lifetime of vehicular use, catalysts in exhaust systems of heavy-duty vehicles are exposed to relatively high quantities of zinc and/or phosphorus compounds. Applicant's inventors analysed an oxidation catalyst which was the first catalysed substrate disposed in the exhaust system downstream of a vehicular Euro 6 heavy-duty diesel engine at end of vehicle life (about 1 million kilometres) and found between 1.0 and 1.5 wt. % phosphorus present on the oxidation catalyst in the first quarter of the coated substrate measured from the substrate inlet end.

In the present invention, the first catalyst washcoat zone can have the highest loading of platinum group metal on the substrate and is present in the zone defined at the first substrate end corresponding to the inlet end when in use for generating an exotherm from increased quantities of hydrocarbon present in the exhaust gas. Therefore, the presence of the catalyst poisons zinc and/or phosphorus in exhaust gas entering the inlet end of the composite oxidation catalyst can have a disproportionate effect on reducing the activity of the catalyst to generate an exotherm from hydrocarbon, by requiring additional hydrocarbon to achieve a desired exotherm temperature, thus indirectly reducing vehicle fuel economy; and/or by increasing the hydrocarbon light-off temperature, i.e. the temperature at which the catalyst is active to begin oxidising hydrocarbons and so generating an exotherm relative to an oxidation catalyst homogenously coated with the same washcoat composition (see e.g. Examples 2A and 7 hereinbelow). Thus, hydrocarbons introduced into exhaust gas at relatively lower temperatures at which ordinarily it would be expected that a particular exotherm would be generated may result in a lower exotherm and increased hydrocarbon slip and so higher hydrocarbon emissions to atmosphere and/or hydrocarbon fouling of downstream exhaust system components or processes and/or an on-board diagnostic (OBD) failure mode.

Applicant's inventors have researched into ways of reducing or preventing the poisoning effects of phosphorus and/or zinc compounds on the composite oxidation catalyst function and have found that, by disposing a washcoat layer as an overlayer on the first catalyst washcoat zone at sufficient loading (correlating to a washcoat layer thickness), optionally wherein the washcoat contains a particulate metal oxide of sufficient mean pore size diameter and/or the resulting washcoat has sufficient mean interparticle pore size, contact by phosphorus and/or zinc compounds with the underlying first catalyst washcoat zone can be prevented or reduced and a higher proportion of fresh catalyst activity retained while the catalyst is in use than a catalyst without using such additional feature while retaining mass transfer access of exhaust gas to the underlying first catalyst washcoat zone. In the present invention, the particulate metal oxide comprises aluminosilicate zeolite.

Applicant's research has found that the depth of the washcoat overlayer appears to be important for achieving the desired function as a guard bed for phosphorus and/or zinc compounds, because a relatively low loading of a washcoat overlayer of 0.5 g/in$^3$ was found not to be as effective as a washcoat overlayer loading of 1.0 g/in$^3$ (see Examples 3 and 4 hereinbelow).

The washcoat overlayer may consist essentially of the aluminosilicate zeolite, wherein the washcoat overlayer may comprise certain binders or additives to assist in processing e.g. powder flow, washcoat rheology modifiers etc. That is, although catalyst components such as barium or one or more platinum group metals may wick or migrate into the washcoat overlayer from an underlayer during manufacture of the composite oxidation catalyst, the particulate metal oxide is coated, e.g. in a washcoat, which does not include such metals and it is not intended that such metals should enter the washcoat overlayer. In this context, the term "consisting essentially" used hereinabove is intended to embrace an end-product wherein any such metals unintendedly migrate into the washcoat overlayer.

Typically, the washcoat overlayer has a loading of the particulate metal oxide of 0.8 to 3.5 g in$^3$, preferably 0.9 to 2.5 g in$^3$, still more preferably 1.0 to 2.0 g in$^3$, such as 1.1 to 1.75 g in$^{-3}$. As can be seen from Examples 2A and 2B, higher washcoat loadings may reduce the $NO_2/NO_x$ generated in the composite oxidation catalyst; and—in composite exhaust catalysts used for generating an exotherm from an increased concentration of hydrocarbon fuel in the exhaust gas—a higher washcoat loading in the washcoat overlayer can increase the catalyst bed temperature from which exotherm can be generated. Therefore, a balance is desirable between these functions and SCR catalyst activity to promote reactions (1)-(3) inclusive.

Preferably the washcoat overlayer is coated directly on the washcoat of the first catalyst washcoat zone. However, it is within the scope of the present invention for there to be one or more washcoat layers in between a first catalyst washcoat layer of the first catalyst washcoat zone and the washcoat overlayer of the preferred arrangement.

The aluminosilicate zeolites for use in the present invention can have one or both of a mean pore diameter and an interparticle pore diameter of ≥10 nm. Preferably the mean pore diameter or the interparticle pore diameter is ≥12 nm or ≥15 nm. Applicant has found that certain parameters of particulate metal oxides can undesirably reduce the hydrocarbon oxidation activity of the underlying first catalyst washcoat zone. Thus, when Applicant tested colloidal silica (Ludox™) as a possible particulate metal oxide for use in the washcoat overlayer, it was found that the washcoat layer was insufficiently porous and permeable sufficiently to maintain the oxidation function of the underlying first catalyst washcoat layer. That is, the hydrocarbon oxidation in the composite oxidation catalyst including the colloidal silica as the particulate metal oxide was gas mass transfer limited. Although a lower loading of colloidal silica could have improved mass transfer, the protection effect of the washcoat overlayer was expected to be insufficient (cf. the washcoat loading limitation of ≥0.8 g/in³ discussed hereinabove).

Therefore, in order to better maintain the primary hydrocarbon oxidation function of the composite oxidation catalyst, the particulate metal oxide has a mean pore diameter of ≥10 nm and/or the washcoat overlayer has a mean interparticle pore diameter of ≥10 nm.

The mean interparticle pore diameter of a washcoat overlayer can be determined by mercury porosimetry.

The mean pore diameter of a particulate metal oxide can be determined by $N_2$ adsorption-desorption isotherms using the Barrett-Joyner-Halenda (BJH) methodology.

Where a particulate metal oxide has a bimodal pore diameter, the requirement is met where at least one of the two modes is at above a particle diameter of ≥10 nm. For the avoidance of doubt, the preferred particulate refractory metal oxide alumina doped with silica meets at least the general definition in this paragraph.

Aluminosilicate zeolites generally do not meet the requirement of a mean pore diameter of ≥10 nm. The feature that an interparticle pore diameter of ≥10 nm can be obtained by appropriate selection of particle size, i.e. particle size distribution. As explained hereinabove in connection with colloidal silica, where the particles of the washcoat are too fine, the interparticle pores are too small to maintain mass transfer of exhaust gas with the underlying first catalyst washcoat layer. By appropriate selection of particle size, it is possible to obtain interparticle pores between particles of appropriate size to meet the preferred condition of an interparticle pore diameter of ≥10 nm.

For example, the particles of the particulate metal oxide may have a D90 of <100 micron. The particles of the particulate metal oxide may preferably have a D90 of <75 micron, such as <50 micron (e.g. <30 micron), and more preferably <20 micron, such as <15 micron. When the refractory oxide has a smaller D90 better packing and adhesion can be obtained.

As is known in the art, the D90 is a value of the particle size at which 90% of the particles in a distribution have a particle size below this value. For the avoidance of doubt, d90 measurements can be obtained by Laser Diffraction Particle Size Analysis using a Malvern Mastersizer 2000™, which is a volume-based technique (i.e. D90 may also be referred to as Dv90 (or D(v,0.90)) and applies a mathematical Mie theory model to determine a particle size distribution.

Typically, the particles of the particulate metal oxide have a D90 of >0.1 micron. It is preferred that the particles of the particulate metal oxide have a D90 of >1.0 micron, such as >5.0 micron.

The specific surface area of the aluminosilicate zeolites for use in the present invention is also believed to be important because the higher the specific surface area of the particulate metal oxide component, the greater the expected capacity of the washcoat overlayer to adsorb, e.g. glassy zinc phosphate compounds derived from the lubricant additives.

Generally, the specific surface area of all aluminosilicate zeolites is significantly higher than 100 m²/g, particularly ≥ about 200 m²/g. However, for the avoidance of doubt, aluminosilicate zeolites for use in the present invention have a specific surface area (SSA) ≥ about 100 m²/g (>about 100 m²/g), preferably ≥ about 120 m²/g (>about 120 m²/g), such as ≥ about 150 m²/g () about 150 m²/g), ≥ about 180 m²/g (>about 180 m²/g) or ≥ about 200 m²/g (>about 200 m²/g).

The mean specific surface area (SSA) of the particles of the refractory oxide can be determined by nitrogen physisorption at −196° C. using the volumetric method. The mean SSA is determined using the BET adsorption isotherm equation.

Manganese Addition to Outlet Catalyst Washcoat Layer for Improved $NO_2$ Management and Exotherm Behaviour During research into the development of the four-zone composite oxidation catalyst shown in FIG. 5, Applicant has found that manganese added to the third catalyst washcoat zone defined at a second end thereof by the second (i.e. outlet) substrate end as part of the second catalyst washcoat layer (7) applied from a second (outlet) substrate end can beneficially promote exotherm generation and/or avoid generated exotherm extinction during active filter regeneration, enhance the activity of a downstream SCR catalyst to reduce oxides of nitrogen ($NO_x$) to $N_2$ and/or improve nitrogenous reductant injection management for use in the downstream SCR catalyst. These observations can be applied equally inter alia to two-, three- and four-zone composite oxidation catalysts according to the invention.

With regard to enhancing the activity of a downstream SCR catalyst to reduce $NO_x$ to $N_2$, as described hereinabove, it is known that, in an exhaust gas comprising both nitrogen monoxide and nitrogen dioxide, SCR catalysis proceeds via a combination of SCR reactions comprising reactions (1)-(3) inclusive, all of which reduce $NO_x$ to elemental nitrogen ($N_2$).

A relevant undesirable, non-selective side-reaction is according to reaction (6):

$$2NH_3 + 2NO_2 \rightarrow N_2O + 3H_2O + N_2 \qquad (6)$$

In practice, reactions (1)-(3) inclusive occur simultaneously, with the dominant reaction being that which is favoured inter alia according to the kinetics of the reaction and the relative concentrations of the reactants. Kinetically, reaction (2) is relatively slow compared with reaction (1), and reaction (3) is quickest of all. Therefore, according to this chemistry, SCR catalysis operates most efficiently where the $NO_2/NO_x$ ratio in the exhaust gas entering the downstream SCR catalyst is approximately 0.5, i.e. a ratio of 1:1 $NO:NO_2$, according to reaction (3).

Applicant's researchers have found that by including manganese in the third catalyst washcoat zone of the composite oxidation catalyst shown in FIG. 5 as part of the second catalyst washcoat layer (7), peak passive NO oxidation activity, i.e. NO oxidation activity taking place between active exotherm/regeneration events, can be suppressed. "Peak passive NO oxidation activity" is illustrated by the values in the "Fresh $NO_2/NO_x$ at 300° C. (%)" column of Tables 7 and 8.

By suppressing peak oxidation activity using manganese, Applicant's researchers found that $NO_2/NO_x$ for a "fresh" and "aged" composite oxidation catalyst can be moderated for a significant portion of a vehicle's useful life to a more stable 0.55 to 0.45, i.e. a "sweet-spot" for performing reaction (3) on a downstream SCR catalyst, instead of the kinetically slower, less efficient $NO_x$ reduction reaction (2). If the activity of the fresh catalyst passively to oxidise NO is too high, peak $NO_2/NO_x$ content in the exhaust gas can be increased to in excess of 0.65, not only pushing the exhaust gas composition away from the preferred $NO:NO_2$ ratio of 1:1 to promote reaction (3) in a downstream SCR catalyst, but, secondly, also promoting the slowest reaction (2). Furthermore, excess $NO_2$ can undesirably lead to the formation of $N_2O$ according to reaction (4).

On improving nitrogenous reductant injection management for use in a downstream SCR catalyst, Applicant's researchers also found that where the third zone comprised manganese, the difference (delta) between the fresh and aged passive NO oxidation activity of the composite oxidation catalyst as a whole was reduced (see the results presented in Tables 7 and 8). That is, the resulting $NO_2/NO_x$ value in the exhaust gas downstream of the composite oxidation catalyst was more predictable over the lifetime of the vehicle exhaust system as the catalyst starts fresh and becomes steadily aged through use. In practice, this observation is significant because the SCR catalytic reaction generally requires the provision of a nitrogenous reductant (see reactions (1) to (3) hereinabove). Typically, this nitrogenous reductant is ammonia ($NH_3$), which is carried on a vehicle in the form of a precursor, urea, for delivery into a flowing exhaust gas via an injector. In contact with hot exhaust gas, the urea decomposes to ammonia and water vapour. It can be seen from reactions (1) to (3) that, depending on what reaction is dominant at any particular time, subtly different quantities of ammonia nitrogenous reductant are required to achieve the most efficient reduction of total $NO_x$ if $NH_3$ slip is to be avoided.

An additional level of complexity is that the ability of an oxidation catalyst to oxidise NO to $NO_2$ generally diminishes over time through use; so-called "ageing". This loss of activity over time leads to increased burden in designing control systems for delivering nitrogenous reductant because the gradual loss in activity will need to be compensated for in system program algorithms. However, by lowering the delta between fresh and aged NO oxidation activity, in addition to suppressing higher NO oxidation activity thereby "focusing" $NO_2/NO_x$ to around 0.5 as described hereinabove, it should be less complicated for a heavy-duty diesel vehicle manufacturers to manage system programming control of nitrogenous reductant injection over the lifetime of a vehicle.

Thirdly, and very surprisingly, as shown in Example 9 hereinbelow, Applicant's researchers found that the inclusion of manganese in the third washcoat zone/second washcoat layer can beneficially promote exotherm generation and/or avoid generated exotherm extinction during active filter regeneration. This observation could allow for the functionality of the composite oxidation catalyst to be maintained while exchanging lower cost base metal, i.e. manganese, for significantly higher cost platinum group metals.

In exhaust system after-treatment, manganese can be affected by sulphur poisoning. Palladium is also known to suffer from palladium poisoning. For this reason, it may be preferable to avoid including palladium in addition to the manganese in the manganese-containing catalyst washcoat layer and/or zone. However, as mentioned hereinabove, palladium at relatively low content can improve the stability of the platinum component in the zone. In this regard, it is preferred for the manganese-containing catalyst washcoat layer and/or zone to contain a platinum-rich weight ratio of Pt:Pd, $\geqslant$ 10:1, e.g. or else the one or more platinum group metals in the manganese-containing catalyst washcoat layer and/or zone can consist essentially of, or consist of, platinum (e.g. a Pt:Pd weight ratio of 1:0).

To benefit from the described technical effects of manganese inclusion, a platinum group metal loading in the manganese-containing catalyst washcoat layer and/or zone is preferably $\geqslant$ 2 $gft^{-3}$, preferably 5 to 15 $gft^{-3}$, such as 7 to 13 $gft^{-3}$.

Additionally, Applicant has found that the technical effect of manganese-reduced fresh-to-aged NO oxidation-to-$NO_2$ "delta" can be enhanced by appropriate selection of refractory metal oxide support material in the catalyst washcoat zone defined at a second end thereof by the second substrate end, e.g. the third catalyst washcoat zone, and/or in the second catalyst washcoat layer.

In this regard, Applicant noticed a benefit for alumina doped with a heteroatom support materials, wherein preferably the heteroatom is silicon and/or manganese; or is a mixed magnesium aluminium metal oxide. The manganese can be present as the heteroatom as such and/or introduced as a soluble salt in combination with a washcoat refractory metal oxide support material, such as the mixed magnesium aluminium metal oxide or silica-doped alumina support material, e.g. as manganese nitrate, followed by precipitation onto the support material using a reducing agent such as using citric acid, tetrabutylammonium hydroxide, formic acid, ascorbic acid etc. A refractory metal oxide support comprising doped manganese can in turn be impregnated with additional manganese.

Accordingly, the refractory metal oxide support material in a manganese-containing zone or layer can comprise alumina doped with silica, alumina doped with manganese, alumina doped with both silica and manganese, a mixed magnesium aluminium metal oxide or a "pre-formed" mixed magnesium aluminium metal oxide doped with manganese. The impregnated manganese component can be supported on the refractory metal oxide support material.

The mixed magnesium aluminium metal oxide can have a pre-calcined magnesium content, calculated as Mg, of less than or equal to 15 wt %, e.g. 0.1 to 12 wt. % or 2.0 to 10 wt. %. The calcined support material comprising mixed magnesium aluminium metal oxide can comprise a magnesium deficient, i.e. non-stoichiometric, spinel. Most preferably, the manganese-containing refractory metal oxide support material is the "pre-formed" mixed magnesium aluminium metal oxide doped with manganese. The amount of manganese dopant in the manganese-doped magnesium aluminium metal oxide can be 1-15 wt % calculated as $MnO_2$ Example 9 shows that samples comprising manganese-doped magnesium aluminium metal oxide showed a surprising improvement in exotherm generation from lower temperature as demonstrated by the "continuous exotherm" test, in addition to a reduced $NO_2/NO_x$ "delta" between fresh and aged catalysts.

Substrate

Substrates for carrying catalyst washcoat layer and catalyst washcoat zone components of the composite oxidation catalyst of the present invention are well known in the art. Generally, the substrate is made from a ceramic material or a metallic material.

It is preferred that the substrate is made or composed of cordierite ($SiO_2$—$Al_2O_3$—$MgO$), silicon carbide (SiC), aluminium titanate (AT), Fe—Cr—Al alloy, Ni—Cr—Al alloy, or a stainless-steel alloy.

Typically, the substrate is a monolith, i.e. a monolith substrate. It is preferred that the monolith is a flow-through honeycomb monolith substrate or a filtering monolith substrate, most preferably a honeycomb flow-through monolith substrate.

It is preferred that the composite oxidation catalyst of the invention is for use as a diesel oxidation catalyst (DOC) or a catalysed soot filter (CSF). In practice, catalyst formulations employed in DOCs and CSFs are similar. Generally, however, a principle difference between a DOC and a CSF is the substrate onto which the catalyst formulation is coated and the amount of platinum group metal in the coating.

A flow-through monolith typically comprises a honeycomb monolith (e.g. a metal or ceramic honeycomb monolith) having a plurality of channels extending therethrough, which channels are open at both ends. When the substrate is a flow-through monolith, then the composite oxidation catalyst of the invention is typically called a diesel oxidation catalyst (DOC) or is for use as a diesel oxidation catalyst (DOC).

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channel and the outlet channels have a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard. When the substrate is a filtering monolith, then the oxidation catalyst of the invention is typically a catalysed soot filter (CSF) or is for use as a catalysed soot filter (CSF).

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

Heavy-Duty Engines

For the avoidance of doubt, heavy-duty engines according to the third aspect of the invention can use any of the definitions set out in the "Background to the Invention" section hereinabove. So, for example, where a patent application is for Japan, the heavy-duty diesel vehicle limitations required for emission standards in Japan can be incorporated into a claim to a vehicle. Similarly, for European or US etc. legislation. For the further avoidance of doubt, heavy-duty engines for use in the present invention are not managed to operate a lean/rich cycle suitable for normal operation or desulfation of a LNT catalyst. In preferred arrangements, the exhaust system according to the invention does not include a LNT.

The heavy-duty compression ignition engine according to the third aspect of the present invention is preferably a diesel engine, optionally a compressed natural gas (CNG) engine. The heavy-duty diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

When the internal combustion engine is a compression ignition engine, such as a diesel engine, for providing the motive power to a vehicle, then the vehicle may be a light-duty diesel vehicle or a heavy-duty diesel vehicle.

The term "light-duty diesel vehicle (LDV)" is defined in US or European legislation. In the US, a light-duty diesel vehicle (LDV) refers to a diesel vehicle having a gross weight of ≤ 8,500 pounds (US lbs).

In Europe, a light-duty diesel vehicle is defined as a vehicle in the categories $M_1$, $M_2$, $N_1$ and $N_2$ with a reference mass of ≤ 2610 kg (EU5/6).

In USA, a heavy-duty diesel vehicle (HDV) as defined in legislation, is a diesel vehicle having a gross vehicle weight rating of >8,500 pounds (US lbs) in the Federal jurisdiction and above 14,000 pounds in California (model year 1995 and later).

In Europe, a heavy-duty diesel vehicle is a vehicle designed and constructed for the carriage of goods and having a maximum mass (i.e. "maximum technically permissible laden mass") of more than 3.5 tonnes (i.e. metric tons) but either not exceeding 12 tonnes ($N_2$ category) or exceeding 12 tonnes ($N_3$ category), i.e. trucks; or a vehicle designed and constructed for the carriage of passengers comprising more than 8 seats in addition to the driver's seat and having a maximum mass either not exceeding 5 tonnes ($M_2$ category); or exceeding 5 tonnes ($M_3$ category), i.e. buses and coaches, according to EU legislation (Council Directive 2007/46/EC). China broadly follows the European definition.

In Japan, an HDV is a heavy commercial vehicle defined as having a gross vehicle weight >7500 kg.

In Russia and South Korea, the emission standards for heavy-duty vehicles are based on the European standards and so the above definitions for Europe apply.

In Brazil, an HDV is a motor vehicle for the transportation of passengers and/or goods, with a maximum gross vehicle weight higher than 3,856 kg or a vehicle curb weight higher than 2,720 kg.

In India, an HDV is a vehicle of gross vehicle weight >3,500 kg.

Methods of Making

Methods for making the oxidation catalyst of the invention are known in the art. See, for example, our WO 99/47260, WO 2007/077462 and WO 2011/080525. Similarly, the conditions for drying and calcining a washcoat are also well known.

As mentioned hereinabove, alternatively, according to the first invention aspect, the oxidation catalyst can comprise three or more catalyst washcoat zones, preferably four catalyst washcoat zones.

A method of making such a catalyst is as described hereinabove, wherein in step (a) the catalyst washcoat layer is a first catalyst washcoat layer which extends from the first substrate end to less than the total length of the substrate, which method further comprising a step (a') before step (a) or after step (a) but in either case before step (b) of applying a second catalyst washcoat layer to the substrate for a length extending from the second substrate end to less than the total length of the substrate, such that the first catalyst washcoat layer in part overlaps the second catalyst washcoat layer or the second catalyst washcoat layer in part overlaps the first catalyst washcoat layer, wherein the second catalyst washcoat layer comprises a refractory metal oxide support material and one or more platinum group metal component.

In this regard, preferably, the first catalyst washcoat layer can extend from the first substrate end and the second catalyst washcoat layer extends from the second substrate end, whereby the second catalyst washcoat layer in part overlaps the first catalyst washcoat layer.

In embodiments, this method can result in arrangements such as those shown in FIGS. 4 and 5, i.e. depending on the axial length of application of the second catalyst washcoat layer in step (a'), and so the axial length of an overlap of the first catalyst washcoat layer and the second catalyst washcoat layer, the first catalyst washcoat zone comprises a single layer of the first catalyst washcoat supported on the substrate surface. Depending on the axial length of application $L_1$ in step (b), the second or fourth catalyst washcoat zone can comprise the overlap of the first catalyst washcoat layer and the second catalyst washcoat layer. The third catalyst washcoat zone comprises a single washcoat layer supported on the substrate surface defined at a second end thereof by the second substrate end and at a first end thereof by a second end of the first catalyst washcoat layer, i.e. at a point where the second layer extending from the second substrate end in the direction of the first substrate end begins to overlap the first catalyst washcoat layer. Generally, the first end of the third catalyst washcoat zone is the second end of the second or fourth catalyst washcoat zone.

This arrangement is preferred because exhaust gas entering the oxidation catalyst of the invention at the first, inlet substrate end generally comes into contact with the overlap region catalyst washcoat zone before the third catalyst washcoat zone. The overlap catalyst washcoat zone (depending on the embodiment, either the second or fourth catalyst washcoat zone) acts as a "stabilizer" for the first catalyst washcoat zone. The overlap region catalyst washcoat zone acts as a "stabilizer" in the sense that it performs some or all of the oxidation reactions of the first catalyst washcoat zone, but the overlap region catalyst washcoat zone may have a higher light off temperature for HC and/or CO than that of the first catalyst washcoat zone.

It will be appreciated that in the sixth aspect of the invention, because the first catalyst washcoat zone is obtained in step (b) by impregnating the catalyst washcoat applied in step (a) that the refractory metal oxide support material in the first catalyst washcoat zone can be the same refractory metal oxide support material in the catalyst washcoat, e.g. the first catalyst washcoat layer, applied in step (a).

A first catalyst washcoat zone having a non-uniform distribution of one or more platinum group metal components and optionally one or more first alkaline earth metal components in a direction perpendicular to the surface of the substrate as determined by electron probe microanalysis (EPMA), wherein a concentration of the one or more platinum group metal components and optionally the first alkaline earth metal components decreases in a perpendicular direction toward the surface of the substrate as determined by EPMA, can be obtained, in general, by a method wherein one or more platinum group metal components and/or one or more first alkaline earth metal components does not fix rapidly to the refractory metal oxide support material and which is mobile within a drying washcoating. A washcoating containing one or more platinum group metal components can be applied to a substrate followed by a heat drying step and a calcination step using the conditions that allow movement of one or more platinum group metal components and optionally one or more first alkaline earth metal components within the coating before it is fixed into position. Such conditions are known in the art, particularly because conditions in the prior art are normally selected to rapidly fix the components of the coating (i.e. washcoat coating) to prevent their movement within the coating. That is, if there is an awareness of rapid fixing conditions to avoid movement of platinum group metal salts within a drying washcoat, by implication there is a recognition of conditions that allow for such movement.

The transfer of solutes to or away from a wet surface during evaporation is an effect that is known in other technical fields. The transfer of the first platinum group metal (i.e. a platinum group metal salt and/or an alkaline earth metal salt) within a wet coating can be represented by Richards' equation:

$$\frac{\partial \theta}{\partial t} = \frac{\partial}{\partial z}\left[K(\theta)\left(\frac{\partial \psi}{\partial z}\right) + 1\right]$$

wherein:

t is the time (e.g. the time before substantial or complete evaporation of the solvent (i.e. water)); $\theta$ is the solvent (i.e. water) content, typically of the coating; K is the hydraulic conductivity; z is the elevation; and $\psi$ is the pressure head. The hydraulic conductivity can be approximated by the hydraulic conductivity of the first support material and/or any other support material that may be present.

A method of achieving a catalyst washcoat zone having a non-uniform distribution of one or more platinum group metal components and/or one or more first alkaline earth metal components in a direction perpendicular to the surface of the substrate comprises:

(a) providing an aqueous slurry comprising a refractory metal oxide support material, one or more platinum group metal components and optionally one or more alkaline earth metal components;

(b) applying the aqueous slurry onto a substrate to form a washcoating; and (c) drying and calcining the washcoating, wherein the drying conditions allow at least the one or more platinum group metal components and optionally one or more alkaline earth metal components to flow toward or away from the substrate, such as to obtain a non-uniform distribution of the one or more platinum group metals and optionally one or more alkaline earth metal components in a direction perpendicular to a surface of the substrate.

The washcoating can comprise two or more platinum group metal components, wherein a first platinum group metal component can be referred to as a first platinum group metal component and a second platinum group metal component can be referred to as a second platinum group metal component.

Normally, at least one of the refractory metal oxide support material, the first platinum group metal component and the second platinum group metal component is insoluble. However, it is to be understood that the slurry may comprise a solution, such as when one or more precursors of the refractory metal oxide support material, a first platinum group metal component and a second platinum group metal component are all soluble (i.e. dissolved).

Typically, the refractory metal oxide support material precursor is a compound that undergoes conversion into the refractory metal oxide support material after drying and/or calcining the coating. Such refractory metal oxide support material precursors are well-known in the art and include, for example, boehmite as a precursor of gamma-alumina.

Generally, the first platinum group metal component is a salt of the first platinum group metal or is the first platinum group metal (i.e. it is the first platinum group metal as such). Preferably, the first platinum group metal component is a salt of the first platinum group metal. The salt of the first platinum group metal may be a nitrate salt of the first platinum group metal, an acetate salt of the first platinum group metal or a carboxylate salt (e.g. citrate salt) of the first platinum group metal.

The second platinum group metal component typically is a salt of the second platinum group metal or is the second platinum group metal (i.e. it is the second platinum group metal itself). It is preferred that the second platinum group metal component is a salt of the second platinum group metal. The salt of the second platinum group metal may be a nitrate salt of the second platinum group metal, an acetate salt of the second platinum group metal or a carboxylate salt (e.g. citrate salt) of the second platinum group metal.

When two or more different platinum group metals are used (e.g. the first platinum group metal is different from the second platinum group metal), then there may be a difference in the mobility of the first platinum group metal component compared with the second platinum group metal component that results from the difference in metals that are present that results in a different distribution profile of each platinum group metal relative the (or each) other platinum group metal in a washcoat layer (see FIG. 6). The same applies to the differential mobility of alkaline earth metal relative to one or more platinum group metal components present in a catalyst washcoat layer. It is possible to vary the mobility, and also the preferred perpendicular direction of flow within a catalyst washcoat layer, of the platinum group metal components by selecting an appropriate anion when the platinum group metal component is a salt of a platinum group metal. The platinum group metal components may also interact differently with the refractory metal oxide support material and may be selected on this basis. Similarly, it is possible to vary the mobility of alkaline earth metal components by appropriate selection of solute salt thereof, within a catalyst washcoat layer.

It is preferred that a counter-anion of the salt of the first platinum group metal is different to a counter-anion of the salt of the second platinum group metal. For example, the first platinum group metal component may be palladium nitrate and the second platinum group metal component may be a platinum carboxylate salt. The nitrate anion is different to the carboxylate anion.

The mobility of at least one of the platinum group metal components can be altered by supporting it on a support material (i.e. pre-fixing the platinum group metal component) before mixing with the other platinum group metal component. For example, the pre-fixed first platinum group metal/first refractory metal oxide support material may be mixed with a second refractory metal oxide support material and aqueous second platinum group metal salt and optionally an aqueous salt of one or more alkaline earth metals.

One way that the first platinum group metal component may be supported on the first refractory metal oxide support material precursor is by: (i) mixing a first refractory metal oxide support material precursor and a first platinum group metal component in solution, preferably to impregnate, or fill the pores of, the final first refractory metal oxide support material; and (ii) drying and/or calcining the aqueous solution to provide a first platinum group metal component (e.g. first platinum group metal) supported on the first refractory metal oxide support material. Step (i) may be followed by a step (i)(a) of adding a reducing agent to reduce the first platinum group metal component, preferably to impregnate, or fill the pores of, the first support material. In step (i) and/or (i)(a), it is preferred that the only platinum group metal component present is the first platinum group metal component.

Thus, step (a) of the above method may be a step of (a) providing an aqueous slurry comprising a second platinum group metal component and a first platinum group metal component supported on a first support material precursor.

With regard to step (b), methods for applying slurries or washcoats to a substrate are well known in the art (see for example Applicant's WO 99/47260).

In one mode, step (c) involves drying the coating using drying conditions that allow at least the first platinum group metal component and the second platinum group metal component to flow at different rates to one another in a direction perpendicular to a plane representing a substrate surface. In another embodiment, step (c) involves drying the coating using drying conditions that allow only the first platinum group metal component to flow toward or away from the substrate.

Step (c) determines the point at which the platinum group metal components are fixed, usually on to the substrate or a refractory metal oxide support material. The drying conditions that are used will depend on the identity of the materials (e.g. the platinum group metal components, the alkaline earth metal components, the refractory metal oxide support materials etc.) that are present in the coating and the size of the oxidation catalyst (e.g. the size of the substrate, which will vary depending on the application of the catalyst).

Typically, the drying conditions involve drying the coating for at least 15 minutes, preferably at least 20 minutes. A non-uniform distribution of the first platinum group metal and optional alkaline earth metal may be obtained using such conditions. Uniform distributions tend to be obtained when the drying time is about 5 minutes or less.

The coating may then be calcined at a temperature of 400 to 800° C., preferably 450 to 600° C., more preferably a temperature of at least 500° C.

As an example, it has been found that where a first catalyst washcoat layer comprises a first loading and weight ratio of platinum to palladium as the two or more platinum group metal components and the one or more alkaline earth metal component is barium, wherein both the platinum group metals and the barium are supported on a refractory metal oxide support material which is alumina doped with silica at a preferred silica content, and such first catalyst washcoat layer is impregnated with an aqueous solution of relatively high concentration platinum and palladium salts to form the first catalyst washcoat zone following application of the drying methods described hereinabove, palladium and barium migrate more readily to the exposed catalyst washcoat layer surface and are observed as a "crust" under EPMA. Without having been pre-fixed to the underlying refractory metal oxide support material, the platinum component shows some mobilisation towards the same exposed surface within the cross-section of the first catalyst washcoat layer, remains relatively more evenly distributed across the cross-section of the first catalyst washcoat layer than the palladium and the barium. The finished product has been found to demonstrate beneficial activity towards exotherm generation. This effect is also shown in part in Examples 7, 14 and 17 hereinbelow.

Exhaust Systems

According to the second aspect of the invention, the exhaust system comprises a composite oxidation catalyst according to the invention, a first injector for a nitrogenous reductant or a precursor thereof connected to a source of nitrogenous reductant or nitrogenous reductant precursor, which first injector being arranged to inject the nitrogenous reductant or nitrogenous reductant precursor into a flowing exhaust gas upstream from the composite oxidation catalyst and a first substrate comprising a selective catalytic reduction catalyst disposed between the first injector for a nitrogenous reductant or a precursor thereof and the composite oxidation catalyst, wherein the first substrate end of the composite oxidation catalyst is oriented to an upstream side.

The SCR catalyst of the first substrate can be any suitable SCR catalyst, but is particularly a vanadium-based SCR catalyst, e.g. $V_2O_5/WO_3/TiO_2$. Such vanadium-based SCR catalysts are known and include the SCR catalyst washcoated onto an inert flow-through honeycomb monolith substrate or wall-flow filter substrate or else an extruded honeycomb vanadium-based SCR catalyst. Alternatively, the SCR catalyst of the first substrate can be a crystalline molecular sieve, such as an aluminosilicate zeolite, promoted with copper and/or iron. In particular, the SCR catalyst of the first substrate can be selected from any of those described for use in the washcoat overlayer hereinabove. The crystalline molecular sieve-containing SCR catalyst of the first substrate can be the same as that of the washcoat overlayer or different therefrom.

In preferred embodiments, the exhaust system of the invention comprises a second substrate comprising a selective catalytic reduction catalyst disposed downstream from the composite oxidation catalyst and a second injector for a nitrogenous reductant or a precursor thereof connected to a source of nitrogenous reductant or nitrogenous reductant precursor which second injector being arranged to inject the nitrogenous reductant or nitrogenous reductant precursor into a flowing exhaust gas downstream from the composite oxidation catalyst and upstream from the second substrate comprising a selective catalytic reduction catalyst.

The SCR catalyst of the second substrate is preferably selected from any of those described for use as the SCR catalyst of the first substrate described hereinabove. The SCR catalyst of the first and second substrates can be the same or different. For example, the SCR catalyst of the first substrate can be an extruded vanadium-based SCR catalyst and the SCR catalyst of the second substrate can be a washcoated copper-promoted or copper and cerium-promoted aluminosilicate zeolite, such as CHA or AEI. Alternatively, the SCR catalyst of the first substrate can be a washcoated copper-promoted or copper and cerium-promoted aluminosilicate zeolite, such as CHA or AEI; and the SCR catalyst of the second substrate can be a washcoated iron-promoted crystalline molecular sieve such as PER or BEA. Alternatively, the SCR catalyst of the first substrate can be the washcoated iron-promoted crystalline molecular sieve; and the SCR catalyst of the second substrate can be the washcoated copper-promoted or copper and cerium-promoted aluminosilicate zeolite. As a further alternative, both the SCR catalyst of the first and second substrates are washcoated copper-promoted or copper and cerium-promoted aluminosilicate zeolite, such as CHA or AEI.

The second substrate comprising a selective catalytic reduction catalyst can be a filter substrate, such as a wall-flow filter, or else a honeycomb flow-through substrate.

Where the second substrate comprising a selective catalytic reduction catalyst is not a filter, the exhaust system can comprise a third substrate which is a soot filter substrate, preferably a wall-flow filter substrate, disposed downstream from the composite oxidation catalyst. Where the exhaust system comprises the second and third substrates, the third substrate is preferably disposed between the composite oxidation catalyst and the second injector.

Preferably, the soot filter substrate is a catalysed soot filter substrate, wherein the soot filter is catalysed with a platinum group metal catalyst.

Where the composite oxidation catalyst of the invention is intended to be used to generate an exotherm from hydrocarbon fuel injected into a flowing exhaust gas upstream from the composite oxidation catalyst for heating a downstream filter, particularly in embodiments of the composite oxidation catalyst wherein a total PGM loading in the first catalyst washcoat zone is >the second catalyst zone and, optionally, wherein the first catalyst washcoat zone comprises alkaline earth metal, the exhaust system can comprise an injector for a liquid hydrocarbon connected to a source of liquid hydrocarbon, which injector being arranged to inject the liquid hydrocarbon into an exhaust gas flowing in the exhaust system upstream from the composite oxidation catalyst for generating an exotherm on the composite oxidation catalyst.

In preferred embodiments, the exhaust system according to the invention comprises an engine and nitrogenous reductant or nitrogenous reductant precursor electronic control unit(s) comprising a pre-programmed computer processor(s) for controlling delivery of ammonia nitrogenous reductant to the first substrate comprising a selective catalytic reduction catalyst at an ammonia-to-$NO_x$ ratio of 0.4 to 0.8. The reason why the ANR is not at 1.0 or above is because, theoretically, i.e. according to reactions (1) to (3) inclusive, all $NO_x$ will be removed from the exhaust gas by reduction on the first substrate SCR catalyst. By removing all $NO_x$ upstream from the composite oxidation catalyst, there is practically no nitric oxide (NO) in the exhaust gas left to oxidise to $NO_2$ to promote downstream reactions, such as CRT-effect promoted combustion of particulate matter held on a downstream in $NO_2$; or to promote downstream $NO_x$ conversion on a second substrate comprising a SCR catalyst according to reaction (3) hereinabove (it will be understood that the provision of two SCR catalysts in series ensures the highest possible net $NO_x$ conversion across the exhaust system as a whole, since fluctuating exhaust gas $NO_x$ content resulting from dynamic driving of a vehicle can prevent near 100% $NO_x$ conversion over a single SCR catalyst.

The provision of an ASC/AMOX component in the exhaust system downstream from the first substrate SCR catalyst enables the removal of ammonia that slips the first substrate SCR catalyst so that calibration of injection of nitrogenous reductant (or its precursor) via the second reductant injector is easier and/or ammonia does not interfere with $NO_x$ sensors located in the exhaust system downstream from the composite oxidation catalyst.

In certain embodiments the engine and nitrogenous reductant or nitrogenous reductant precursor electronic control unit(s) comprising a pre-programmed computer processor(s) are pre-programmed for controlling delivery of ammonia nitrogenous reductant to the first substrate comprising a selective catalytic reduction catalyst at an ammonia-to-$NO_x$ ratio of 0.4 to 0.6.

Alternatively, the engine and nitrogenous reductant or nitrogenous reductant precursor electronic control unit(s) comprising a pre-programmed computer processor(s) are pre-programmed for controlling delivery of ammonia nitrogenous reductant to the first substrate comprising a selective catalytic reduction catalyst at an ammonia-to-$NO_x$ ratio of 0.7 to 0.8. At higher ANRs, such as 0.7 to 0.8, the volume of a downstream second substrate SCR catalyst can be reduced relative to a system operated at an ANR of 0.4 to 0.6 for the exhaust system as a whole to meet a required emission standard for $NO_x$ at constant second substrate SCR catalyst loading because more $NO_x$ conversion can be done on the upstream first substrate SCR catalyst.

According to the second aspect of the invention, exhaust systems with application in the present invention are illustrated in the accompanying FIGS. 8A and 8B. A first exhaust system embodiment 32 (see FIG. 8A) comprises a heavy-duty diesel engine 30; a pipe 34 for conveying exhaust gas from the heavy-duty diesel engine 30 to a series of components of the exhaust system in turn or therefrom to atmosphere 36; item 38 is an injector for injecting hydrocarbon fuel into exhaust gas downstream from engine manifold 40 and upstream from a composite oxidation catalyst 42 according to the present invention, e.g. any one of those composite oxidation catalysts illustrated in FIGS. 1-5 inclusive wherein the substrate is a flow-through monolith substrate and wherein the first catalyst washcoat zone 1 is oriented to the upstream side. In combination, hydrocarbon fuel injected via injector 38 is used to generate an exotherm on the composite oxidation catalyst for heating the downstream diesel particulate filter (DPF) or a catalysed soot filter (CSF) 44; and item 46 is an injector for injecting a nitrogenous reductant precursor fluid, e.g. urea, held in a reservoir 48 into flowing exhaust gas. First honeycomb flow-through monolith substrate 50 comprises a selective catalytic reduction (SCR) catalyst, such as an extruded vanadium-based SCR catalyst of known construction. Second honeycomb flow-through monolith substrate 52 comprises a washcoated or extruded vanadium-based SCR catalyst or else a AEI aluminosilicate zeolite promoted with both copper and iron. Substrate 50 is a honeycomb flow-through monolith substrate comprising an ammonia slip catalyst/AMOX catalyst. When in use, an engine and nitrogenous reductant or nitrogenous reductant precursor electronic control unit(s) comprising a pre-programmed computer processor(s) (not shown) controls delivery of ammonia nitrogenous reductant to the first substrate comprising a selective catalytic reduction catalyst at an ammonia-to-$NO_x$ ratio of 0.4 to 0.8, optionally 0.4 to 0.6 or 0.7 to 0.8.

In an alternative system wherein the SCR catalyst of the first substrate is a copper-promoted crystalline molecular sieve, such as an aluminosilicate zeolite CHA or AEI, the exhaust system can include a separate flow-through substrate monolith coated with a platinum group metal-containing diesel oxidation catalyst (DOC) 56 for promoting reaction (3) in the first substrate SCR catalyst. In combination with a separate hydrocarbon fuel injector 38 or alternatively engine cylinder injection control to deliver increased hydrocarbon concentration in exhaust gas contacting DOC 56 for periodically de-sulphating the SCR catalyst of the first substrate 50.

FIG. 8B is an exhaust system 58 for a light-duty diesel engine, wherein like numbered features from FIG. 8A refer to the identical component in the FIG. 8B system. Item 62 is a first substrate, which is a wall-flow filter washcoated with a SCR catalyst, which is a copper-promoted CHA or AEI aluminosilicate zeolite. Feature 64 is a composite oxidation catalyst according to FIG. 9, wherein the first substrate end is oriented to the upstream side; and item 66 is a second substrate, which is a honeycomb flow-through substrate comprising a copper-promoted aluminosilicate zeolite CHA or AEI SCR catalyst. As there is no filter substrate downstream from the composite oxidation catalyst 64, composite oxidation catalyst is not used for exotherm generation, e.g. the first catalyst washcoat zone of the composite oxidation catalyst does not include a high PGM loading or an alkaline loading for the purpose of promoting exotherm generation. Instead DOC 56 is used for generating an exotherm from hydrocarbon fuel injected via injector 38 for heating SCR coated filter 62.

Alternative Definitions of the Invention

The present invention is defined by any one of the appended claims, alternatively one or more of the following definitions:

1. A composite, zone-coated, dual-use ammonia and nitric oxide oxidation catalyst for use in an exhaust system for treating an exhaust gas produced by a vehicular compression ignition internal combustion engine, preferably for a heavy-duty diesel vehicle, which exhaust gas also including ammonia, which composite oxidation catalyst comprising:

a substrate having a total length L and a longitudinal axis and having a substrate surface extending axially between a first substrate end and a second substrate end;

two or more catalyst washcoat zones comprised of a first catalyst washcoat layer comprising a refractory metal oxide support material and one or more platinum group metal components supported thereon and a second catalyst washcoat layer different from the first catalyst washcoat layer and comprising a refractory metal oxide support material and one or more platinum group metal components supported thereon, which two or more catalyst washcoat zones being arranged axially in series on and along the substrate surface, wherein a first catalyst washcoat zone having a length $L_1$, wherein $L_1<L$, is defined at one end by the first substrate end and at a second end by a first end of a second catalyst washcoat zone having a length $L_2$, wherein $L_2<L$, wherein the first catalyst washcoat zone comprises a first refractory metal oxide support material and one or more platinum group metal components supported thereon; and the second catalyst washcoat zone comprises a second refractory metal oxide support material and one or more platinum group metal components supported thereon; and a washcoat overlayer extending axially from the first substrate end for up to 200% of the axial length of the underlying first catalyst washcoat layer, which washcoat overlayer comprising a particulate metal oxide loading of >0.8 g/in$^3$, wherein the particulate metal oxide is an aluminosilicate zeolite including at least one of copper, iron and manganese, wherein a total platinum group metal loading in the first catalyst washcoat zone defined in grams of platinum group metal per cubic foot of substrate volume (g/ft$^3$) is different from the total platinum group metal loading in the second catalyst washcoat zone.

2. A composite oxidation catalyst according to 1, wherein the second catalyst washcoat zone is defined at a second end thereof by the second substrate end and wherein the first catalyst washcoat zone comprises the first catalyst washcoat layer and the second catalyst washcoat zone comprises the second catalyst washcoat layer.

3. A composite oxidation catalyst according to 1 or 2, wherein the total platinum group metal loading in the first catalyst washcoat zone is less than the total platinum group metal loading in the second catalyst washcoat zone.

4. A composite oxidation catalyst according to 1 or 2, wherein the total platinum group metal loading in the first catalyst washcoat zone is greater than a total platinum group metal loading in the second catalyst washcoat zone.

5. A composite oxidation catalyst according to 2 and claim 4 when dependent on claim 2 comprising three or more catalyst washcoat zones including one zone formed from a two-layer overlap region of the first catalyst washcoat layer and the second catalyst washcoat layer, wherein a third catalyst washcoat zone comprising a third refractory metal oxide support material and one or more platinum group metal components supported thereon is defined at a second end thereof by the second substrate end and wherein a total platinum group metal loading in the third catalyst washcoat zone defined in grams of platinum group metal per cubic foot of substrate volume ($g/ft^3$) is less than the total platinum group metal loading in the second catalyst washcoat zone.

6. A composite oxidation catalyst according to 5 comprising four catalyst washcoat zones, wherein a fourth catalyst washcoat zone is located between the second catalyst washcoat zone and the third catalyst washcoat zone, which fourth catalyst washcoat zone comprises a fourth refractory metal oxide support material and one or more platinum group metal components supported thereon and is defined at a first end thereof by a second end of the second catalyst washcoat zone and at a second end thereof by a first end of the third catalyst washcoat zone and wherein a total platinum group metal loading in the fourth catalyst washcoat zone defined in grams of platinum group metal per cubic foot of substrate volume ($g/ft^3$) is greater than the total platinum group metal loading in each of the second catalyst washcoat zone and the third catalyst washcoat zone wherein the first catalyst washcoat layer has a length $L_3$, wherein $L_3<L$, and is defined at one end by the first substrate end; and the second catalyst washcoat layer has a length $L_4$, wherein $L_4<L$, and is defined at a second end by the second substrate end, wherein the fourth catalyst washcoat zone comprises the two-layer overlap region of the first catalyst washcoat layer and the second catalyst washcoat layer and wherein the third catalyst washcoat zone comprises a single layer of the second catalyst washcoat layer that is not comprised of the overlap region.

7. A composite oxidation catalyst according to any one of 1 to 6, wherein the one or more platinum group metal component in the first catalyst washcoat zone comprises platinum.

8. A composite oxidation catalyst according to any one of 1 to 6, wherein the one or more platinum group metal component in the first catalyst washcoat zone consists essentially of platinum.

9. A composite oxidation catalyst according to any one of 1 to 6, wherein the one or more platinum group metal components in the first catalyst washcoat zone consists of both platinum and palladium.

10. A composite oxidation catalyst according to 9, wherein a weight ratio of platinum to palladium is ≥1.

11. A composite oxidation catalyst according to 10, wherein a weight ratio of platinum to palladium in the first catalyst washcoat zone (1) is 10:1≥1.5:1.

12. A composite oxidation catalyst according to 9, wherein a weight ratio of platinum to palladium is <1.

13. A composite oxidation catalyst according to any one of 1 to 12, wherein the one or more platinum group metal component in the second catalyst washcoat zone comprises platinum.

14. A composite oxidation catalyst according to any one of 1 to 12, wherein the one or more platinum group metal component in the second catalyst washcoat zone consists essentially of platinum.

15. A composite oxidation catalyst according to any one of 1 to 12, wherein the one or more platinum group metal component in the second catalyst washcoat zone comprises both platinum and palladium.

16. A composite oxidation catalyst according to 15, wherein a mass ratio of platinum to palladium in the second catalyst washcoat zone is greater than a mass ratio of platinum to palladium in the first catalyst washcoat zone.

17. A composite oxidation catalyst according to any one of 1 to 16, wherein the first catalyst washcoat zone and/or the first catalyst washcoat layer comprises one or more first alkaline earth metal components supported on the refractory metal oxide support material.

18. A composite oxidation catalyst according to 17, wherein a total alkaline earth metal loading in the first catalyst washcoat zone is 10-100 $g/ft^3$ calculated as elemental metal.

19. A composite oxidation catalyst according to 17 or 18, wherein a weight ratio of total elemental alkaline earth metal to total elemental platinum group metal in the first catalyst washcoat zone is <1:1.

20. A composite oxidation catalyst according to 17, 18 or 19, wherein the alkaline earth metal in the first catalyst washcoat zone comprises barium (Ba) or strontium (Sr), preferably Ba.

21. A composite oxidation catalyst according to any one of 1 to 20, wherein the washcoat overlayer extends axially for up to 150%, optionally for up to 120%, of the axial length of the underlying first catalyst washcoat layer from the first substrate end.

22. A composite oxidation catalyst according to any one of 1 to 21, wherein the washcoat overlayer extends axially for >50% of the axial length of the underlying first catalyst washcoat layer from the first substrate end.

23. A composite oxidation catalyst according to any one of 1 to 22, wherein the washcoat overlayer is coated directly on the washcoat of the first catalyst washcoat zone.

24. A composite oxidation catalyst according to any one of 1 to 23, wherein the aluminosilicate zeolite in the washcoat overlayer is faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-13 zeolite, offretite or a beta zeolite.

25. A composite oxidation catalyst according to any one of 1 to 24, wherein where the aluminosilicate zeolite in the washcoat overlayer includes copper, the aluminosilicate zeolite also includes cerium.

26. A composite oxidation catalyst according to any one of 1 to 25, wherein a total amount of 0.1 to 20.0 wt. % copper, iron, manganese and, where present, cerium is included in the aluminosilicate zeolite of the washcoat overlayer.

27. A composite oxidation catalyst according to any one of 1 to 26, wherein the aluminosilicate zeolite in the washcoat overlayer has a mean pore diameter of ≥10 nm and/or the washcoat overlayer has a mean interparticle pore diameter of ≥10 nm.

28. A composite oxidation catalyst according to any one of 1 to 27, wherein the aluminosilicate zeolite in the washcoat overlayer has a specific surface area of >100 m²/g.

29. A composite oxidation catalyst according to any one of 1 to 28, wherein the washcoat loading of the washcoat overlayer is 0.8 to 3.5 g in⁻³.

29. A composite oxidation catalyst according to any one of 1 to 28, wherein a total platinum group metal loading in the first catalyst washcoat zone (1) is <3.53 g/l (<100 g/ft³) calculated as elemental metal.

30. A composite oxidation catalyst according to any one of 1 to 29 comprising a total platinum group metal loading on the substrate (5) as a whole of 0.18 to 2.19 g/l (5-60 g/ft³) calculated as elemental metal.

31. A composite oxidation catalyst according to any one of 1 to 30, wherein a total Pt:Pd weight ratio in the composite oxidation catalyst (14, 16, 18, 20) as a whole is 3:2 to 9:1.

32. A composite oxidation catalyst according to 5 and any of 6 to 31 when dependent on 5 comprising three catalyst washcoat zones, wherein the third catalyst washcoat zone is defined at a first end thereof by a second end of the second catalyst washcoat zone and wherein the first catalyst washcoat layer has a length $L_3$, wherein $L_3 < L$, and is defined at one end by the first substrate end; and the second catalyst washcoat layer has a length $L_4$, wherein $L_4 < L$, and is defined at a second end by the second substrate end, wherein the second catalyst washcoat zone comprises a two-layer overlap region of the first catalyst washcoat layer and the second catalyst washcoat layer and wherein the third catalyst washcoat zone comprises a single layer of the second catalyst washcoat layer that is not comprised of the overlap region.

33. A composite oxidation catalyst according to 32, wherein the one or more platinum group metal component in the third catalyst washcoat zone consists essentially of platinum.

34. A composite oxidation catalyst according to any one of 5 to 33, wherein a mass ratio of platinum to palladium in each successive catalyst washcoat zone arrayed in series along the substrate length L after the first catalyst washcoat zone is greater than an immediately preceding catalyst washcoat zone.

35. A composite oxidation catalyst according to any one of 1 to 34, wherein $L_1$ is <50% L.

36. A composite oxidation catalyst according to any one of 1 to 35, wherein the first catalyst washcoat zone has a non-uniform distribution of one or more platinum group metal component and/or one or more first alkaline earth metal component in a direction perpendicular to the surface of the substrate as determined by electron probe microanalysis (EPMA), wherein a concentration of the one or more platinum group metal component and/or the first alkaline earth metal component decreases in a perpendicular direction toward the surface of the substrate.

37. A composite oxidation catalyst according to any one of 1 to 36, wherein at least the first refractory metal oxide support material comprises alumina doped with a heteroatom, preferably silica.

38. A composite oxidation catalyst according to 5 and any of 6 to 37 when dependent on 5, wherein the third catalyst washcoat zone comprises manganese and/or the second catalyst washcoat layer comprises manganese.

39. A composite oxidation catalyst according to any one of 1 to 38, wherein the substrate is a honeycomb flow-through substrate monolith.

40. An exhaust system for a vehicular compression ignition engine for treating an exhaust gas comprising inter alia oxides of nitrogen ($NO_x$), which exhaust system comprising a composite oxidation catalyst according to any one of the preceding claims, a first injector for a nitrogenous reductant or a precursor thereof connected to a source of nitrogenous reductant or nitrogenous reductant precursor, which first injector being arranged to inject the nitrogenous reductant or nitrogenous reductant precursor into a flowing exhaust gas upstream from the composite oxidation catalyst and a first substrate comprising a selective catalytic reduction catalyst disposed between the first injector for a nitrogenous reductant or a precursor thereof and the composite oxidation catalyst, wherein the first substrate end of the composite oxidation catalyst is oriented to an upstream side.

41. An exhaust system according to 40 comprising a second substrate comprising a selective catalytic reduction catalyst disposed downstream from the composite oxidation catalyst and a second injector for a nitrogenous reductant or a precursor thereof connected to a source of nitrogenous reductant or nitrogenous reductant precursor which second injector being arranged to inject the nitrogenous reductant or nitrogenous reductant precursor into a flowing exhaust gas downstream from the composite oxidation catalyst and upstream from the second substrate comprising a selective catalytic reduction catalyst.

42. An exhaust system according to 41, wherein the second substrate comprising a selective catalytic reduction catalyst is a filter substrate.

43. An exhaust system according to any one of 40, 41 or 42 comprising a third substrate which is a soot filter substrate disposed downstream from the composite oxidation catalyst.

44. An exhaust system according to 43 when dependent on 41, wherein the third substrate is disposed between the composite oxidation catalyst and the second injector.

45. An exhaust system according to 43 or 44, wherein the soot filter substrate is a catalysed soot filter substrate which is catalysed with a platinum group metal catalyst.

46. An exhaust system according to claim 41 or 45 or 42, 43 or 44 when dependent on claim 41 comprising an injector for a liquid hydrocarbon connected to a source of liquid hydrocarbon, which injector being arranged to inject the liquid hydrocarbon into an exhaust gas flowing in the exhaust system upstream from the composite oxidation catalyst for generating an exotherm on the composite oxidation catalyst for heating the downstream filter.

47. An exhaust system according to any one of 40 to 46 comprising an engine and nitrogenous reductant or nitrogenous reductant precursor electronic control unit(s) comprising a pre-programmed computer processor(s) for controlling delivery of ammonia nitrogenous reductant to the first substrate comprising a selective catalytic reduction catalyst at an ammonia-to-$NO_x$ ratio of 0.4 to 0.8, optionally 0.4 to 0.6 or 0.7 to 0.8.

48. An exhaust system according to claim 47, wherein the engine and nitrogenous reductant or nitrogenous reductant precursor electronic control unit(s) comprising a pre-programmed computer processor(s) are pre-programmed for controlling delivery of ammonia nitrogenous reductant to the first substrate comprising a selective catalytic reduction catalyst at an ammonia-to-$NO_x$ ratio of 0.7 to 0.8, wherein a volume of a downstream second substrate SCR catalyst is reduced relative to a system operated at an ANR of 0.4 to 0.6 for the exhaust system as a whole to meet a required emission standard for $NO_x$ at constant second substrate SCR catalyst loading.

49. An apparatus comprising a compression ignition internal combustion engine for a heavy-duty diesel vehicle and an exhaust system according to any one of 40 to 48, wherein the first substrate end of the composite oxidation catalyst is oriented to an upstream side.

49. An apparatus according to 49, wherein the compression ignition internal combustion engine is a diesel engine.

50. A heavy-duty diesel vehicle comprising an apparatus according to 48 or 49.

51. Use of a composite oxidation catalyst according to any one of 1 to 39 for oxidising ammonia in an exhaust gas flowing in an exhaust system of a vehicular compression ignition internal combustion engine and for oxidising nitric oxide (NO) in the exhaust gas to nitrogen dioxide ($NO_2$), which exhaust system comprising a first injector for a nitrogenous reductant or a precursor thereof connected to a source of nitrogenous reductant or nitrogenous reductant precursor, which first injector being arranged to inject the nitrogenous reductant or nitrogenous reductant precursor into a flowing exhaust gas upstream from the composite oxidation catalyst, a first substrate comprising a selective catalytic reduction catalyst disposed between the first injector and the composite oxidation catalyst and a second substrate comprising a selective catalytic reduction catalyst disposed downstream from the composite oxidation catalyst, wherein the first substrate end of the composite oxidation catalyst is oriented to an upstream side, which NO oxidation promotes selective catalytic reduction on the second substrate downstream so that the exhaust system overall meets the prevailing emission standard for $NO_x$.

52. Use of a composite oxidation catalyst according to any one of 1 to 39 for oxidising ammonia in an exhaust gas flowing in an exhaust system of a vehicular compression ignition internal combustion engine and for oxidising nitric oxide (NO) in the exhaust gas to nitrogen dioxide ($NO_2$), which exhaust system comprising a first injector for a nitrogenous reductant or a precursor thereof connected to a source of nitrogenous reductant or nitrogenous reductant precursor, which first injector being arranged to inject the nitrogenous reductant or nitrogenous reductant precursor into a flowing exhaust gas upstream from the composite oxidation catalyst, a first substrate comprising a selective catalytic reduction catalyst disposed between the first injector and the composite oxidation catalyst and a third substrate comprising a filter disposed downstream from the composite oxidation catalyst, wherein the first substrate end of the composite oxidation catalyst is oriented to an upstream side, which NO oxidation promotes combustion of particulate matter held on the downstream third substrate filter so that the exhaust system overall meets the prevailing emission standard for particulate matter.

53. Use of a composite oxidation catalyst according to 17 or any of 18 to 39 when dependent on 17 for heating a soot filter disposed downstream from the composite oxidation catalyst by generating an exotherm from an increased concentration of hydrocarbon fuel in exhaust gas flowing in the exhaust system relative to normal operating conditions by contacting the oxidation catalyst with exhaust gas comprising the increased concentration of hydrocarbon fuel.

Definitions

Where the claimed invention defines a feature of a weight ratio of platinum to palladium, such definition includes a weight ratio of 1:0 (or "infinity" (∞), i.e. where no palladium is present. That is, a claim definition of a platinum to palladium weight ratio does not necessarily imply the presence of palladium unless the claim definition positively includes the presence of palladium, e.g. by use of a weight ratio feature.

Any reference to the distribution of a platinum group metal (e.g. first platinum group metal or second platinum group metal) in a direction (e.g. a straight line) perpendicular to the surface of the substrate generally refers to a direction perpendicular to the same surface of the substrate upon which the catalyst layer is disposed. For reference purposes, the surface of the substrate is generally in the horizontal (i.e. longitudinal) plane. The direction perpendicular to the surface of the substrate is typically a direction in a cross-sectional plane through the catalyst layer (i.e. a cross-sectional plane that exposes the thickness of the catalyst layer) perpendicular to the surface of the substrate. The cross-sectional plane is generally in a vertical (i.e. transverse) plane. The cross-sectional plane is perpendicular to the surface on which the catalyst layer is disposed. More typically, the cross-sectional plane is substantially parallel to an inlet end face of the substrate and/or the outlet end face of the substrate (i.e. the plane containing the inlet end face and/or the plane containing the outlet end face). Any reference to "substantially parallel" in this context refers to an angle of less than 5°, preferably less than 2.5°, more preferably less than 1° (e.g. less than 0.5°), between the cross-sectional plane and the inlet end face or the outlet end face of the substrate.

Any reference to a "surface of the substrate" generally refers to the surface of a wall of a channel through the substrate.

The term "layer" (e.g. catalyst layer) as used herein refers to a thickness of material spread over a surface, such as a surface of a substrate or a surface of another layer, which typically has distinct boundaries or edges (i.e. it is possible to distinguish a first layer from a compositionally different second layer using conventional analytical techniques (e.g. transmission electron microscopy).

The term "uniform" as used herein with reference to the distribution of a platinum group metal generally refers to a composition (e.g. a layer) where the amount of platinum group metal at any point in the composition is within ±20% of the mean amount of platinum group metal in the entire composition (e.g. layer). It is preferred that the amount of platinum group metal at any point in the composition is within ±10%, more preferably ±5%, and even more preferably ±1%, of the mean amount of platinum group metal in the entire composition (e.g. layer). The mean amount of platinum group metal should correspond to the amount of platinum group metal that is measured out during preparation of that composition. The amount of platinum group metal at any point in a composition can be determined using conventional analytical techniques, such as by EDX analysis using a transmission electron microscope.

The term "mixed oxide" as used herein generally refers to a mixture of oxides in a single phase, as is conventionally known in the art.

The term "composite oxide" as used herein generally refers to a composition of oxides having more than one phase, as is conventionally known in the art.

The term "loading" is used to define a concentration quantity of a component such as a platinum group metal component, an alkaline earth metal component or a washcoat formulation comprising both one or more platinum group metal components and one or more alkaline earth metal components supported on a refractory metal oxide support material present in a catalyst washcoat zone, a catalyst washcoat layer or present on the substrate as a whole. It is possible to determine local concentrations of the or each platinum group metal component or the or each alkaline earth metal component by EPMA or XRF techniques. The units of loading used herein and in the prior art are generally expressed in g ft$^{-3}$ or g in$^{-3}$ or their SI unit equivalent grams per litre generally relate to the volume of the substrate that is used. The volume component relates to that of the substrate onto which e.g. a washcoat layer is applied. Typically, relatively low concentration components are given as "g ft$^{-3}$" to make the amount meaningful without needing to refer to 100$^{th}$s or 1000$^{th}$s of a quantity, whereas higher concentration amounts are given in "g in$^{-3}$", such as for the amount of total washcoat application. By convention in the common general knowledge, the "volume" component of the units of loading assumes that a substrate is a solid, e.g. the total volume of a cylinder, and ignores the fact that the substrate has channels extending therethrough defined by walls made of the substrate composition, or that the substrate composition is inherently porous.

The term "comprising" is intended to mean that the named elements are essential, but other elements may be added and still form a construct within the scope of the claim. The expression "consisting essentially" as used herein can be exchanged for the broader definition "comprising" and limits the scope of a feature to include the specified materials or steps, and any other materials or steps that do not materially affect the basic and novel characteristics and functions of that feature or that feature in combination with the other claim features. Where a catalyst washcoat zone consists essentially of platinum, this means that it is intended to consist of platinum but other platinum group metal(s) e.g. palladium may be present in the catalyst washcoat zone of the finished product unintentionally e.g. because of migration of palladium into the catalyst washcoat zone during manufacture. In this context "consisting essentially of" does not exclude the unintended presence of palladium in a catalyst washcoat zone defined as consisting essentially of platinum. The term "consisting essentially of" embraces the expression "consisting of" and is interchangeable with either "comprising" or "consisting of". "Consisting of" closes the claim to the inclusion of materials other than those recited except for impurities ordinarily associated therewith.

With regard to the composite oxidation catalyst according to the invention, the basic and novel characteristics of the invention are a substrate of at least two catalyst washcoat zones comprised of a first catalyst washcoat layer comprising a refractory metal oxide support material and one or more platinum group metal components supported thereon and a second catalyst washcoat layer different from the first catalyst washcoat layer arranged axially in series on and along the substrate surface wherein a first catalyst washcoat zone defined at one end by the substrate inlet end includes a refractory metal oxide support material, both platinum and palladium and the second catalyst washcoat zone includes a refractory metal oxide support material and either platinum as the only platinum group metal present or both platinum and palladium, wherein a total platinum group metal loading in the first catalyst washcoat zone is different from the total platinum group metal loading in the second catalyst washcoat zone and a washcoat overlayer extending axially from the first substrate end for up to 200% of the axial length of the underlying first catalyst washcoat layer, which washcoat overlayer comprising a particulate metal oxide loading of >0.8 g/in$^3$, wherein the particulate metal oxide is an aluminosilicate zeolite including at least one of copper, iron and manganese.

In the context of the expression "platinum group metal" (e.g. first platinum group metal or second platinum group metal), it is to be appreciated that it is often difficult to characterise the exact catalytic species in a catalyst and the platinum group metal may not be present in elemental, metallic form. Any reference to "consisting essentially of a platinum group metal . . . " embraces a "platinum group metal moiety" in an elemental form of the platinum group metal, an alloy containing the platinum group metal or a compound comprising the platinum group metal (e.g. an oxide of the platinum group metal). Preferably, any such "platinum group metal moiety" is an elemental form of the platinum group metal or an alloy containing the platinum group metal, more preferably an elemental form of the platinum group metal.

With reference to the embodiment of claim 2 and FIG. 1 wherein the first and second catalyst washcoat layers abut one another "without there being substantially any overlap between the first and second washcoat layers", the term "substantially any overlap" is intended to cover products wherein there is no gap between the first catalyst washcoat coating and the second catalyst washcoat coating. In practice, it is practically very difficult to achieve a perfect "no gap" coating without also having some overlap between the two composite washcoat layers at the join therebetween. Therefore, in practice products made by methods embraced by the sixth aspect of the invention may have an unintended overlap of from 1-2 mm to up to 15% axial length, such as up to 14%, 13%, 12%, 11%, 10%, 9%, 8%, 7%, 8%, 6%, 5%, 4%, 3%, 2% or 1%. Accordingly, the composite oxidation catalyst according to the first aspect extends to products having up to this dimension of unintended overlap.

EXAMPLES

The invention will now be illustrated by the following non-limiting examples. For the avoidance of doubt all coating steps were done using the methods and apparatus disclosed in Applicant's WO 99/47260, i.e. comprising the steps of (a) locating a containment means on top of a substrate, (b) dosing a pre-determined quantity of a liquid component into said containment means, either in the order (a) then (b) or (b) then (a), and (c) by applying vacuum, drawing the entirety of said quantity of liquid component into at least a portion of the substrate, and retaining substantially all of said quantity within the substrate, without recycle.

Example 1—Manufacture of Inventive Composite Zone-Coated, Dual-Use Ammonia (AMOX) and Nitric Oxide Oxidation Catalysts Six experimental samples were prepared based on a common two-zone composite oxidation catalyst, which was made as follows. A bare cordierite honeycomb flow-through substrate monolith of 400 cells per square inch, a wall thickness of 6 thousandths of an inch (6 mil), a cylindrical diameter of 10.5 inches and a total length of 4 inches (0.2 ft$^3$ or 5.7 litres volume) or 6 inches (0.3 or 8.5 litres) was coated with catalyst washcoat in a zoned arrangement as follows. A first catalyst washcoat slurry containing aqueous salts (as nitrates) of both platinum and palladium as the only platinum group metals present, an aqueous barium acetate salt and a 5 wt % silica-doped alumina support was coated onto the substrate monolith to an axial length of 30% of the total substrate monolith length from one end labelled as the inlet end to provide a first catalyst washcoat coating. The concentrations of platinum and palladium salts were selected to achieve a loading in the first catalyst washcoat coating of 17.5Pt:35.0Pd gft$^{-3}$ at a weight ratio of platinum to palladium of 1:2, i.e. a total platinum group metal loading of 52.5 gft$^{-3}$. The concentration of the barium acetate was selected so that the barium loading in the first catalyst washcoat coating was 80 gft$^{-3}$. This inlet coating was then dried in a conventional oven for 1 hour at 100° C. to remove excess water and other volatile species.

A second catalyst washcoat slurry containing aqueous salts (as nitrates) of platinum and palladium as the only platinum group metals present and a 5 wt % silica-doped alumina support was coated onto the substrate from the end of the substrate monolith opposite to the end from which the first coating was applied, i.e. an end of the substrate monolith intended to be oriented to the outlet end. The second catalyst washcoat coating contained no alkaline earth metal. The axial length of coating of the second catalyst washcoat was 70% of the total substrate length, i.e. within the boundaries of practical process and production tolerances, the finished, coated part had no intended overlap of one washcoat coating on the other and no intended gap between one washcoat coating and the other. The concentrations of platinum and palladium salts were selected to achieve a loading in the second catalyst washcoat coating of 5.0Pt:1.0Pd gft$^{-3}$ at a weight ratio of platinum to palladium of 5:1, i.e. a total platinum group metal loading of 6.0 gft$^{-3}$. The substrate coated with both the first and the second washcoat coatings was dried in a conventional oven for 1 hour at 100° C. and then the dried part was calcined for 1 hour at 500° C. to decompose the platinum and palladium salts and fix the platinum and palladium to the silica-doped alumina support.

All washcoats and impregnation solutions were naturally acidic and there was no pH adjustment thereof. The total platinum group metal loading on the substrate monolith as a whole was 20 gft$^{-3}$ at a total Pt:Pd weight ratio of 1:1.28.

Eight experimental samples were prepared as follows. Seven of the experimental samples used the 10.5×4 inch substrate: a first sample was used as a control, without any application of a selective catalytic reduction (SCR) catalyst overlayer; and the six remaining samples had a washcoat overlayer of copper ion-exchanged aluminosilicate zeolite CHA at a copper loading of about 3.3 wt % coated from the inlet end over the first catalyst washcoat coating to various axial lengths and washcoat loadings as set out in Table 1 hereinbelow. The CHA aluminosilicate zeolite used had a silica-to-alumina ratio of about 25 and a fresh specific surface area of >100 m$^2$/g. The single remaining sample was coated on the 10.5×6 inch substrate from the inlet end over the first catalyst washcoat coating with a washcoat overlayer of copper ion-exchanged aluminosilicate AEI at a copper loading of about 3.75 wt % to an axial length of 0.3 relative to the total substrate axial length, i.e. 100% of the underlying first catalyst washcoat coating. The AEI aluminosilicate zeolite used had a silica-to-alumina ratio of about 20 and a fresh specific surface area of >100 m$^2$/g.

TABLE 1

| Sample | Cu/CHA overlayer washcoat loading (g/in$^3$) | Axial length of Cu/CHA overlayer relative to total monolith substrate length | Percentage coverage of axial length of first washcoat coating (%) |
| --- | --- | --- | --- |
| 1.1 | No overlayer (control) | N/A | N/A |
| 1.2 | 1.8 | 0.25 | 83 |
| 1.3* | 1.8 | 0.3 | 100 |
| 1.4 | 2.4 | 0.3 | 100 |
| 1.5 | 1.8 | 0.4 | 133.3 |
| 1.6 | 2.4 | 0.4 | 133.3 |
| 1.7 | 1.8 | 0.5 | 166.6 |
| 1.8 | 2.4 | 0.5 | 166.6 |

*10.5 × 6 inch substrate. Overlayer comprises Cu/AEI aluminosilicate zeolite instead of Cu/CHA aluminosilicate zeolite.

The absolute loading of Cu/CHA in samples 1.3 and 1.4 was identical, the only difference being that the same (absolute) quantity of Cu/CHA was spread over a longer zone length in sample 1.4 relative to sample 1.3.

All the composite oxidation catalyst samples in Table 1 were aged in air in an oven for 580° C. for 100 hours.

Example 2—Assessment of Inventive Composite Oxidation Catalysts of Example 1 to Selectively Oxidise Ammonia and Nitric Oxide and Generate Exotherm The eight aged samples listed in Example 1, Table 1 were each tested in turn using a laboratory bench-mounted diesel engine. The engine was fuelled with EUVI B7 fuel (7% Bio fuel) for both engine operation and exhaust gas hydrocarbon enrichment (exotherm generation), running at 2200 rpm and was fitted with an exhaust system including exhaust piping and demountable canning into which each of the test sample composite oxidation catalysts could be inserted for testing with the inlet end/first catalyst, high-loaded washcoat zone oriented to the upstream side. The demountable canning included space for an extruded $V_2O_5/WO_3/TiO_2$ selective catalytic reduction catalyst (10.5×7 inches) followed by a short gap and then the composite oxidation catalyst to be tested. For the "continuous exotherm" test described in Example 2A hereinbelow, no extruded vanadium SCR catalyst was included in the demountable canning. For the NO oxidation, $N_2O$ formation and $NH_3$ conversion tests described in Example 2B, the extruded vanadium SCR catalyst was inserted and the canned catalysts were oriented so that the extruded vanadium SCR catalyst was disposed on the upstream side of the composite oxidation catalyst so that it was contacted first by incoming exhaust gas.

The engine was a 7-litre capacity EUV 6-cylinder engine, producing 235 kW at 2500 rpm and about 7.5 g $NO_x$/kWh in the World Harmonised Transient Cycle (WHTC). The exhaust system "hardware" included a "7$^{th}$ injector" disposed to inject hydrocarbon fuel directly into the exhaust gas piping downstream from the engine manifold and upstream from the canned catalysts. This injector is named the "7$^{th}$ injector" because it is additional to the six fuel injectors associated with the cylinders of the engine. Furthermore, a urea (AdBlue™) injector was located for injection into exhaust gas downstream of the 7$^{th}$ injector and upstream of the canned catalysts.

Thermocouples were located at the inlet to the composite oxidation catalyst and were inserted at various axial locations along the centre line of the substrate monolith of each composite oxidation catalyst.

Example 2A—Test Method & Results for Exotherm Generation Comparison of Catalysts Prepared According to Example 1

A "continuous exotherm" thermal analysis of each of the composite oxidation catalyst samples of Example 1 and of the control sample was done by the following procedure. No urea was injected during the course of the tests. Each canned composite oxidation catalyst (without an upstream extruded vanadium SCR catalyst) was conditioned at an inlet temperature to the composite oxidation catalyst of 490° C. for 20 minutes, followed by a fast cool-down to an inlet temperature of 320° C. at which the composite oxidation catalyst was held for 10 minutes. Hydrocarbon injection via the $7^{th}$ injector was then begun at a rate to achieve an exotherm generating a detected 500° C. at the composite oxidation catalyst substrate outlet. This exotherm was maintained at steady state for 5 minutes. A hydrocarbon oxidation catalyst light-out temperature ramp-down was then begun by continuously adjusting the engine speed and/or load to achieve a 1° C. inlet temperature drop per minute at a gas mass flow rate of 720 kg/h. The run was stopped when the temperature at the composite oxidation catalyst substrate outlet was below 400° C. or the hydrocarbon slip analyser limit of 1500 ppm $C_3$ was reached. Between each test, the system was "cleaned" by running the engine at full torque at 1200 rpm.

The results of the continuous exotherm test are set out in the following Table 2.

TABLE 2

| Sample | Cu/CHA overlayer washcoat loading (g/in$^3$) | Axial length of Cu/CHA overlayer/total monolith substrate length | Percentage coverage of axial length of first washcoat coating (%) | Inlet temperature at <400° C. exotherm fail (° C.) |
|---|---|---|---|---|
| 1.1 | No overlayer (control) | N/A | N/A | 246.1 |
| 1.2 | 1.8 | 0.25 | 83 | 260.6 |
| 1.3* | 1.8 | 0.3 | 100 | 242.2 |
| 1.4 | 2.4 | 0.3 | 100 | 276.6 |
| 1.5 | 1.8 | 0.4 | 133.3 | 271.0 |
| 1.6 | 2.4 | 0.4 | 133.3 | 272.9 |
| 1.8 | 2.4 | 0.5 | 166.6 | 273.6 |

"Inlet temperature at <400° C. exotherm fail (° C.)" is referred to hereinafter as "exotherm extinction temperature". It can be seen from the results presented in Table 2 that for the Cu/CHA samples, the exotherm extinction temperature is influenced by the washcoat loading in the Cu/CHA (it will be understood that the lower the exotherm extinction temperature, the better). This can be seen particularly from a comparison of the exotherm extinction temperature of samples 1.4 and 1.3. It can be seen from the results that the exotherm extinction temperature for sample 1.4 is less than for sample 1.3, despite both samples having the same (absolute) quantity of Cu/CHA in the washcoat overlayer. Since this difference in washcoat loading correlates to a washcoat layer thickness, the higher washcoat loading appears to restrict mass transfer in the exotherm reaction.

It can also be seen that the exotherm extinction temperature is influenced by the axial length of the washcoat overlayer relative to the length of the underlying first washcoat zone length at a constant washcoat loading. This can be seen from a comparison of the results of samples 1.2 and 1.4, wherein an axial zone length that is shorter than the underlying first washcoat zone length (sample 1.2) has a lower exotherm extinction temperature than a washcoat overlayer that is longer than the underlying first washcoat zone length (1.4).

It can also be seen from the results for the exotherm extinction temperature of sample 1.3 that the formulation of the washcoat overlayer may influence the resulting exotherm extinction temperature (compare with the corresponding result for sample 1.2 at the same washcoat loading), wherein the exotherm extinction temperature for the Cu/AEI-containing sample 1.3 is lower than the Cu/CHA-containing sample 1.2. The inventors believe that this result shows the influence of interparticle pore diameter, wherein the Cu/CHA formulation is milled whereas the Cu/AEI is not. For a discussion on the influence of interparticle pore diameter on exotherm, see the description hereinabove under the heading "Phosphorus and/or zinc guard bed". However, it is possible that this effect may also be influenced partly by a slightly longer underlying first washcoat layer in sample 1.3 (a 30% axial zone length of the underlying first catalyst washcoat zone of a 6 inch substrate used in sample 1.3 is 1.8 inches, whereas 30% axial zone length of a 4 inch substrate used in sample 1.2 is 1.2 inches).

Example 2B—Test Method & Results for Assessment of Ammonia and Nitric Oxide Oxidation and SCR Activity and Selectivity of Catalysts Prepared According to Example 1

To assess the SCR and ammonia oxidation (AMOX) activity of the composite oxidation catalysts of Example 1, the extruded vanadium SCR catalyst was inserted in the exhaust system of the laboratory bench-mounted diesel engine and the urea injector was controlled to deliver an ammonia-to-$NO_x$ ratio (ANR) at 1.0 as the engine was run over the World Harmonised Transient Cycle (WHTC), for details of which, see https://dieselnet.com/standards/cycles/whtc.pp. An ANR of 1.0 was used because a sufficiently large enough amount of $NH_3$ "slipped" from the upstream extruded vanadium SCR catalyst to the downstream composite oxidation catalyst to determine which parameters of washcoat overlayer zone length and washcoat overlayer washcoat loading differentiate the activities of $NO_x$ and $NH_3$ conversion at high selectivity, i.e. low $N_2O$ generation.

In general, there is very little difference in the results of $NO_x$ conversion between the extruded vanadium SCR catalyst and the exit to the sample composite oxidation catalysts for all test samples, even at an ANR of 1.0. Similarly, there is practically no $NH_3$ detected at the exit of the sample composite oxidation catalysts at an ANR of 1.0. However, at an ANR of 1.0, a detected 0.15 g/kWh of $NH_3$ is slipped from the upstream extruded vanadium SCR catalyst, which is sufficient to differentiate between sample overlayer washcoat loadings and zone lengths for selectivity for $N_2$, i.e. higher $N_2O$ formation indicates lower reaction selectivity. The data in the following Table 3 shows the $N_2O$ selectivity of selected systems including the indicated samples relative to the detected $NH_3$ at the inlet of the composite oxidation catalyst at an ANR of 1.0, i.e. what proportion of the $NH_3$ consumed is converted to $N_2O$.

TABLE 3

| Sample | Cu/CHA overlayer washcoat loading (g/in³) | Axial length of Cu/CHA overlayer/total monolith substrate length | Percentage coverage of axial length of first washcoat coating (%) | x2 amount of N₂O formed relative to NH₃ consumed at an ANR 1.0 |
|---|---|---|---|---|
| 1.4 | 2.4 | 0.3 | 100 | 0.409 |
| 1.7 | 1.8 | 0.5 | 166.6 | 0.303 |
| 1.8 | 2.4 | 0.5 | 166.6 | 0.296 |

These initial, limited data appear to show a trend to lower selectivity, i.e. higher $N_2O$, at shorter SCR overlayer washcoat axial lengths and suggests that lower $N_2O$ results from higher SCR overlayer washcoat loadings.

NO oxidation was assessed using the same laboratory bench-mounted diesel engine as was used for the WHTC tests, i.e. including the extruded vanadium SCR catalyst, at seven steady state (i.e. non-transient WHTC) temperatures at a constant mass flow rate of gas over the catalyst of 500 kg/hr by adjusting the engine speed and torque, i.e. approximately 200° C., 225° C., 250° C., 275° C., 300° C., 350° C. and 400° C. NO oxidation activity is a passive catalytic reaction which is thermodynamically limited at lower temperatures and kinetically limited at higher temperatures. A graphical plot of $NO_2/NO_x$ to temperature generates a characteristic semi-bell-shaped curve off-centred to the right side. The results are reported below for $NO_2/NO_x$ detected downstream from the composite oxidation catalyst at 300° C. for both an ANR of zero, i.e. where no urea is injected upstream of the extruded vanadium SCR catalyst; and for an ANR of 0.75. NO oxidation at 300° C. is representative of near peak catalyst oxidation activity and a mode inlet exhaust gas temperature in a typical heavy-duty diesel engine WHTC for the tested system.

A reason for assessing $NO_2/NO_x$ under these two conditions is that, in a perfect system, an ANR of 0.75 would be expected to remove 75% of engine-out or inlet $NO_x$ according to reactions (1)-(3) presented in the background of this specification, leaving only 25% of the engine-out $NO_x$ entering the composite oxidation catalyst. Therefore, an assessment of NO oxidation activity at an ANR of 0.75 is an examination of the activity of the catalyst to oxidise NO in a significantly reduced concentration of total NOR relative to results for an ANR of zero, which examines oxidation activity of the full (i.e. about 100%) engine-out concentration $NO_x$. The results are shown in Table 4 hereinbelow.

TABLE 4

| Sample | NO₂/NOx at approx. 300° C. (%) Aged (580° C./100 hrs) in an ANR of zero | NO₂/NOx at approx. 300° C. (%) Aged (580° C./100 hrs) in an ANR of 0.75 |
|---|---|---|
| 1.1 (Control) | 37.2 | 47.9 |
| 1.3* (Cu/AEI) | 37.4 | — |
| 1.4 | 32.7 | 39.7 |
| 1.5 | 32.7 | 41.6 |
| 1.6 | 31.4 | 39.7 |
| 1.7 | 29.1 | 36.7 |
| 1.8 | 29.6 | 35.6 |

Referring to the results shown in Table 4, in general, there is a relatively small difference in NO oxidation between the different formulations. However, there is a general trend that a longer zone length of the overlayer washcoat has a lower NO oxidation than shorter zone lengths. The $NO_2/NO_x$ ratio for the ANR of 0.75 tests than at ANR 0, but the absolute level of $NO_2$ exiting the composite oxidation catalyst at ANR of 0.75 is much lower than at ANR of zero, e.g. at an ANR of 0.75, sample 1.4 converts 39.7% of 25% total engine-out NOR, whereas at an ANR of zero, sample 1.4 converts 32.7% of about 100% total engine-out $NO_x$. There is also a small reduction in $NO_2/NO_x$ at higher overlayer washcoat loadings, e.g. 1.8 g/in³ vs. 2.4 g/in³ at the same zone length.

In general, the control produces about 7% higher $NO_2/NO_x$ at peak activity(not shown).

Example 3—Assessment of Ability of SCR Catalyst Overlayer to Prevent Phosphorus and/or Zinc Poisoning of the Catalyst—Sample Preparation To illustrate the functional principle of the SCR catalyst overlayer as a "guard bed" to reduce or prevent phosphorus and/or zinc poisoning when in use, two experimental samples including an overlayer were prepared based on a common four-zone composite oxidation catalyst having the construction shown in FIG. 5 and which was made as follows. A cylindrical cordierite flow-through honeycomb monolith substrate having dimensions of length 10.5 inches x a diameter of 4 inches was coated with a first catalyst washcoat layer (6) coated on the substrate comprising Pt and Pd in a 2:1 weight ratio and 80 gft⁻³ barium supported on a silica-doped alumina particulate support at a 75% axial coating length from the inlet end (I) and the second washcoat layer (7) comprised Pt only supported on a 5 wt % silica-doped alumina particulate support (no barium) coated for 50% of the axial length of the substrate from the outlet end (O). A first catalyst washcoat zone was obtained by impregnating the first catalyst washcoat layer (6) with a solution of platinum and palladium salts sufficient to achieve a 1:1 weight ratio of Pt and Pd over 25% of the axial length of the substrate at an additional total PGM loading of 50 gft⁻³. The composite oxidation catalyst as a whole had a total platinum group metal loading of 15 gft⁻³ and a Pt:Pd weight ratio of 7.24:5, equivalent to 1.45:1. That is, the first catalyst washcoat zone in this Example 3 had a Pt:Pd weight ratio of >1:1.

In a first experimental (reference) sample (c.f. WO2008/022160 A1 acknowledged hereinabove), had a washcoat of 5 wt % silica-doped alumina (no platinum group metal)—the same silica-doped alumina as was used in the first (6) and second (7) catalyst washcoat layers—coated in an overlayer on the first catalyst washcoat zone (1) at a washcoat loading of 1.0 gin⁻³ and for a total of 30% of the substrate axial length from the inlet end of the substrate (I), i.e. the 25% of the axial length of the first catalyst washcoat zone was completely covered with the washcoat overlayer of silica-doped alumina "guard bed", i.e. 120% of the axial length of the first catalyst washcoat zone was coated with the washcoat overlayer. The mean pore diameter of the 5 wt % silica-doped alumina used was about 15 nm.

A second experimental sample (according to the invention) was prepared identically to the first experimental sample, except in that the washcoat overlayer comprised a copper ion-exchanged AEI aluminosilicate zeolite, which is active for selective catalytic reduction of $NO_x$ using a nitrogenous reductant, $NH_3$, for meeting relevant $NO_x$ emission standards for $NO_x$, whereas the silica-doped alumina overlayer of the first experimental example is not. The AEI aluminosilicate zeolite used had a silica-to-alumina ratio of about 20. The copper loading in the Cu ion-exchanged AEI aluminosilicate zeolite was about 3.8 wt. %.

Both the 5 wt % silica-doped alumina of the first, reference experimental sample and the Cu/AEI of the second experimental sample according to the invention had a fresh specific surface area of >100 m²/g. The 5 wt % silica-doped alumina and Cu/AEI in the overlayer washcoat were each milled to have a D90 of <20 μm, D50 (mean particle size)<8 μm (D90 and D50 as determined by conventional laser diffraction techniques), which combination Applicant's believe produces mean interparticle pore diameter in the guard be layer of ≥10 nm.

A three-zone composite oxidation catalyst on which the first and second experimental samples were based, but without a guard bed/overlayer was used as a control.

All samples were oven-aged in air at 650° C. for 50 hours.

Example 4—Assessment of Ability of Cu/AEI SCR Catalyst Overlayer to Prevent Phosphorus and/or Zinc Poisoning of the Catalyst—Experimental Sample Testing The two experimental samples prepared in Example 3 and the control were canned together in parallel in a proprietary canning arrangement and the canned substrates were inserted into an exhaust system of a laboratory bench-mounted 16 litre heavy-duty diesel engine certified to the Euro 2 emission standard running MK1 fuel to which had been mixed a ZDTP fuel additive to a 1750 ppm concentration. The substrates were then engine-aged using the following cycle, which had been calculated to expose the canned substrates as a whole to 0.5 g ZDTP per litre of catalyst substrate per cycle:

(i) 30 minutes "soak" at an engine load producing a steady state of 470° C. substrate inlet temperature;
(ii) 15 minutes "soak" at an engine load producing a steady state of 210° C. substrate inlet temperature followed by 15 minutes at an inlet temperature of 250° C. and finally 10 minutes at an inlet temperature of 325° C.; and
(iii) Steps (i) and (ii) were repeated six (6) times.

The samples were then decanned and each was tested in turn using the laboratory bench-mounted diesel engine using the "continuous exotherm" method described in Example 2A hereinabove.

The results of the continuous exotherm test are set out in the following Table 5.

TABLE 5

| Sample | Inlet temperature at <500° C. exotherm fail (° C.) | |
|---|---|---|
| | 650° C./ 50 h aged | Plus additional ZDTP aging |
| Reference (no guard bed) | 239.3 | 285.9 |
| 1.0 g/in³ silica-doped alumina guard bed sample | 250.7 | 272.8 |
| 1.0 g/in³ Cu ion-exchanged aluminosilicate AEI zeolite sample | 257.0 | 276.7 |

From the results shown in Table 5 it can be seen that both samples coated with an overlayer have reduced exotherm activity before phosphorus ageing relative to the control (reference), which has an exotherm fail temperature of 239.3° C. However, both experimental samples including an overlayer performed better than the reference post-phosphorus ageing (285.9° C.). That is, the application of the overlayer had the function of protecting the ability of the underlying platinum group metal layer to generate an exotherm form injected hydrocarbon fuel. However, a difference between the composite oxidation catalysts of the first experimental (reference) sample and the second experimental sample according to the invention is that the Cu/AEI aluminosilicate zeolite "guard bed" in the second experimental example additionally provides selective catalytic reduction and $NH_3$ oxidation functionality to the composite oxidation catalyst, in addition to protection from phosphorus and zinc poisoning.

Examples 5 to 9—Introduction

Examples 5 to 9 inclusive hereinbelow, although not according to the invention, because the tested samples do not include an overlayer feature, nevertheless evidence advantages of certain preferred features of the claimed invention, such as the benefit to exotherm generation of including an alkaline earth metal in a PGM-containing inlet zone(s) and the benefit to NO oxidation of including certain Mn components in the outlet zone(s). For this reason, samples within the Examples that follow are defined as "reference" Examples.

Example 5 (Reference)—Composite Oxidation Catalyst without Overlayer or Alkaline Earth Metal in Inlet Zone A bare cordierite honeycomb flow-through substrate monolith of 400 cells per square inch, a wall thickness of 6 thousandths of an inch (6 mil) and a total length of 4 inches was coated with catalyst washcoat in a zoned arrangement as follows. A first catalyst washcoat slurry containing aqueous salts (as nitrates) of platinum and palladium and a 5 wt. % silica-doped alumina support was coated onto the substrate monolith to an axial length of 75% of the total substrate monolith length from one end labelled as the inlet end. The concentrations of platinum and palladium salts were selected to achieve a loading in the coating of 6.67Pt:3.33Pd gft$^{-3}$ at a weight ratio of platinum to palladium in the first catalyst washcoat coating of 2:1. This inlet coating was then dried in a conventional oven for 1 hour at 100° C. to remove excess water and other volatile species.

A second catalyst washcoat slurry containing an aqueous platinum nitrate salt as the only platinum group metal present and a 5 wt. % silica-doped alumina support was coated onto the substrate from the end of the substrate monolith opposite to the end from which the first coating was applied, i.e. the outlet end. The axial length of coating of the second catalyst washcoat was 50% of the total substrate length, i.e. 25% of the second washcoat catalyst coating overlapped with the first washcoat catalyst coating. The concentration of platinum salt used was selected to achieve a 2 gft$^{-3}$ Pt loading in the 50% axial substrate length coated. The substrate coated with both the first and the second washcoat coatings was dried in a conventional oven for 1 hour at 100° C. and then the dried part was calcined for 1 hour at 500° C. to decompose the platinum and palladium salts and fix the platinum and palladium to the silica-doped alumina support.

An aqueous medium comprising salts of both platinum nitrate and palladium nitrate at a 1:1 weight ratio was then impregnated onto the coating of the first catalyst washcoat to an axial length of the substrate of 25% measured from the substrate inlet end. The concentrations of the salts were selected to achieve a weight of 25 gft$^{-3}$ for each of the platinum and palladium in the impregnated length of the substrate. This gave a high PGM loading in a zone at the inlet end with an additional loading of 50 gft$^{-3}$ over and above that of the underlying first catalyst washcoat coating. The impregnated part was oven dried and calcined as described above.

All washcoats and impregnation solutions were naturally acidic and there was no pH adjustment thereof.

The final product comprised a substrate monolith comprising three catalyst washcoat zones arranged axially in series: a first, high loaded front zone defined as about 25% of the axial length of the substrate monolith measured from the inlet end and having a total platinum group metal loading which was a combination of the underlying 2Pt:1Pd first catalyst washcoat and the impregnated 1:1 Pt:Pd, followed axially in series by a second catalyst washcoat zone comprised of the 2Pt:1Pd first catalyst washcoat of approximately 50% of the axial length of the substrate monolith at a lower total platinum group metal loading than the first catalyst washcoat zone and finally a third Pt-only zone at the outlet end comprised of the second catalyst washcoat coating of approximately 25% of the axial length of the substrate monolith at a lower total platinum group metal loading than either the first or the second catalyst washcoat zones. The total platinum group metal loading on the substrate monolith as a whole was 20 gft$^{-3}$ at a total Pt:Pd weight ratio of 11.8:4, equivalent to 2.95:1. Using EPMA-WDX (electron microprobe analysis-wavelength dispersive x-ray) image analysis, the first catalyst washcoat zone prepared in this manner, which contained a high concentration of both platinum and palladium, was found to have a non-uniform distribution of Pd in a direction perpendicular to the surface of the substrate, i.e. an amount of Pd decreased in a perpendicular direction toward the surface of the substrate. In other words, the Pd concentration at the upper surface of the washcoat layer in contact with gas entering the inlet end of the substrate was higher than in the washcoat layer at the substrate surface. To a lesser extent, the platinum also was found to follow the same trend as the palladium. However, the non-uniform distribution of the Pd in a direction perpendicular to the surface of the substrate in the first catalyst washcoat zone was most pronounced. This effect is referred to herein as the formation of a so-called "crust" of Pd in the first catalyst washcoat zone.

Example 6 (Reference)—Composite Oxidation Catalyst without Overlayer but Including Alkaline Earth Metal in Inlet Zone An identical product to that disclosed in Example 5 was prepared, except in that, in addition to aqueous salts of platinum and palladium, the first catalyst washcoat slurry contained an aqueous barium acetate salt. The concentration of the barium acetate was selected so that the barium loading in the first catalyst washcoat coating was 80 gft$^{-3}$ for the 75% axial length of the first catalyst washcoat coating. That is, the first and second catalyst washcoat zones comprised barium at a loading of 80 gft$^{-3}$. The total platinum group metal loading and Pt:Pd weight ratio on the substrate monolith as a whole was the same as in Example 1, i.e. 20 gft$^{-3}$.

Using EPMA-WDX image analysis, the first catalyst washcoat zone prepared in this manner, was found to have an amount of Pd that decreased in a perpendicular direction toward the surface of the substrate, and to a lesser extent the same for Pt, but also a relatively strong non-uniform distribution of barium that decreases in a perpendicular direction toward the surface of the substrate. In other words, both the Pd and the Ba (and to a lesser extent Pt) formed a "crust" at the surface of the of the washcoat layer in contact with gas entering the inlet end of the substrate.

Example 7—Exotherm Generation Test Method & Results for Comparison of Examples 5 and 6

A thermal analysis of each composite oxidation catalyst prepared according to Examples 5 and 6 inclusive was performed using the 7-litre capacity EUV 6-cylinder engine laboratory bench-mounted diesel engine described in Example 2A hereinabove.

Each catalyst was conditioned for 10 minutes at an inlet exhaust gas temperature of 490° C. at an exhaust gas flow-rate of 1000 kg/hour followed by a rapid cooling step. The exhaust gas flow rate was then set to 720 kg/hour (corresponding to 120,000 hr$^{-1}$ space velocity for the size and volume of substrate tested) with the engine load controlled so that a stable set inlet exhaust gas temperature of about 270° C. was achieved for approximately 1800 seconds.

The ability for the composite oxidation catalyst to generate an exotherm at each stabilised set temperature was then tested by injecting hydrocarbon fuel via the 7$^{th}$ injector targeting both 600° C. and a stable hydrocarbon "slip" at the outlet of the composite oxidation catalyst substrate via downstream thermocouple and hydrocarbon sensors. The test was stopped if the hydrocarbon slip measured downstream from the composite oxidation catalyst exceeded 1000 ppm $C_3$, i.e. no matter what the length of the hydrocarbon chain in the detected hydrocarbons—the modal carbon chain length in a typical diesel fuel is $C_{16}$—the test would be stopped if the equivalent of 1000 ppm $C_3$ was detected. So, if 187.5 ppm $C_{16}$ were detected, this was equivalent to 1000 ppm $C_3$ ($C_{16}$ is equivalent to 5⅓×$C_3$ hydrocarbons).

Following the test at the about 270° C. set inlet temperature, the system was again preconditioned at an inlet exhaust gas temperature of 490° C. for 10 minutes at a flow rate of 1000 kg/hour followed by a rapid cooling and an exotherm test at a second set temperature, e.g. about 260° C. This cycle was repeated to test exotherm generation at set temperatures of about 250° C., 240° C. and 230° C. The test was stopped when either the composite oxidation catalyst cannot generate a stable exotherm of 600° C. at the composite oxidation catalyst outlet end or the hydrocarbon slip measured at the composite oxidation catalyst outlet exceeds 1000 ppm ($C_3$).

The results for these tests performed on Examples 5 and 6 are set out in Table 3 below. It will be understood that the lower the inlet temperature at which a stable exotherm can be achieved at acceptable hydrocarbon slip, the more advantageous. This is because the design flexibility in the system is increased in that a filter regeneration event can be initiated from a lower inlet exhaust gas temperature, i.e. without needing to wait until the exhaust gas temperature under normal operating conditions is sufficiently high to initiate filter regeneration, which may occur less frequently in ordinary operation Also, it improves overall fuel economy because it is not necessary to inject as much hydrocarbon in order to achieve a desired exhaust gas temperature at the outlet to the composite oxidation catalyst.

TABLE 6

| Inlet temperature (° C.) | Example 5 (no barium) HC slip ($C_3$) | Example 6 (barium) |
|---|---|---|
| 270 | 550 | 425 |
| 260 | 550 | 450 |
| 250 | 1000 | 440 |
| 240 | 1000 | 320 |
| 230 | n/a | 1000 |

Table 6 demonstrates that the composite oxidation catalyst (Example 5) cannot achieve a stable exotherm at an inlet temperature of 250° C. or below, whereas the composite oxidation catalyst according to Example 6 can achieve a stable exotherm down to 230° C.

temperature. The conditioned fresh catalyst was then tested over a load-ramped transient test cycle at constant 1400 rpm engine speed and increasing space velocity to determine the NO oxidation activity of the composite oxidation catalyst. Detected $NO_2/NO_x$ in exhaust gas downstream of the composite oxidation catalyst was recorded against substrate inlet temperature. The tested catalyst was then cooled, decanned and oven-aged hydrothermally in air/10% $H_2O$ (steam) at 600° C. for 140 hours to simulate end-of-vehicle life oxidation activity. The aged catalyst was then remounted into the exhaust system of the laboratory bench-mounted diesel engine and re-conditioned and re-tested using the same protocol as described for the fresh catalyst. The results are shown in Table 7 hereinbelow.

TABLE 7

| Sample | Refractory metal oxide support material | Pt:Pd weight ratio (total PGM 12.5 g/ft³) | Fresh $NO_2/NO_x$ at 300° C. (%) | Hydrothermally Aged (600° C./140 hrs) $NO_2/NO_x$ at 300° C. (%) | Fresh-to-aged $NO_2/NO_x$ "delta" (%) |
|---|---|---|---|---|---|
| 8.1 | 5 wt % silica-doped alumina | 1:0 | 64.7 | 47.6 | 17.1 |
| 8.2 | 5 wt % silica-doped alumina | 2:1 | 54.8 | 40.4 | 14.4 |
| 8.3 | "Pre-formed" 3.2 wt % manganese†-/5 wt % silica-doped alumina | 1:0 | 49.1 | 42.8 | 6.3 |
| 8.4 | 5 wt % silica-doped alumina + 3.2 wt % manganese† (from impregnation)* | 1:0 | 50.1 | 40.3 | 9.8 |

†Equivalent to 5.0 wt % $MnO_2$ in the calcined material.
*5 wt % silica-doped alumina was impregnated with manganese nitrate solution at a sufficient concentration to achieve the desired calcined weight of manganese.

Reference Example 8—Investigation of Fresh-to-Aged "Delta" for NO Oxidation Catalyst Activity Through Compositional Changes to Outlet Catalyst Washcoat Zone A series of catalysts similar to those described in Example 3—but without the overlayer—and having the construction shown in FIG. 5 were prepared. The only other differences with the Example 3 catalyst samples were that the composite oxidation catalyst as a whole had a total platinum group metal loading of 30 gft$^{-3}$; and the formulation of the second washcoat layer (7) was modified to investigate the NO oxidation activity of the outlet zone, the details of which are set out in the Table 7 hereinbelow. The total platinum group metal loading in all samples in the second washcoat layer in this Example 8 was 12.5 gft$^{-3}$, the washcoat loading of the second washcoat layer in all samples tested was equivalent and none of the second washcoat layers tested included barium. The total Pt:Pd weight ratio in the composite oxidation catalyst as a whole was different from that of the Example 1 samples.

Each fresh catalyst was inserted into the test exhaust system of the laboratory bench-mounted diesel engine described in Example 2B. The fresh catalyst was first "conditioned" for 30 minutes at an engine load and speed to generate a catalyst bed temperature of 550° C. The resulting "conditioned" catalyst was then allowed to cool to room Reference Example 9—Further Investigations into Fresh-to-Aged "Delta" for NO Oxidation Catalyst Activity Through Compositional Changes to Outlet Catalyst Washcoat Zone A series of catalysts similar to those described in Example 8 and having the construction shown in FIG. 5 were prepared. The only differences with the Example 8 catalyst samples were that the first catalyst washcoat zone was obtained by impregnating the first catalyst washcoat layer (6) with a solution of platinum and palladium salts sufficient to impregnate 25% of the axial length of the substrate with an additional 35 gft$^{-3}$ quantity of Pt and Pd at a weight ratio of 1:1 so that the composite oxidation catalyst as a whole had a total platinum group metal loading of 20 gft$^{-3}$; and the total platinum group metal loading in all samples in the second washcoat layer in this Example 9 was 7.5 gft$^{-3}$. The total Pt:Pd weight ratio in the composite oxidation catalyst of 1.9:1.

Tests were conducted in the same way as is described in Example 8 hereinabove, except in that the ageing of the catalyst was different. In this Example 9, the fresh "conditioned" catalyst was oven-aged in air at 650° C. for 50 hours. The results are set out in the following Table 8.

TABLE 8

| Sample | Refractory metal oxide support material | Fresh NO$_2$/NOx at 300° C. (%) | Aged (650° C./50 hrs) NO$_2$/NOx at 300° C. (%) | Fresh-to-aged NO$_2$/NOx "delta" (%) |
|---|---|---|---|---|
| 9.1 | 5 wt. % silica-doped alumina | 60.2 | 41.4 | 18.8 |
| 9.2 | "Pre-formed" 3.2 wt % manganese-/5 wt % silica-doped alumina | 52.1 | 32.8 | 19.3 |
| 9.3 | Mixed magnesium aluminium metal oxide containing 3.5 wt. % Mg† | 56.9 | 39.2 | 17.7 |
| 9.4 | "Pre-formed" 0.64 wt % manganese*[1]-doped mixed magnesium aluminium metal oxide containing 3.5 wt. % Mg† | 51.9 | 37.8 | 14.0 |
| 9.5 | "Pre-formed" 1.9 wt % manganese*[2]-doped mixed magnesium aluminium metal oxide containing 3.5 wt. % Mg† | 51.3 | 36.4 | 14.9 |
| 9.6 | "Pre-formed" 3.2. wt % manganese*[3]-doped mixed magnesium aluminium metal oxide containing 3.5 wt. % Mg† | 47.1 | 34.7 | 12.4 |

†Equivalent to 5.7 wt. % MgO/94.3 wt % Al$_2$O$_3$. The material is predominantly a single cubic phase spinel as determined by X-Ray Diffraction (XRD). Some excess Al$_2$O$_3$ may be present.
*[1]Equivalent to 1.0 wt % MnO$_2$.
*[2]Equivalent to 3.0 wt % MnO$_2$.
*[3]Equivalent to 5.0 wt % MnO$_2$.

Additionally, the composite oxidation catalysts of this Example 9 were tested according to the "continuous exotherm" test described in Example 2A, but without ZDTP aging. The results are set out in the following Table 9.

TABLE 9

| Sample | 650° C./50 hour-aged catalyst inlet temperature at <500° C. exotherm fail (° C.) |
|---|---|
| 9.1 | 246.2 |
| 9.2 | 240.6 |
| 9.3 | 235.7 |
| 9.4 | 238.4 |
| 9.5 | 238.7 |
| 9.6 | 237.0 |

It can be seen from the results shown in Tables 8 and 9 that Samples 9.4, 9.5 and 9.6 including pre-formed manganese-doped mixed sub-stoichiometric magnesium aluminium metal oxides show a surprising and beneficial combination of lower fresh-to-aged NO oxidation activity and improved exotherm generation.

Reference Example 10—First Catalyst Washcoat Zone Pt:Pd Weight Ratio Study

The current cost of palladium by weight is over twice the cost of platinum. In this Reference Example 10, Applicant undertook a series of experiments to reduce the total quantity of palladium in the composite oxidation catalyst according to the invention.

A series of catalysts similar to those described in sample 9.1 in Example 9 and having the construction shown in FIG. 5 were prepared. The only differences with the sample 9.1 catalyst samples were that the composition of the impregnating solution for the first catalyst washcoat zone was varied sufficient to achieve a range of Pt:Pd weight ratios as set out in Table 10 below over 25% of the axial length of the substrate from an inlet substrate end at an additional total PGM loading of 35 gft$^{-3}$ and the composite oxidation catalyst as a whole had a total platinum group metal loading of 15 gft$^{-3}$; and the only platinum group metal in the second washcoat layer was platinum, i.e. a Pt:Pd weight ratio of 1:0 at a washcoat loading of 2.0 gft$^{-3}$.

Table 10 sets out the results for the "continuous exotherm" test for catalyst samples aged and tested as described in Example 2A.

TABLE 10

| Sample | Pt:Pd weight ratio in first catalyst washcoat zone | Total composite oxidation catalyst Pt:Pd ratio | 650° C./50 hour-aged inlet temperature at <500° C. exotherm fail (° C.) |
|---|---|---|---|
| 10.1 | 1:1 | 1.45:1 | 258 |
| 10.2 | 2:1 | 2.21:1 | 256 |
| 10.3 | 3:1 | 2.8:1 | 260 |
| 10.4 | 4:1 | 3.28:1 | 262 |
| 10.5 | 1:0 | 7.55:1 | 280 |

It can be seen from the results shown in Table 10 that the weight ratio of platinum-to-palladium in the first catalyst washcoat zone can be increased without unduly affecting the ability of the composite oxidation catalyst to generate and sustain its exotherm. However, where the impregnation medium to obtain the first catalyst washcoat zone contains no palladium (Example 10.5), the exotherm fail is higher and so this arrangement is less preferred. Accordingly, it is preferred that the combined Pt:Pd weight ratio of the impregnation medium and underlying impregnated catalyst washcoat layer contains some palladium to stabilise the platinum, e.g. at 10:1≥1:1.

Reference Example 11—Two-Zone Composite Oxidation Catalyst Having a Pt:Pd Weight Ratio of 1:1 in the First Catalyst Zone A bare cordierite honeycomb flow-through substrate monolith of 400 cells per square inch, a wall thickness of 6 thousandths of an inch (6 mil) and a total length of 4 inches was coated with catalyst washcoat in a zoned arrangement as follows. Firstly, a catalyst washcoat slurry (corresponding to the second catalyst washcoat according to the fifth invention aspect) containing aqueous nitrate salts of platinum and palladium and a 5 wt. % silica-doped alumina support was coated onto the substrate monolith to an axial length of 70% of the total substrate monolith length from one end labelled as the outlet end and the coated substrate monolith was dried in a conventional oven for 1 hour at 100° C. A weight ratio of platinum to palladium in the second catalyst washcoat coating was 5:1 at a total platinum group metal loading of 8 gft$^{-3}$. There was no barium present in the second catalyst washcoat coating.

Next, a different catalyst washcoat slurry (corresponding to the first catalyst washcoat according to the fifth invention aspect) containing aqueous nitrate salts of platinum and palladium and barium acetate and a 5 wt. % silica-doped alumina support was coated onto the substrate monolith to an axial length of 30% of the total substrate monolith length from the inlet end. The coating process was controlled so that the axial length of the coating of the first catalyst washcoat was done to avoid substantially any gap between the first catalyst washcoat coating and the second catalyst washcoat coating so that at a targeted minimum 2 mm overlap of the first washcoat coating of the second washcoat coating was achieved. A weight ratio of platinum to palladium in the first catalyst washcoat coating was 1:1 at a total platinum group metal loading in the first catalyst washcoat coating of 50 gft$^{-3}$. The barium loading in the first catalyst washcoat coating was 80 gft$^{-3}$. The resulting product coated with the first and second washcoat coatings was dried in a conventional oven at 100° C. for 1 hour and calcined 1 hour at 500° C.

The final product comprised a substrate monolith comprising two catalyst washcoat zones arranged axially in series: a first, high loaded front zone at the inlet end defined as about 30% of the axial length of the substrate monolith corresponding to the length of the first catalyst washcoat coating and having a total platinum group metal loading of 50 gft$^{-3}$ at 1Pt:1Pd and 80 gft$^{-3}$ barium, followed axially in series by a second catalyst washcoat zone of approximately 70% of the axial length of the substrate monolith corresponding to the second catalyst washcoat coating length and having a total platinum group metal loading of 8 gft$^{-3}$ at 5Pt:1Pd. The total platinum group metal loading on the substrate monolith as a whole was 20 gft$^{-3}$ at a total Pt:Pd weight ratio of 11.8:4, equivalent to 2.95:1.

Using EPMA-WDX image analysis, the first catalyst washcoat zone prepared in this manner, was found to have an amount of Pd that decreased in a perpendicular direction toward the surface of the substrate, and to a lesser extent the same for Pt, but also a relatively strong non-uniform distribution of barium that decreases in a perpendicular direction toward the surface of the substrate. In other words, both the Pd and the Ba (and to a lesser extent Pt) formed a "crust" at the surface of the of the washcoat layer in contact with gas entering the inlet end of the substrate.

Reference Example 12—Two-Zone Composite Oxidation Catalyst Having a Pt:Pd Weight Ratio of 1:2 in the First Catalyst Zone An identical product to that disclosed in Reference Example 11 was prepared, except in that the weight ratio of platinum to palladium in the first catalyst washcoat coating was 1:2 at a total platinum group metal loading in the first catalyst washcoat coating of 50 gft$^{-3}$. A "crust" of Pd, Ba and to a lesser extent Pt was observed using EPMA-WDX image analysis.

Example 13—Two-Zone Composite Oxidation Catalyst Having a Pt:Pd Weight Ratio of 1:3 in the First Catalyst Zone An identical product to that disclosed in Reference Example 11 was prepared, except in that the weight ratio of platinum to palladium in the first catalyst washcoat coating was 1:3 at a total platinum group metal loading in the first catalyst washcoat coating of 50 gft$^{-3}$. A "crust" of Pd, Ba and to a lesser extent Pt was observed using EPMA-WDX image analysis.

Reference Example 14—Test Method & Results for Exotherm Generation Comparison of Catalysts of Reference Examples 11 to 13 Inclusive A thermal analysis of each reference composite oxidation catalyst prepared according to Reference Examples 11 to 13 inclusive was performed as is described in Example 7 hereinabove.

The results of these tests are set out in Table 11 below. It will be understood that the lower the inlet temperature at which a stable exotherm can be achieved at acceptable hydrocarbon slip, the more advantageous. This is because the design flexibility in the system is increased in that a filter regeneration event can be initiated from a lower inlet exhaust gas temperature, i.e. without needing to wait until the exhaust gas temperature under normal operating conditions is sufficiently high to initiate filter regeneration, which may occur less frequently in ordinary operation Also, it improves overall fuel economy because it is not necessary to inject as much hydrocarbon in order to achieve a desired exhaust gas temperature at the outlet to the composite oxidation catalyst.

TABLE 11

| Inlet temperature (° C.) | Reference Example 11 (Pt:Pd weight ratio at 1:1) | Reference Example 12 (Pt:Pd weight ratio at 1:2) HC slip (C$_3$) | Reference Example 13 (Pt:Pd weight ratio at 1:3) |
|---|---|---|---|
| 272 | 408 | 403 | 401 |
| 265 | 490 | 418 | 410 |
| 255 | 800 | 500 | 1000 |

Table 11 demonstrates that the composite oxidation catalysts of Reference Examples 12 and 13 achieve a lower stable exotherm at an inlet temperature of 272° C. and 265° C. compared with the composite oxidation catalyst of Reference Example 11 with the composite oxidation catalyst according to Reference Example 12 further achieving a stable exotherm down to 255° C.

Reference Example 15

The same bare substrate monolith as was used in Example 11 was used to make an identical composite oxidation catalyst, except in that the barium loading in the first catalyst washcoat coating was 40 gft$^{-3}$. A "crust" of Pd, Ba and to a lesser extent Pt was observed using EPMA-WDX image analysis.

Reference Example 16

An identical product to that disclosed in Reference Example 11 was prepared, except in that the barium loading in the first catalyst washcoat coating was 120 gft$^{-3}$. A "crust" of Pd, Ba and to a lesser extent Pt was observed using EPMA-WDX image analysis.

Reference Example 17—Test Method and Results for Barium Loading Study

The oxidation catalysts of Reference Examples 15, 12 and 16 respectively were tested in the same manner as is explained in Reference Example 7 hereinabove. The tests in this Reference Example 17 were conducted on a different day from the tests done on Reference Example 12 reported in Table 11. Although some difference in the results for Reference Example 12 was seen for the test results for this Reference Example 17, these were within the expected margin of error and the trend observed and reported in this Reference Example 17 was the same as that seen in all tests conducted on the reference composite oxidation catalysts and for comparative catalysts. The results are set out in the following Table 12.

TABLE 12

| Inlet temperature (° C.) | Reference Example 15 (40 gft$^{-3}$ Ba) | Reference Example 12 (80 gft$^{-3}$ Ba) | Reference Example 16 (120 gft$^{-3}$ Ba) |
|---|---|---|---|
| | HC slip (C$_3$) (normalised to the result of Reference Example 11 for each inlet temperature) | | |
| 270 | 1.00 | 1.00 | 1.13 |
| 260 | 1.07 | 1.00 | 1.67 |
| 250 | Fail | 1.00 | 0.53 |
| 240 | Fail | Fail | Fail |

A "fail" figure is a slip of ≥1000 ppm C$_3$ HC. It will be understood that where a normalised value for Reference Example 15 or Reference Example 16 is >1, the result is better than for Reference Example 12. That is, the catalyst slips less C$_3$ HC than Reference Example 12 at that inlet temperature. However, for a normalised result that is <1 for Reference Example 15 or 16, Reference Example 12 is better than the Reference Example 15 or 16 catalyst at that inlet temperature point.

It can be seen from the results shown in Table 12 that the activity of the catalyst to oxidise hydrocarbons, as shown by the quantity of slipped hydrocarbons detected downstream from the tested catalyst varies with barium loading. Furthermore, increasing barium loading did not lead to decreased hydrocarbon slip at all temperatures. This indicates that—contrary to the alkaline earth metal loadings exemplified for use in treating exhaust gas from light-duty diesel engines (see Applicant's WO2014/080200), these results show that there is no benefit to increasing the concentration of alkaline earth metal for HC oxidation above about 80 gft$^{-3}$, corresponding to a mass ratio of barium to total PGM of 1.6 or a barium to Pt mass loading ratio of 3.3. In this regard, it is noted from Applicant's WO 2014/080200 that NO oxidation can also be affected by the presence of increased quantities of alkaline earth metal in catalyst compositions. From Applicant's records, Example 5-1 in WO 2014/080200 had a barium loading of 150 gft$^{-3}$. Furthermore, addition of alkaline earth metal over and above an amount required to achieve a desired function increases the overall cost of the catalyst through inclusion of surplus raw material.

Secondly, the skilled person would appreciate that HC oxidation activity at the lowest inlet temperature is important, because it allows generation of exotherm at the widest available exhaust gas temperature operating window. That is, if the engine management is only able to trigger an exotherm by HC oxidation for regenerating a downstream filter when the inlet exhaust gas temperature is at ≥260° C., this is less desirable than a situation where the trigger temperature is ≥250° C. In this regard, the skilled person would understand that the result for Reference Example 12 is—on balance—the best result of Reference Examples 12, 15 and 16 in this Reference Example 17, because, despite the higher barium loaded catalyst of Reference Example 16 being more active for HC oxidation (evidenced by less slipped HC) than Reference Example 12 at higher temperatures, the result that Reference Example 12 achieves sub-fail HC oxidation/HC slip at the lowest temperature point (250° C.) indicates that Reference Example 12 is technically the best oxidation catalyst for its intended purpose/function of the three catalysts tested.

For the avoidance of any doubt, the entire content of any and all documents cited herein is incorporated by reference into the present application.

The invention claimed is:

1. An exhaust system for a vehicular compression ignition engine for treating an exhaust gas comprising inter alia oxides of nitrogen (NO$_x$), the exhaust system comprising:
a composite oxidation catalyst comprising
an oxidation catalyst substrate having a total length L and a longitudinal axis and having an oxidation catalyst substrate surface extending axially between a first oxidation catalyst substrate end and a second oxidation catalyst substrate end;
two or more catalyst washcoat zones comprised of a first catalyst washcoat layer comprising a refractory metal oxide support material and one or more platinum group metal components supported thereon and a second catalyst washcoat layer different from the first catalyst washcoat layer and comprising a refractory metal oxide support material and one or more platinum group metal components supported thereon, which two or more catalyst washcoat zones being arranged axially in series on and along the oxidation catalyst substrate surface, wherein a first catalyst washcoat zone having a length L$_1$, wherein L$_1$<L, is defined at one end by the first oxidation catalyst substrate end and at a second end by a first end of a second catalyst washcoat zone having a length L$_2$, wherein L$_2$<L, wherein the first catalyst washcoat zone comprises a first refractory metal oxide support material and one or more platinum group metal components supported thereon; and the second catalyst washcoat zone comprises a second refractory metal oxide support material and one or more platinum group metal components supported thereon; and
a washcoat overlayer extending axially from the first oxidation catalyst substrate end for up to 200% of the axial length of the underlying first catalyst washcoat layer, which washcoat overlayer comprising a particulate metal oxide loading of >48.8 g/l (>0.8g/in$^3$), wherein the particulate metal oxide is an aluminosilicate zeolite including at least one of copper, iron and manganese, wherein a total platinum group metal loading in the first catalyst washcoat zone defined in grams of platinum group metal per litre of substrate volume (g/l) is different from the total platinum group metal loading in the second catalyst washcoat zone;
- a first injector for a nitrogenous reductant or a precursor thereof connected to a source of nitrogenous reductant or nitrogenous reductant precursor, which first injector being arranged to inject the nitrogenous reductant or nitrogenous reductant precursor into a flowing exhaust gas upstream from the composite oxidation catalyst; and,
- a selective catalytic reduction catalyst substrate comprising a selective catalytic reduction catalyst disposed between the first injector for a nitrogenous reductant or a precursor thereof and the composite oxidation catalyst,
- wherein the first oxidation catalyst substrate end of the composite oxidation catalyst is oriented to an upstream side.

2. The exhaust system according to claim 1, wherein the second catalyst washcoat zone is defined at a second end thereof by the second oxidation catalyst substrate end and wherein the first catalyst washcoat zone comprises the first catalyst washcoat layer and the second catalyst washcoat zone comprises the second catalyst washcoat layer.

3. The exhaust system according to claim 1, wherein the total platinum group metal loading in the first catalyst washcoat zone is less than the total platinum group metal loading in the second catalyst washcoat zone.

4. The exhaust system according to claim 1, wherein the total platinum group metal loading in the first catalyst washcoat zone is greater than a total platinum group metal loading in the second catalyst washcoat zone.

5. The exhaust system according to claim 4 comprising three or more catalyst washcoat zones including one zone formed from a two-layer overlap region of the first catalyst washcoat layer and the second catalyst washcoat layer, wherein a third catalyst washcoat zone comprising a third refractory metal oxide support material and one or more platinum group metal components supported thereon is defined at a second end thereof by the second oxidation catalyst substrate end and wherein a total platinum group metal loading in the third catalyst washcoat zone defined in grams of platinum group metal per litre of substrate volume (g/l) is less than the total platinum group metal loading in the second catalyst washcoat zone.

6. The exhaust system according to claim 1, wherein the one or more platinum group metal components in the first catalyst washcoat zone consists of both platinum and palladium.

7. The exhaust system according to claim 6, wherein a weight ratio of platinum to palladium is ≥1.

8. The exhaust system according to claim 6, wherein a weight ratio of platinum to palladium is <1.

9. The exhaust system according to claim 1, wherein the washcoat overlayer extends axially for up to 150% of the axial length of the underlying first catalyst washcoat layer from the first oxidation catalyst substrate end.

10. The exhaust system according to claim 9, wherein the washcoat overlayer extends axially for up to 120% of the axial length of the underlying first catalyst washcoat layer from the first oxidation catalyst substrate end.

11. The exhaust system according to claim 1, wherein where the aluminosilicate zeolite in the washcoat overlayer includes copper, the aluminosilicate zeolite also includes cerium.

12. The exhaust system according to claim 1, wherein the washcoat loading of the washcoat overlayer is 0.8 to 3.5 g $in^{-3}$.

13. The exhaust system according to claim 1, wherein the washcoat overlayer extends axially for >50% of the axial length of the underlying first catalyst washcoat layer from the first oxidation catalyst substrate end.

14. The exhaust system according to claim 1, wherein the aluminosilicate zeolite in the washcoat overlayer is faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-13 zeolite, offretite or a beta zeolite.

15. The exhaust system according to claim 1, wherein the aluminosilicate zeolite in the washcoat overlayer has a mean pore diameter of ≥10 nm and/or the washcoat overlayer has a mean interparticle pore diameter of ≥10 nm.

16. The exhaust system according to claim 1, wherein $L_1$ is <50% L.

17. The exhaust system according to claim 1 comprising an engine and nitrogenous reductant or nitrogenous reductant precursor electronic control unit(s) comprising a pre-programmed computer processor(s) for controlling delivery of ammonia nitrogenous reductant to the selective catalytic reduction substrate comprising a selective catalytic reduction catalyst at an ammonia-to-$NO_x$ ratio of 0.4 to 0.8.

18. The exhaust system according to claim 1, wherein the oxidation catalyst substrate is a honeycomb flow-through substrate monolith.

19. The exhaust system according to claim 17, wherein the ammonia-to-NOx ratio is 0.4 to 0.6.

20. The exhaust system according to claim 17, wherein the ammonia-to-NOx ratio is 0.7 to 0.8.

* * * * *